(12) United States Patent
Suemura et al.

(10) Patent No.: US 6,271,949 B1
(45) Date of Patent: Aug. 7, 2001

(54) OPTICAL COMMUNICATION SYSTEM USING WAVELENGTH-DIVISION MULTIPLEXED LIGHT

(75) Inventors: Yoshihiko Suemura; Naoya Henmi, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/991,049

(22) Filed: Dec. 16, 1997

(30) Foreign Application Priority Data

Dec. 18, 1996 (JP) .................................................. 8-338429
Apr. 28, 1997 (JP) .................................................. 9-111593

(51) Int. Cl.$^7$ ...................................................... H04J 14/02

(52) U.S. Cl. .......................... 359/128; 359/127; 359/128; 359/129; 359/130; 359/131; 359/117

(58) Field of Search .................................. 359/127–131, 359/117

(56) References Cited

U.S. PATENT DOCUMENTS

| | | | | |
|---|---|---|---|---|
| 5,493,625 | * | 2/1996 | Glance | 385/24 |
| 5,542,010 | | 7/1996 | Glance et al. | 385/14 |
| 5,566,014 | * | 10/1996 | Glance | 359/124 |
| 6,097,517 | * | 8/2000 | Okayama | 359/124 |

FOREIGN PATENT DOCUMENTS

| | | |
|---|---|---|
| 0 711 092 | 5/1996 | (EP) . |
| 0 743 771 | 11/1996 | (EP) . |
| 5-273603 | 10/1993 | (JP) . |
| 6-43504 | 2/1994 | (JP) . |
| 6-88968 | 3/1994 | (JP) . |
| 6-332022 | 12/1994 | (JP) . |

OTHER PUBLICATIONS

M. Zirngibl et al., "High performance, 12 frequency optical multichannel controller", *Electronics Letters,* vol. 30, No. 9, Apr. 28, 1994, pp. 700–701.
Y. Tachikawa et al., "Tunable WDM–channel group drop filters based on a smart device configuration", *Electronics Letters,* vol. 31, No. 23, Nov. 9, 1995, pp. 2029–2030.
M. Zirngibl et al., "Digitally Tunable Channel Dropping Filter/Equalizer Based on Waveguide Grating . . . Amplifier Integration", *IEEE Photonics Technology Letters,* vol. 6, No. 4, Apr. 1994, pp. 513–515.
B. Glance et al.: "Applications of the Integrated Waveguide Grating Router" *Journal of Lightwave Technology,* US, IEEE. New York vol. 12, No. 6, Jun. 1, 1994, pp. 957–962, XP000484211 USSN: 0733–8724.
O. Ishida et al.: "FDM–Channel Selection Filter Employing an Arrayed–Waveguide Gratingmultiplexer" *Electronics Letters,* GB, IEE, Stevenage, vol. 30, No. 16, Aug. 4, 1994, pp. 1327–1328, XP000468814 USSN: 0013–5194.

\* cited by examiner

*Primary Examiner*—Leslie Pascal
(74) *Attorney, Agent, or Firm*—Sughrue, Mion, Zinn, Macpeak & Seas, PLLC

(57) ABSTRACT

An optical wavelength selector is provided that selects WDM channels from WDM optical signal and outputs each WDM channels from a plurality of ports. WDM optical signal in which m×n WDM channels are multiplexed is divided into n WDM channel groups and outputted by means of one wavelength-division demultiplexer. One WDM channel group is selected from the n WDM channel groups by means of n optical gate switches. The selected WDM optical signal is then separated into m WDM channels by wavelength and outputted by means of an optical wavelength router. As a result, m WDM channels of a specific WDM channel group can be received by m optical receivers.

24 Claims, 31 Drawing Sheets

OPTICAL COMMUNICATION SYSTEM USING WAVELENGTH-DIVISION MULTIPLEXED LIGHT

BACKGROUND OF THE INVENTION

1. Field of the Invention

The present invention relates to an optical communication system that employs a optical wavelength selector.

2. Description of the Related Art

WDM (Wavelength-division multiplexing) is a method in which optical signals of WDM channels are multiplexed and transmitted by a single optical waveguide. The result of multiplexing WDM channels is called WDM optical signal. A WDM optical network is an optical communication system in which wavelength-division multiplexing is applied in an optical network.

Through the use of wavelength selection devices such as optical wavelength selectors, a WDM optical network enables dynamic change of the network configuration as well as the selection and reception of a desired WDM channel from WDM optical signal. In other words, WDM optical signal in which a plurality of WDM channels are multiplexed can be transmitted by an optical transmission medium such as optical fiber, and a WDM channel can be received from the WDM optical signal on the receiving side.

Optical band-pass filters such as fiber Fabry-Perot filters, acousto-optic filters, and dielectric interference filters have been used as optical wavelength selectors in the prior art, but these filters have been difficult to use because they require accurate control in analog amounts.

In a fiber Fabry-Perot filter, for example, the resonator length of the etalon must be accurately controlled using, for example, a piezoelectric actuator. An acousto-optic filter requires accurate control of the frequency of acoustic waves applied to waveguide using, for example, a voltage-controlled oscillator.

One example of a optical wavelength selector that overcomes the above-described problems combines a wavelength-division demultiplexer, an optical gate switch, and a wavelength-division multiplexer. In this optical wavelength selector, a desired wavelength can be selected by controlling digital values, i.e., the ON/OFF of optical gate switches.

A first example of the above-described optical wavelength selector of the prior art is next described with reference to FIG. 1. This optical wavelength selector is made up of one wavelength-division demultiplexer 20, four optical gate switches 40–43, and one wavelength-division multiplexer 70. Optical gate switches 40–43 are made up of semiconductor optical amplifiers which pass light when ON and cut off light when OFF.

This optical wavelength selector enables selection of any WDM channel from the WDM optical signal of four WDM channels $\lambda_0$–$\lambda_3$ by turning ON any one of optical gate switches 40–43 and turning OFF the remainder.

As the above-described optical wavelength selector, devices have been proposed that use an arrayed waveguide grating device (or a waveguide grating router) as wavelength-division demultiplexer 20 and wavelength-division multiplexer 70. Examples include the device described in M. Zirngibl et. al, "Digitally Tunable Channel Dropping Filter/Equalizer Based on Wavelength Grating Router and Optical Amplifier Integration" in IEEE (Insitute of Electrical and Electronics Engineers) Photonics Technology Letters, Vol. 6, No. 4, April 1994, p. 513.

However, the above-described optical wavelength selector of the prior art has a drawback, that it outputs a plurality of WDM channels from one output port when selecting a WDM channel group, whereas a WDM channel group may be allotted to each node in a WDM optical network, which is an optical communication system, in order to increase the transmission capacity per node.

A prior-art example of the above-described WDM optical network is next described with reference to FIG. 2. In this WDM optical network, each node is provided with four optical transmitters, four optical wavelength selectors, and four optical receivers. For example, node 1 is provided with optical transmitters 110–113, optical wavelength selectors 140–143, and optical receivers 150–153.

Optical transmitters 110–113 in node 1 transmits WDM channels $\lambda_0$, $\lambda_1$, $\lambda_2$, and $\lambda_3$. Optical transmitters 210–213 in node 2 transmits WDM channels $\lambda_4$, $\lambda_5$, $\lambda_6$, and $\lambda_7$. Optical transmitters 310–313 in node 3 transmits WDM channels $\lambda_8$, $\lambda_9$, $\lambda_{10}$, and $\lambda_{11}$. Optical transmitters 410–413 in node 4 transmits WDM channels $\lambda_{12}$, $\lambda_{13}$, $\lambda_{14}$, and $\lambda_{15}$.

The WDM channels $\lambda_0$–$\lambda_{15}$ transmitted from the sixteen optical transmitters 110–113, 210–213, 310–313, and 410–413 pass by way of optical fibers 120–123, 220–223, 320–323, and 420–423, which serve as the optical transmission medium, and are combined by star coupler 100. This combined light is outputted to all of optical fibers 130–133, 230–233, 330–333, and 430–433.

Upon receiving a signal transmitted from, for example, node 1, each node selects and receives WDM channels $\lambda_0$, $\lambda_1$, $\lambda_2$, and $\lambda_3$, and upon receiving a signal transmitted from node 2, selects and receives WDM channels $\lambda_4$, $\lambda_5$, $\lambda_6$, and $\lambda_7$. If data are transmitted from node 1 to node 2, WDM channels $\lambda_0$, $\lambda_1$, $\lambda_2$, and $\lambda_3$ are each selected by optical wavelength selectors 240, 241, 242, and 243 of node 2.

In this WDM optical network, four optical transmitters, four optical wavelength selectors, and four optical receivers are required at every node, and as a result, the cost for each node is approximately four times the cost for a case in which one WDM channel is assigned to each node.

In other words, when using an optical wavelength selector of the prior art in a WDM optical network configured as shown in FIG. 2, there is the problem that the cost per node increases in proportional to the number of WDM channels included in each WDM channel group.

Moreover, in the optical wavelength selector of the first example of the prior art shown in FIG. 1, the number of optical gate switches 40–43 required is equal to the number of WDM channels.

In the above-described example of the prior art, four optical gate switches 40–43 are required because four WDM channels are multiplexed. Similarly, the multiplexing of 32 WDM channels calls for 32 optical gate switches.

Optical gate switches are active elements that consume electrical power to operate, and increasing the number of optical gate switches is therefore disadvantageous due to the accompanying increases in both the scale of the device and power consumption.

An optical wavelength selector developed with the object of solving the above-described problem is disclosed by Y. Tsuchikawa and Y. Inoue in Electronics Letters (Vol. 31, No. 23, November 1995, pp. 2029–2030).

The art disclosed in this paper is next described as the second example of an optical wavelength selector of the prior art with reference to FIG. 3. This optical wavelength selector is made up of one optical splitter 20; four optical gate switches 40–43, one optical wavelength router 60; eight optical gate switches 400–407, and one optical combiner 470.

This optical wavelength selector can select any WDM channel from WDM optical signal in which 32 WDM channels $\lambda_0$–$\lambda_{31}$ are multiplexed.

In brief, turning ON one of the four optical gate switches 40–43 of the first stage selects eight specific WDM channels from the 32 WDM channels $\lambda_0$–$\lambda_{31}$. Then, turning ON one of the eight optical gate switch 400–407 of the second stage selects one WDM channel from these eight WDM channel.

The WDM channels which passes from each input ports to each output ports of the above-described optical wavelength router 60 is as shown in Table 1 below.

TABLE 1

| INPUT | OUTPUT | | | | | | | |
|---|---|---|---|---|---|---|---|---|
| | o0 | o1 | o2 | o3 | o4 | o5 | o6 | o7 |
| i0 | $\lambda 0$ | $\lambda 1$ | $\lambda 2$ | $\lambda 3$ | $\lambda 4$ | $\lambda 5$ | $\lambda 6$ | $\lambda 7$ |
| i1 | $\lambda 8$ | $\lambda 9$ | $\lambda 10$ | $\lambda 11$ | $\lambda 12$ | $\lambda 13$ | $\lambda 14$ | $\lambda 15$ |
| i2 | $\lambda 16$ | $\lambda 17$ | $\lambda 18$ | $\lambda 19$ | $\lambda 20$ | $\lambda 21$ | $\lambda 22$ | $\lambda 23$ |
| i3 | $\lambda 24$ | $\lambda 25$ | $\lambda 26$ | $\lambda 27$ | $\lambda 28$ | $\lambda 29$ | $\lambda 30$ | $\lambda 31$ |

The above-described optical wavelength selector enables selection of one WDM channel from 32 WDM channels using 12 optical gate switches 40 by arranging optical gate switches 40 in two stages of four and eight.

In the above-described optical wavelength selector, however, optical splitter 20 carries out 1×4 branching, which gives rise to a minimum loss of 6 dB. Optical combiner 470 furthermore carries out 8×1 combining, which gives rise to an additional minimum loss of 9 dB.

As a result, the intensity of the one optical signal outputted by the above-described optical wavelength selector tends to be inadequate. If the above-described optical wavelength selector is used in a WDM optical network, the received intensity may be inadequate as described above and therefore cause errors in communication.

In addition, although the above-described optical wavelength selector enables a reduction in the number of optical gate switches 40, further reductions are hoped for.

SUMMARY OF THE INVENTION

The object of the present invention is to provide an optical wavelength selector that allows a reduction in the number of optical wavelength selectors used in a WDM optical network, an optical wavelength selector that allows a reduction in the number of optical gate switches, an optical wavelength selector that allows a reduction of loss in the optical signal, and a WDM optical network that allows a reduction in the number of WDM channels of the employed WDM optical signal.

An optical wavelength selector according to the present invention is provided with a wavelength-division demultiplexer, n optical gate switches, and an optical wavelength router.

The wavelength-division demultiplexer inputs WDM optical signal, in which m×n (m and n each being any natural number) WDM channels are multiplexed, from one input port, then separates the WDM optical signal into n WDM channel groups, and outputs each of these WDM channel groups from one of n output ports.

Each of the n optical gate switches is connected to a respective output port of the n output ports of the wavelength-division demultiplexer. The optical gate switches either let pass or cut off the WDM channel groups.

Each of the n input ports of the optical wavelength router is connected to a respective optical gate switch of the n optical gate switches. The optical wavelength router separates the inputted WDM channel group into m WDM channels, and outputs these WDM channels from m output ports.

Turning ON and OFF the optical gate switches enables the easy selection of one WDM channel group from n WDM channel groups each made up of m WDM channels. The m WDM channels are then each outputted from differing output ports, thereby allowing direct reception of these WDM channels by optical receivers without the interposition of an optical filter or other component.

Thus, the use of the optical wavelength selector of this invention enables a simplification in the configuration of a WDM optical network, which is, for example, an optical communication system.

Moreover, the WDM optical signal in which m×n WDM channels are multiplexed has n WDM channel groups, in which m WDM channels are multiplexed.

The above-described optical wavelength selector separates WDM optical signal into WDM channel groups by means of the transmission characteristic of the wavelength-division demultiplexer and optical wavelength router, and outputs m WDM channels. Accordingly, m WDM channels can be extracted from a particular WDM optical signal by conferring a prescribed transmission characteristic to the wavelength-division demultiplexer and optical wavelength router.

For example, when the (a+1)th (where (a+1) is any natural number from 1 to n) WDM channel group $\{\lambda_{a0}, \lambda_{a1}, \lambda_{a2}, \ldots, \lambda_{am-2}, \lambda_{am-1}\}$ of WDM optical signal satisfies the relation "$\lambda_{0b} - \lambda_{0b-1} = \lambda_{ab} - \lambda_{ab-1}$" with respect to any natural number b from 1 to m, the WDM optical signal can be divided into n WDM channel groups, and WDM channel group that passes through the optical gate switch can then be divided into m WDM channels, and outputted.

In such a case, an optical wavelength router can be formed from one arrayed waveguide grating device, thereby enabling a simplification of the construction of an optical wavelength selector.

As another invention of the above-described optical wavelength selector, WDM optical signal, in which the m WDM channels belonging to each WDM channel group are lined up continuously along the wavelength axis and the wavelength spacing between each WDM channel groups is equal, is separated into n WDM channel groups, and the WDM channel group that passes through the optical gate switch is then divided into m WDM channels, and outputted.

Alternatively, WDM optical signal, in which the m WDM channels belonging to each WDM channel group are lined up so as to have periodicity for every n WDM channels along the wavelength axis, and moreover, in which the wavelength spacing of the m WDM channels is equal within each WDM channel group, is separated into n WDM channel groups, and the WDM channel group that passes through the optical gate switch is then separated into m WDM channels, and outputted.

In these cases, the wavelength-division demultiplexer or optical wavelength router can be realized at low cost by using a device having a periodic transmission characteristic. For example, a device such as an arrayed waveguide grating device can be employed. Such a device is generally easily procurable and has regular transmission characteristics, and use of such a device allows an improvement in the productivity of a optical wavelength selector.

In addition, in an optical wavelength selector provided with the above-described wavelength-division demultiplexer, a construction can be adopted in which the optical wavelength router is provided with an arrayed waveguide grating device. In such a case, an optical wavelength router having the required functions can be realized with a simple construction, and the construction of the optical wavelength selector can be correspondingly simplified.

The optical communication system of this invention is provided with a WDM optical signal transmitter, an optical transmission medium, an optical wavelength selector of the present invention, and m optical receivers.

The WDM optical signal transmitter outputs WDM optical signal in which m×n WDM channels are multiplexed. The optical transmission medium transmits the WDM optical signal outputted by the WDM optical signal transmitter as far as the optical wavelength selector.

This optical wavelength selector separates the inputted WDM optical signal into n WDM channel groups, one beam for every WDM channel group, and then outputs the m beams of one WDM channel group, one beam for each WDM channel. The m optical receivers each receive a respective beam of the m WDM channels, one beam for every WDM channels, that are outputted from the optical wavelength selector.

Accordingly, the optical communication system of this invention can achieve optical communication by means of WDM optical signal. Moreover, the number of optical wavelength selectors can be reduced, thereby allowing a reduction in the overall scale of the system as well as an improvement in productivity.

As an example of the WDM optical signal handled by the above-described optical communication system, the (a+1)th (where (a+1) is an arbitrary natural number from 1 to n) WDM channel group $\{\lambda_{a0}, \lambda_{a1}, \lambda_{a2}, \ldots, \lambda_{am-2}, \lambda_{am-1}\}$ may satisfy the relation "$\lambda_{0b}31\ \lambda_{0b-1}=\lambda_{ab}-\lambda_{ab-1}$" with respect to b, which is an arbitrary natural number from 1 to m.

In this case, the optical wavelength router of the optical wavelength selector can be formed from one arrayed waveguide grating device, thereby enabling a simplification of the construction of the optical wavelength selector, and as result, enabling a reduction in the scale of the system overall and an improvement in productivity.

In addition, the above-described WDM optical signal can be light in which the m WDM channels belonging to each WDM channel group are lined up continuously along the wavelength axis, and moreover, in which the wavelength spacing between each WDM channel groups is equal.

In this case, the wavelength-division demultiplexer and optical wavelength router of the optical wavelength selector can be realized at low cost by utilizing a device having periodic transmission characteristic. For example, an arrayed waveguide grating device can be employed that is generally easily procurable and has a regular transmission characteristic, thereby enabling an improvement in the productivity of the optical wavelength selector as well as of the overall system.

The m WDM channels belonging to each WDM channel group can be lined up along the axis of wavelength so as to have periodicity for each n WDM channels, and moreover, the wavelength spacing of the m WDM channels within each WDM channel group can be made equal.

In this case, the wavelength-division demultiplexer and optical wavelength router of the optical wavelength selector can be realized at low cost by utilizing a device having periodic transmission characteristic. For example, an arrayed waveguide grating device that is generally easily procurable and which has regular transmission characteristics can be employed, thereby enabling an improvement in the productivity of the optical wavelength selector and of the overall system.

In addition, the optical wavelength selector of the second invention is provided with an optical splitter (or wavelength-division demultiplexer), $k_0$ (where $k_0$ as well as $k_i$ are arbitrary natural numbers) optical gate switches, optical wavelength routers in p stages (where p is any natural number), $k_i$ p-stage optical gate switches, and an optical combiner (or wavelength-division multiplexer).

Here, each of the numbers $k_0, k_1, \ldots k_i, \ldots k_p$ can be any of two, three, or four. Alternatively, p stages may be a plurality of stages.

For example, if p stages is one stage, an optical wavelength router and $k_1$ optical gate switches are positioned in the space between the $k_0$ optical gate switches and the optical combiner.

If, on the other hand, p stages is two stages, the optical wavelength router of the first stage, the $k_1$ optical gate switches of the first stage, the optical wavelength router of the second stage, and the $k_2$ optical gate switches of the second stage are positioned in order in the space between the $k_0$ optical gate switches and the optical combiner.

The optical splitter inputs from one input port WDM optical signal in which the light of $k_0 \times k_1 \times \ldots \times k_i \times \ldots k_p$ WDM channels are multiplexed, whereupon the optical splitter separates the WDM optical signal into $k_0$ beams. The $k_0$ optical gate switches either let pass or cut off the $k_0$ beams of WDM optical signal inputted from the optical splitter and output to the optical wavelength router of the first stage.

The optical wavelength router of the pth stage separates and outputs the WDM optical signal inputted from one optical gate switch of the preceding stage (the (p−1)th stage) into $k_i$ beams, one beam for each of the prescribed WDM channel groups. The $k_i$ optical gate switches of the pth stage either let pass or cut off the WDM channel groups inputted from the optical wavelength router of the preceding stage ((p−1)th stage).

The optical combiner outputs the one WDM channel inputted from an optical gate switch of the preceding stage (pth stage) from one output port.

Essentially, turning ON one of the $k_0$ optical gate switches as well as turning ON only one optical gate switch in each stage for the $k_1 \ldots k_p$ optical gate switches enables the selection of a WDM channel from WDM optical signal in which $k_0 \times k_1 \times \ldots \times k_i \times \ldots \times k_p$ WDM channels are multiplexed.

If each of $k_0, k_1, \ldots k_i, \ldots k_p$ are any of two, three, or four, one of the multiplicity of wavelengths of WDM optical signal can be selected by a limited number of optical gate switches.

For example, if all of $k_0, k_1, \ldots k_i, \ldots k_p$ are x, one wavelength of $x^{p+1}$ wavelengths of WDM optical signal can be selected. In this case, the number of required optical gate switches is x(p+1).

Effecting selection of one of a multiplicity of wavelengths of WDM optical signal with a limited number of optical gate switches enables both a reduction in the scale and an improvement in the productivity of a optical wavelength selector, and in addition, allows a reduction in power consumption.

The invention further reduces the number of split waves of an optical splitter (or a wavelength-division demultiplexer) and the number of combined waves of an optical combiner (or wavelength-division multiplexer), whereby the optical wavelength selector of the present invention suffers less signal loss.

The optical communication system of the second invention is provided with S optical transmitter groups, S optical wave combining means, S optical splitters, W optical crossbar switches, W×S optical wavelength selectors, and W×S optical receivers.

The S optical transmitter groups are made up of W optical transmitters and transmit optical signals of W WDM channels.

The S optical wave combining means are made up of, for example, optical combiners or wavelength-division multiplexers. Each of the S optical combining means is connected to a respective optical transmitter group of the S optical transmitter groups, and these optical combining means combine and output the W WDM channels as a single beam of WDM optical signal.

Each of the S optical splitters is connected to a respective optical combining means of the S optical combining means, and these optical splitters separate the inputted WDM optical signal into W beams and output a beam from each of the W output ports.

Each of the S input ports of the W optical crossbar switches is connected to an optical splitter of the S optical splitters, and the WDM optical signal inputted from one of the S input ports is simultaneously outputted from the 1-S output ports.

The W×S optical wavelength selectors are each connected to a respective output port of the S output ports of the W optical crossbar switches, and an optical signal of one WDM channel is selected and outputted from the inputted WDM optical signal.

The W×S optical receivers are each connected to a respective optical wavelength selector of the W×S optical wavelength selectors, and the inputted optical signal of one WDM channel is converted to an electrical signal.

The second optical wavelength selector of the present invention can be applied as the optical wavelength selector of the optical communication system of the present invention of the above-described construction.

The optical communication system of this invention therefore can realize optical communication by WDM optical signal, and, moreover, a reduction in the number of optical gate switches, thereby enabling such benefits as a reduction in the scale of the overall system, an improvement in productivity, and a reduction in power consumption.

The above and other objects, features, and advantages of the present invention will become apparent from the following description with references to the accompanying drawings which illustrate examples of the present invention.

DETAILED DESCRIPTION OF THE PREFERRED EMBODIMENTS

Explanation of the first embodiment of the present invention will first be presented with reference to FIGS. 4 to 7.

Figure 4:
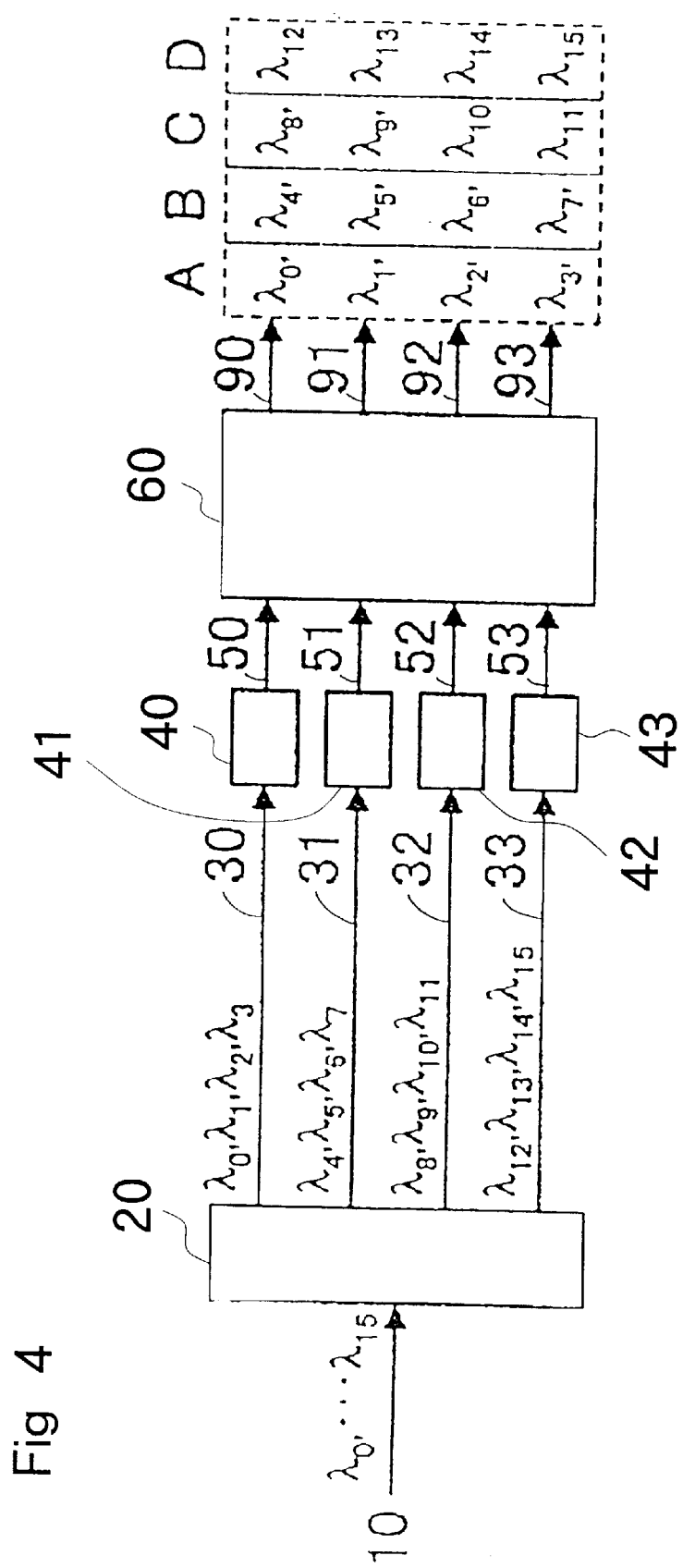
FIG. 4 is a block diagram showing the construction of the overall configuration of an optical wavelength selector according to the first embodiment of the present invention.

As shown in FIG. 4, the optical wavelength selector of this embodiment is provided with one optical fiber 10. WDM optical signal is inputted to this optical fiber 10.

This WDM optical signal is the combination of n (in this case 4) WDM channel groups, each WDM channel group being the multiplexed light of m (in this case, 4) WDM channels.

The one input port of wavelength-division demultiplexer 20 is connected to optical fiber 10. The four output ports of wavelength-division demultiplexer 20 are each connected to one of four optical gate switches 40–43, which are semiconductor Optical Amplifiers, by means of four optical fibers 30–33, respectively.

These optical gate switches 40–43 are connected to the four input ports of optical wavelength router 60 by means of four optical fibers 50–53, respectively. The four output ports of optical wavelength router 60 are in turn each connected to one of four optical fibers 90–93, respectively.

Regarding the WDM channels $\lambda_0, \lambda_1, \ldots, \lambda_{15}$ contained in the WDM optical signal inputted to the optical wavelength selector of this embodiment, wavelength of WDM channel $\lambda_0$ may be, for example, 1540 nm, and the remaining wavelengths may each increase by 1 nm, $\lambda_{15}$ being equal to 1555 nm.

Of these WDM channels $\lambda_0, \lambda_1, \lambda_2$, and $\lambda_3$ is identified as WDM channel group A. WDM channels $\lambda_4, \lambda_5, \lambda_6$, and $\lambda_7$ are identified as WDM channel group B. WDM channels $\lambda_8, \lambda_9, \lambda_{10}$, and $\lambda_{11}$ are identified as WDM channel group C. WDM channels $\lambda_{12}, \lambda_{13}, \lambda_{14}$, and $\lambda_{15}$ are identified as WDM channel group D.

Figure 5:
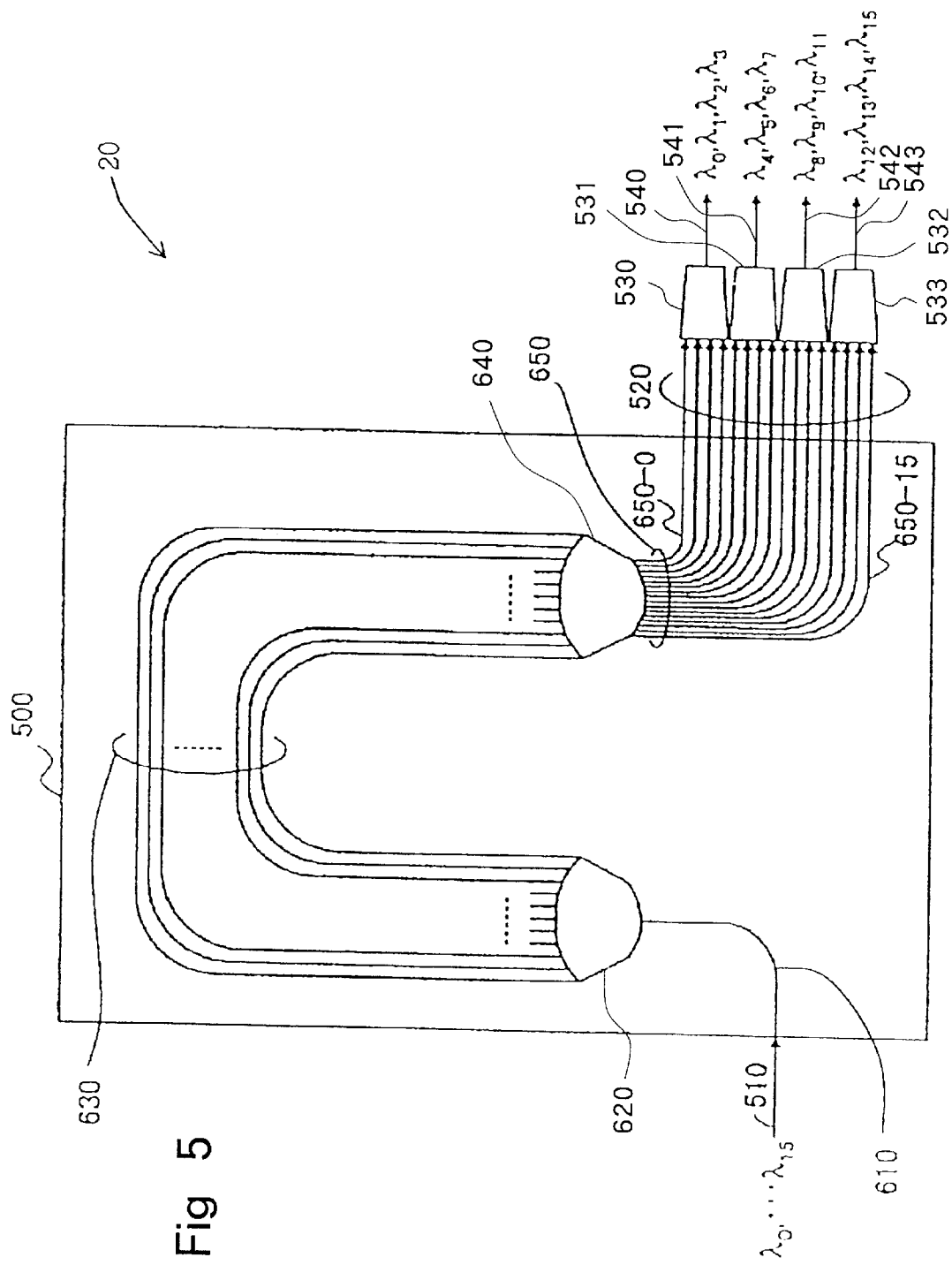
FIG. 5 is a block diagram showing a wavelength-division demultiplexer in the first embodiment.

As shown in FIG. 5, wavelength-division demultiplexer 20 is made up of input port 510, arrayed waveguide grating device 500, four wavelength-division multiplexers 530–533, and four output ports 540–543.

Input port 510 is made up of an optical fiber. Arrayed waveguide grating device 500 is a silica waveguide device fabricated on a silicon substrate. The four wavelength-division multiplexers 530–533 are made from optical fiber and are connected to arrayed waveguide grating device 500 by means of sixteen optical fibers 520. The four output ports 540–543 are also made of optical fibers.

Arrayed waveguide grating device 500 is made up of one input waveguide 610, slab waveguide 620, arrayed waveguide grating 630, slab waveguide 640, and sixteen output waveguides 650.

As an example, WDM optical signal having WDM channels $\lambda_0, \lambda_1, \ldots, \lambda_{15}$ is inputted from input port 510 to input waveguide 610 of arrayed waveguide grating device 500. This WDM optical signal then passes through slab waveguide 620, is propagated through arrayed waveguide grating 630, and then inputted to slab waveguide 640.

In this slab waveguide 640, WDM channel $\lambda_0$ is focused on output waveguide 650-0. Similarly, WDM channels $\lambda_1, \lambda_2, \ldots, \lambda_{15}$ are focused on output waveguides 650-1, 650-2, . . . , 650-15, respectively.

These output waveguides 650-0, 650-1, 650-2, and 650-3 are connected to the input ports of wavelength-division multiplexer 530 by means of optical fibers 520, whereby WDM channels $\lambda_0, \lambda_1, \lambda_2$, and $\lambda_3$ are outputted from output port 540.

In the same way, the WDM channels $\lambda_4, \lambda_5, \lambda_6$, and $\lambda_7$ are combined by wavelength-division multiplexer 531 and outputted from output port 541. The WDM channels $\lambda_8, \lambda_9, \lambda_{10}$, and $\lambda_{11}$ are combined by wavelength-division multiplexer 532 and outputted from output port 542. The WDM channels $\lambda_{12}, \lambda_{13}, \lambda_{14}$, and $\lambda_{15}$ are combined by wavelength-division multiplexer 533 and outputted from output port 543.

Drive circuits (not shown in the figure) are connected to optical gate switches 40–43, and currents are individually inputted from these drive circuits to each of optical gate switches 40–43.

The gain of semiconductor optical amplifier used as optical gate switches 40–43 ranges from 0 dB when the current is 30 mA to −60 dB when the current is 0 mA. Accordingly, the semiconductor optical amplifier operate as optical gate switches and turn ON when the current is 30 mA and turn OFF when the current is 0 mA. The drive circuits output currents to the four optical gate switches 40–43 such that only one switch turns ON at a time.

Figure 6:
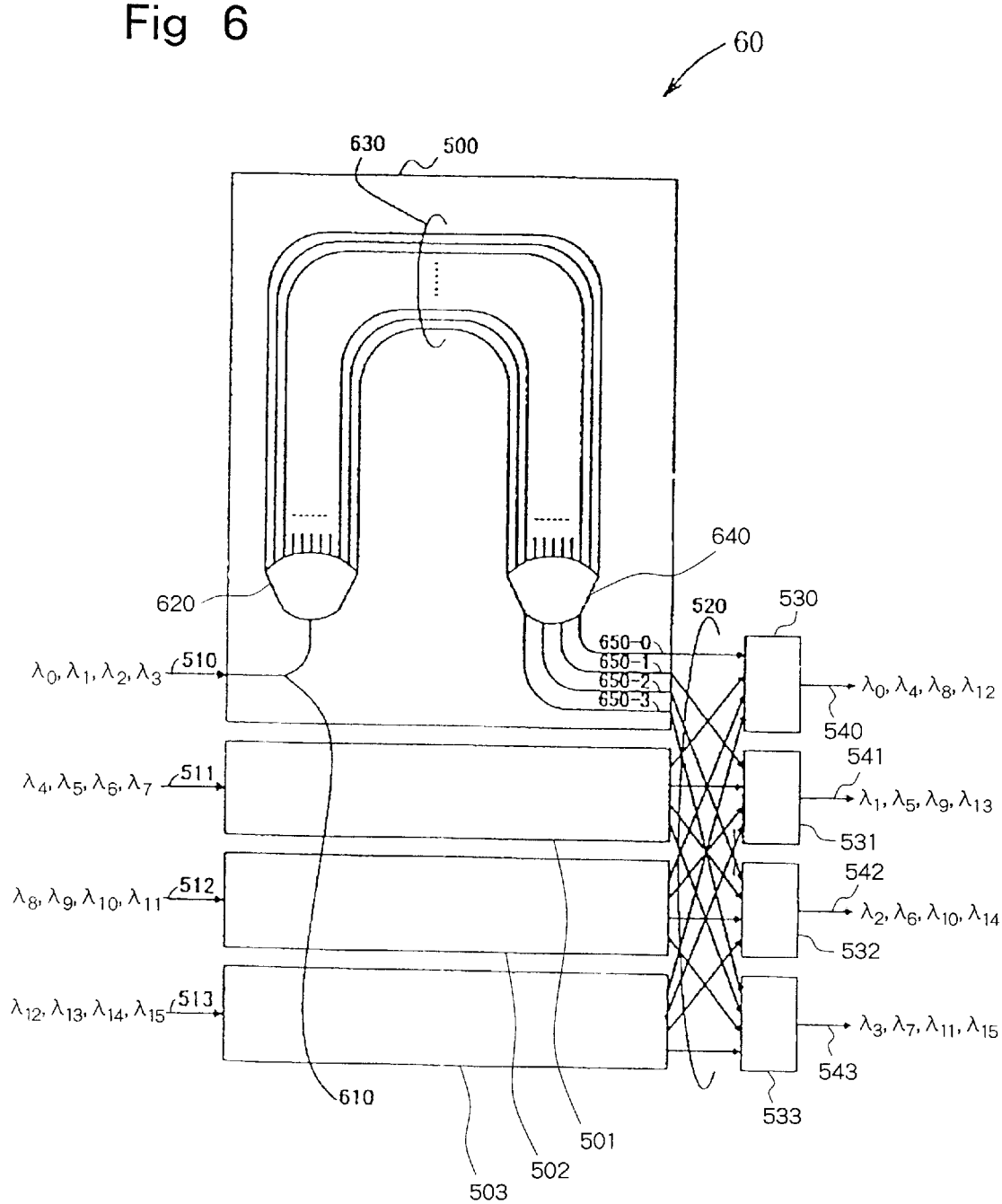
FIG. 6 is a block diagram showing an optical wavelength router in the first embodiment.

As shown in FIG. 6, optical wavelength router 60 is made up of four input ports 510–513 that are made of optical fiber, four arrayed waveguide grating devices 500–503 that are made of silica glass, four wavelength-division multiplexers 530–533 that are made of optical fiber, and four output ports 540–543 that are made of optical fiber. Wavelength-division multiplexers 530–533 are connected to each of the four arrayed waveguide grating devices 500–503 by means of sixteen optical fibers 520.

Arrayed waveguide grating devices 500–503 are each made up of one input waveguide 610, slab waveguide 620, arrayed waveguide grating 630, slab waveguide 640, and four output waveguides 650. The four arrayed waveguide grating devices 500–503 are each provided with four output waveguides 650. Of this total of sixteen output waveguides 650, four are distributed to each of the four wavelength-division multiplexers 530–533.

For example, the four WDM channels $\lambda_0, \lambda_1, \lambda_2$, and $\lambda_3$ are inputted from input port 510 to input waveguide 610 of arrayed waveguide grating device 500, whereupon these WDM channels pass by way of slab waveguide 620, are propagated through arrayed waveguide grating 630, and are then inputted to slab waveguide 640.

In this slab waveguide 640, WDM channel $\lambda_0$ is focused on output waveguide 650-0 and WDM channels $\lambda_1, \lambda_2$, and $\lambda_3$ are similarly focused on output waveguides 650-1, 650-2, and 650-3.

Output waveguides 650-0, 650-1, 650-2, and 650-3 are each connected to an input port of wavelength-division multiplexers 530, 531, 532, and 533 by means of optical fibers 520, whereby the WDM channels $\lambda_0, \lambda_1, \lambda_2$, and $\lambda_3$ are each outputted from output ports 540, 541, 542, and 543, respectively.

In the same way, when WDM channels $\lambda_4, \lambda_5, \lambda_6$, and $\lambda_7$ are inputted from optical fiber 511, these WDM channels are each focused on output waveguides 650-0, 650-1, 650-2, and 650-3, and outputted from output ports 540, 541, 542, and 543, respectively.

When the four WDM channels $\lambda_8, \lambda_9, \lambda_{10}$, and $\lambda_{11}$ are inputted from optical fiber 512, these WDM channels are each focused on output waveguides 650-0, 650-1, 650-2, and 650-3, and outputted from output ports 540, 541, 542, and 543, respectively.

When the four WDM channels $\lambda_{12}, \lambda_{13}, \lambda_{14}$, and $\lambda_{15}$ are inputted from optical fiber 513, these WDM channels are each focused on output waveguides 650-0, 650-1, 650-2, and 650-3, and outputted from output ports 540, 541, 542, and 543, respectively.

The operation of the optical wavelength selector of this embodiment in the above-described construction is described in sequence hereinbelow. First, the sixteen-channel WDM optical signal inputted from optical fiber 10 is separated into four WDM channel groups A, B, C, and D, by means of wavelength-division demultiplexer 20. The WDM channel group A is propagated through optical fiber 30.

In the same way, the WDM channel group B is propagated through optical fiber 31; the WDM channel group C is propagated through optical fiber 32, and the WDM channel group D is propagated through optical fiber 33.

Next, if only first optical gate switch 40 is turned ON and the other optical gate switches 41–43 are turned OFF, only the WDM channels $\lambda_0$, $\lambda_1$, $\lambda_2$, and $\lambda_3$, i.e., the WDM channel group A, is inputted to optical wavelength router 60. Optical wavelength router 60 separates the inputted WDM channel group into 4 WDM channels and outputs them.

Next, WDM channel $\lambda_0$ is outputted from optical fiber 90, WDM channel $\lambda_1$ is outputted from optical fiber 91, WDM channel $\lambda_2$ is outputted from optical fiber 92, and WDM channel $\lambda_3$ is outputted from optical fiber 93.

When the second optical gate switch 41 is turned ON and the other optical gate switches are all turned OFF, only the WDM channels $\lambda_4$, $\lambda_5$, $\lambda_6$, and $\lambda_7$, i.e., the WDM channel group B, is inputted to optical wavelength router 60 from optical fiber 51. Accordingly, WDM channel $\lambda_4$ is outputted from optical fiber 90, WDM channel $\lambda_5$ is outputted from optical fiber 91, WDM channel $\lambda_6$ is outputted from optical fiber 92, and WDM channel $\lambda_7$ is outputted from optical fiber 93.

In the same way, when only optical gate switch 42 is turned ON, the WDM channel group C is outputted from optical fibers 90–93. When only optical gate switch 43 is turned ON, the WDM channel group D is outputted from optical fibers 90–93.

The above-described optical wavelength selector of the present embodiment can select out of the WDM channel groups A, B, C, and D from the inputted WDM optical signal by turning ON and OFF optical gate switches 40–43. The selected WDM channel group is finally outputted from optical fibers 90–93, the one WDM channel being outputted from each fiber. Accordingly, these WDM channels can be received directly by optical receivers without passage through an optical filter or other component.

Figure 1:
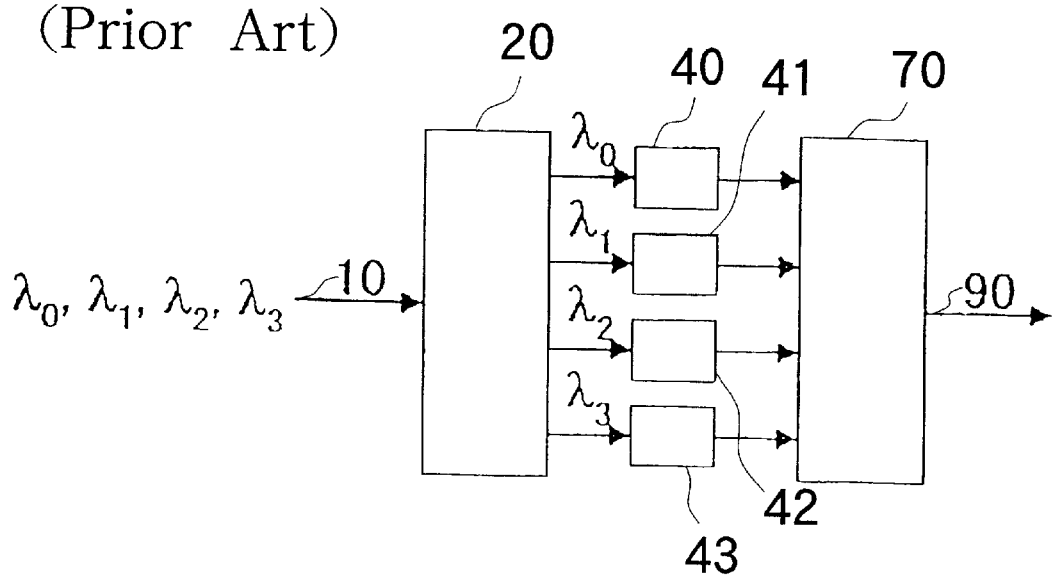
FIG. 1 is a block diagram showing the construction of an example of a optical wavelength selector of the prior art.
Figure 2:
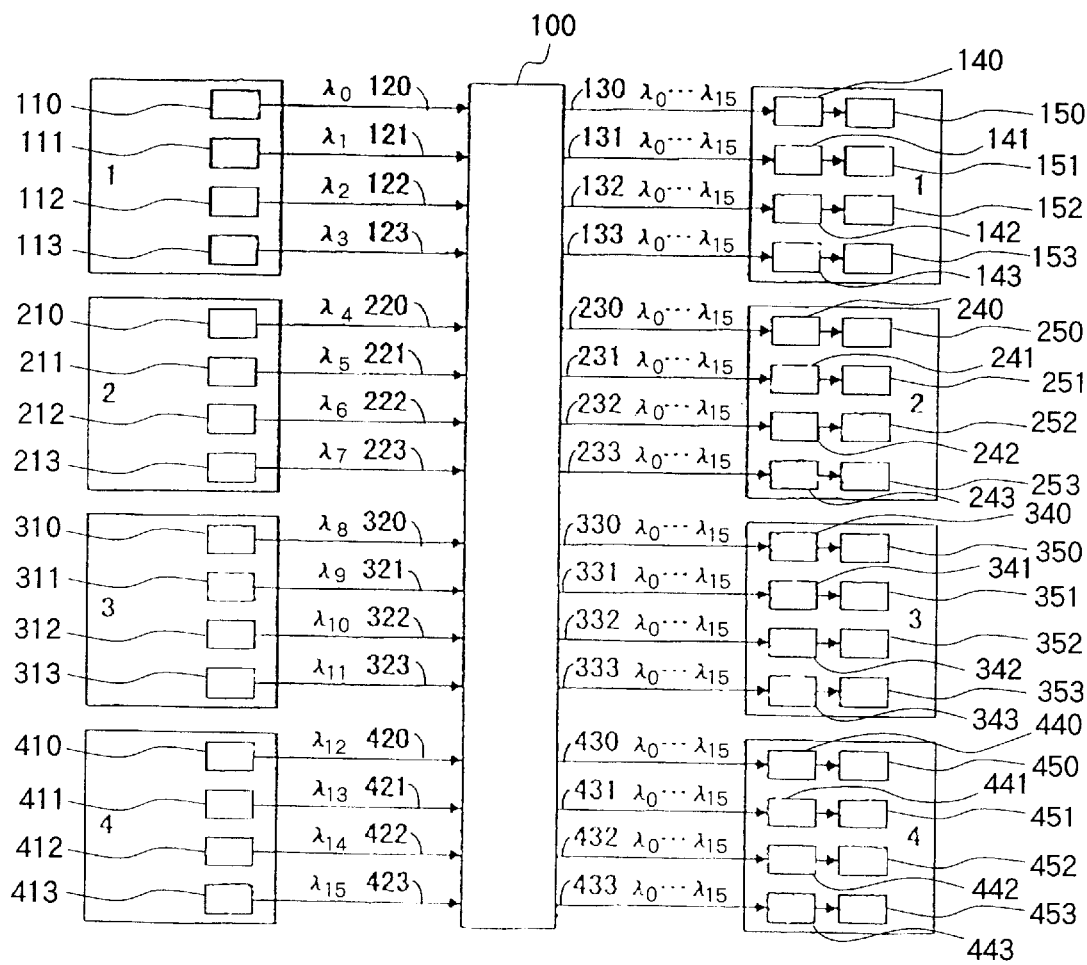
FIG. 2 is a block diagram showing the construction of a WDM optical network, which is an optical communication system of the prior art.
Figure 3:
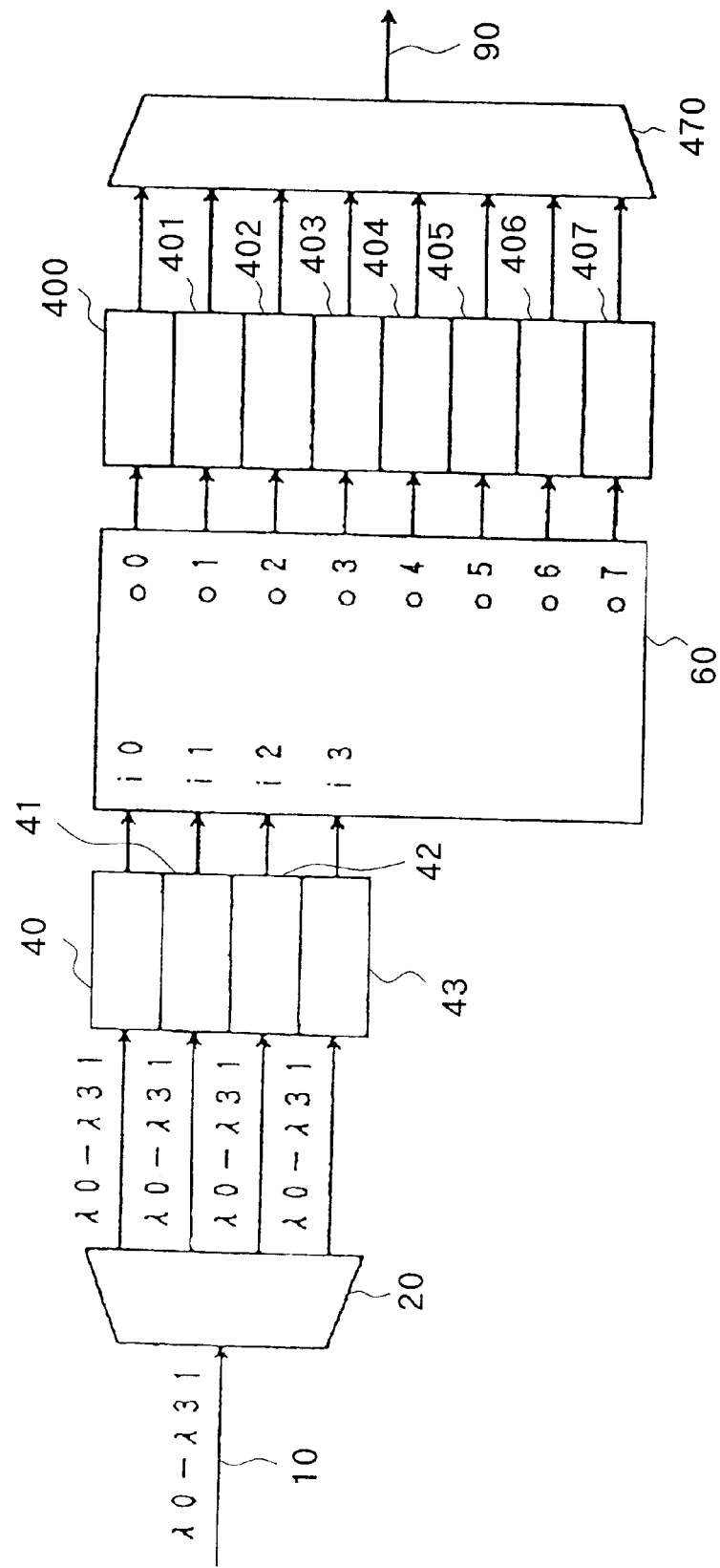
FIG. 3 is a block diagram showing the construction of a second example of an optical wavelength selector of the prior art.
Figure 7:
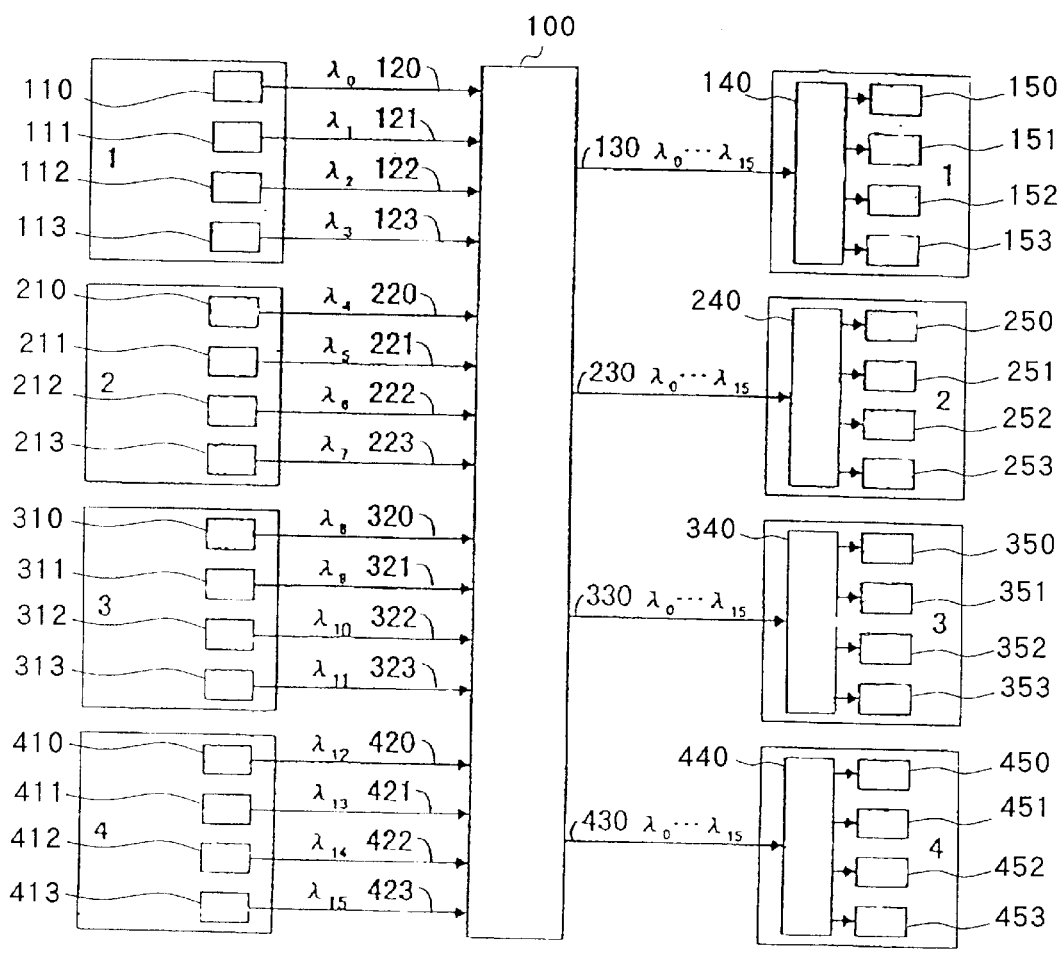
FIG. 7 is a block diagram showing a WDM optical network, which is an optical communication system, in the first embodiment.

Accordingly, the configuration of the WDM optical network shown as an example of the prior art in FIG. 2 can be simplified as shown in FIG. 7 by using the optical wavelength selector of this embodiment. In this WDM optical network, which is the optical communication system shown in FIG. 7, each node is provided with four optical transmitters and four optical receivers but only one optical wavelength selector.

For example, node 1 is provided with optical transmitters 110–113, optical wavelength selector 140, and optical receivers 150–153. Optical transmitters of node 1 transmits WDM channels $\lambda_0$, $\lambda_1$, $\lambda_2$, and $\lambda_3$. Optical transmitters of node 2 transmits WDM channels $\lambda_4$, $\lambda_5$, $\lambda_6$, and $\lambda_7$. Optical transmitters of node 3 transmits WDM channels $\lambda_8$, $\lambda_9$, $\lambda_{10}$, and $\lambda_{11}$. Optical transmitters of node 4 transmits WDM channels $\lambda_{12}$, $\lambda_{13}$, $\lambda_{14}$, and $\lambda_{15}$.

The WDM channels $\lambda_0$–$\lambda_{15}$ transmitted from the sixteen optical transmitters 110–113, 210–213, 310–313, and 410–413 passes by way of the sixteen optical fibers 120–123, 220–223, 320–323, and 420–423, which are the optical transmission medium, and are combined by means of one star coupler 100. This combined light is outputted to four optical fibers 130, 230, 330, and 430, which are the optical transmission medium.

In brief, WDM optical signal is outputted to optical wavelength selectors 140, 240, 340, and 440 using the above-described components. Accordingly, if these optical wavelength selectors 140, 240, 340, and 440 output the WDM channel groups A, B, C, and D by wavelength, the plurality of WDM channels in these outputted WDM channel groups is directly received by optical receivers 150–153, 250–253, 350–353, and 450–453.

In the above-described WDM optical network, the number of optical fibers 130–133, 230–233, 330–333, and 430–433 and optical wavelength selectors 140–143, 240–243, 340–343, and 440–443 is only one-quarter that in the WDM optical network of FIG. 2, thereby affording a reduction in scale, an improvement in productivity, as well as a reduction in cost.

In addition, the number of branches on the output side in star coupler 100 is reduced from 16 to 4, thereby reducing the loss in optical power by a minimum of 6 dB.

The second embodiment of the present invention will next be described with reference to FIGS. 8 to 12.

Figure 8:
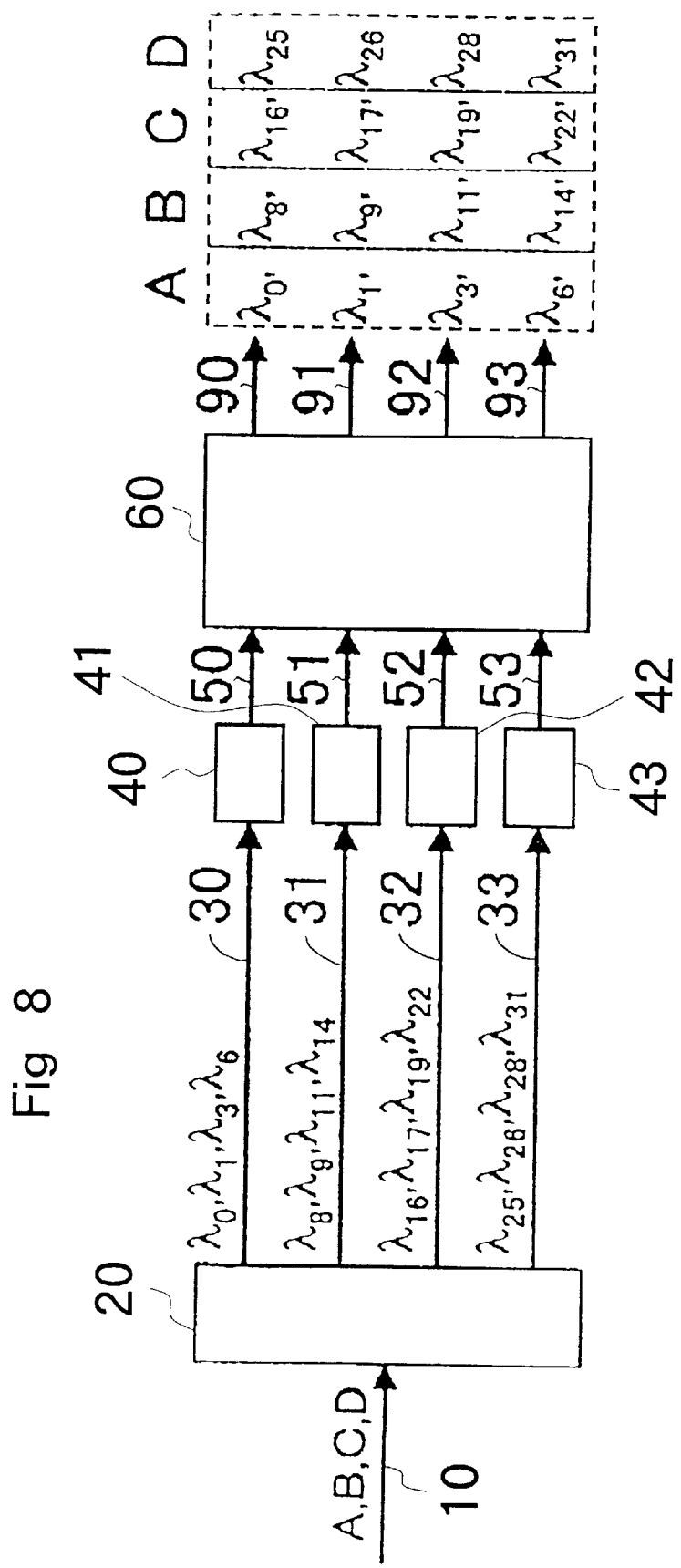
FIG. 8 is a block diagram showing an optical wavelength selector according to the second embodiment of the present invention.

First, as shown in FIG. 8, in the optical wavelength selector of this embodiment as well, optical fiber 10 is connected to the input port of wavelength-division demultiplexer 20, and the output ports of this wavelength-division demultiplexer 20 are connected to optical gate switches 40–43 by means of optical fibers 30–33. The output ports of these optical gate switches 40–43 are connected to the four input ports of optical wavelength router 60 by means of optical fibers 50–53, and the four output ports of this optical wavelength router 60 are connected to optical fibers 90–93.

The wavelength of WDM channel $\lambda_0$ of the WDM optical signal inputted to the optical wavelength selector of this embodiment is 1540 nm, and the remaining WDM channels $\lambda_0, \lambda_1, \ldots, \lambda_{31}$ of the WDM optical signal each increase in 1-nm increments, the wavelength of WDM channel $\lambda_{31}$ being 1571 nm.

Of these, WDM channels $\lambda_0$, $\lambda_1$, $\lambda_3$, and $\lambda_6$ make up WDM channel group A, WDM channels $\lambda_8$, $\lambda_9$, $\lambda_{11}$, and $\lambda_{14}$ make up WDM channel group B, WDM channels $\lambda_{16}$, $\lambda_{17}$, $\lambda_{19}$, and $\lambda_{22}$ make up WDM channel group C, and WDM channels $\lambda_{25}$, $\lambda_{26}$, $\lambda_{28}$, and $\lambda_{31}$ make up WDM channel group D. In other words, this WDM optical signal contains n (in this case, 4) WDM channel groups each made up of m (in this case, 4) WDM channels.

The (a+1)th (where (a+1) is any natural number from 1 to n) WDM channel group $\{\lambda_{a0}, \lambda_{a1}, \lambda_{a2}, \ldots, \lambda_{am-2}, \lambda_{am-1}\}$ then satisfies the relation "$\lambda_{0b}-\lambda_{0b-1}=\lambda_{ab}-\lambda_{ab-1}$" with respect to b, which is any natural number from 1 to m Since m and n are equal in this embodiment, and both m and n equal 4 in this case, a and b are each in the range from 0 to 3.

Figure 9:
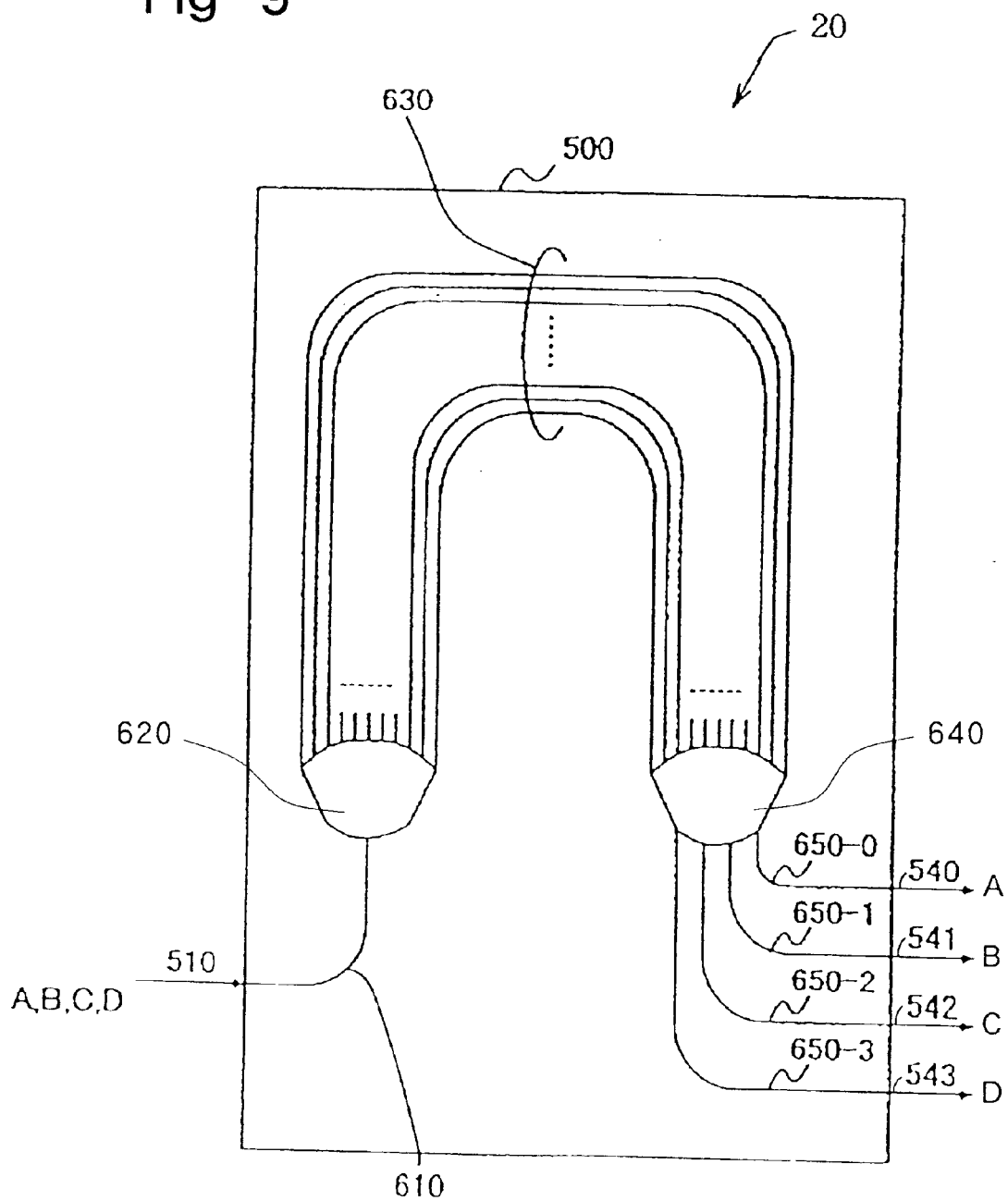
FIG. 9 is a block diagram showing a wavelength-division demultiplexer in the second embodiment.

As shown in FIG. 9, wavelength-division demultiplexer 20 is made up of input port 510 made of optical fiber, arrayed waveguide grating device 500 made of silica glass, and four output ports 540–543 made of optical fiber. Wavelength-division multiplexers 530–533 are omitted.

Arrayed waveguide grating device 500 is made up of one input waveguide 610, slab waveguide 620, arrayed waveguide grating 630, slab waveguide 640, and four output waveguides 650. These four output waveguides 650 are each directly connected to a respective one of the four output ports 540–543.

The light inputted from input port 510 to the input waveguide 610 of arrayed waveguide grating device 500 passes through slab waveguide 620 and is propagated through arrayed waveguide grating 630. The light is then focused on different positions according to wavelength in slab waveguide 640.

Figure 10:
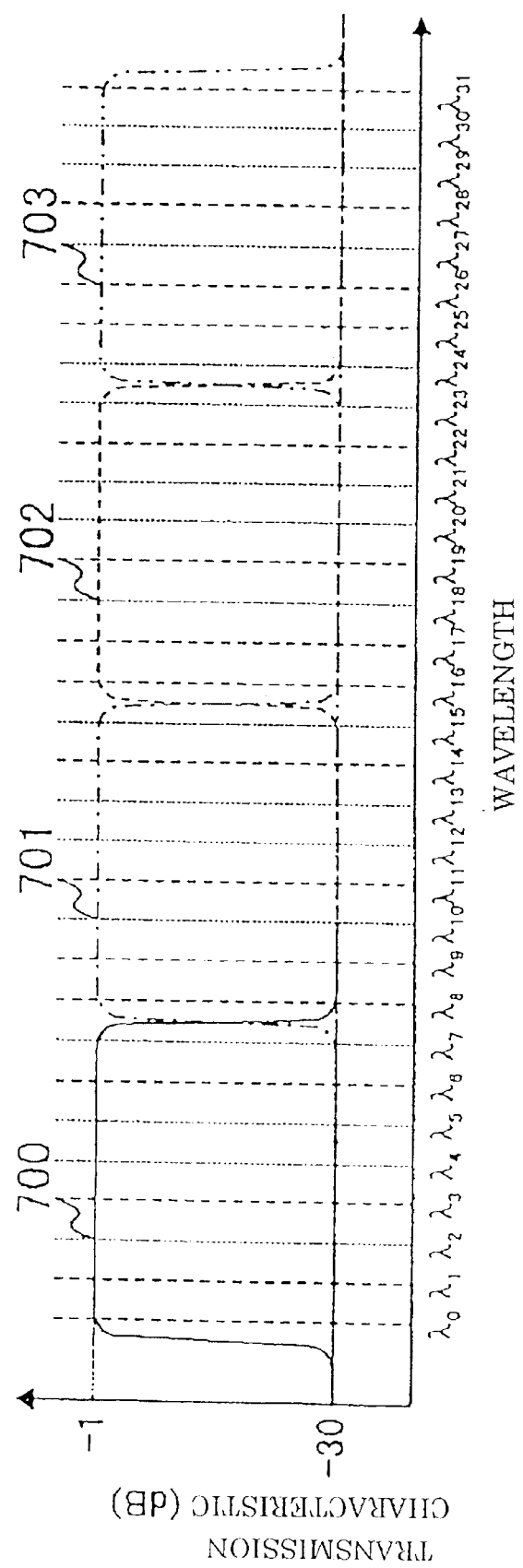
FIG. 10 is a graph showing the transmission characteristic of the wavelength-division demultiplexer in the second embodiment.

Wavelength-division demultiplexer 20 of the construction described hereinabove has a transmission characteristic such as shown in FIG. 10. The bandwidth of arrayed waveguide grating device 500 is 8 nm. The transmittance 700 from input port 510 to output port 540 is −1 dB for WDM channels $\lambda_0$–$\lambda_7$ and −30 dB for WDM channels $\lambda_8$–$\lambda_{31}$.

In the same way, transmittance 701 from input port 510 to output port 541 is −1 dB for WDM channels $\lambda_8$–$\lambda_{15}$ and −30 dB for the other WDM channels. Transmittance 702 from input port 510 to output port 542 is −1 dB for WDM channels $\lambda_{16}$–$\lambda_{23}$ and −30 dB for the other WDM channels. Transmittance 703 from input port 510 to output port 543 is −1 dB for WDM channels $\lambda_{24}$–$\lambda_{31}$ and −30 dB for the other WDM channels.

Accordingly, when the WDM channel groups A, B, C, and D are inputted from input port 510, the WDM channel group A are outputted to output port 540. The WDM channel group B are outputted to output port 541, the WDM channel group C are outputted to output port 542, and the WDM channel group D are outputted to output port 543.

Figure 11:
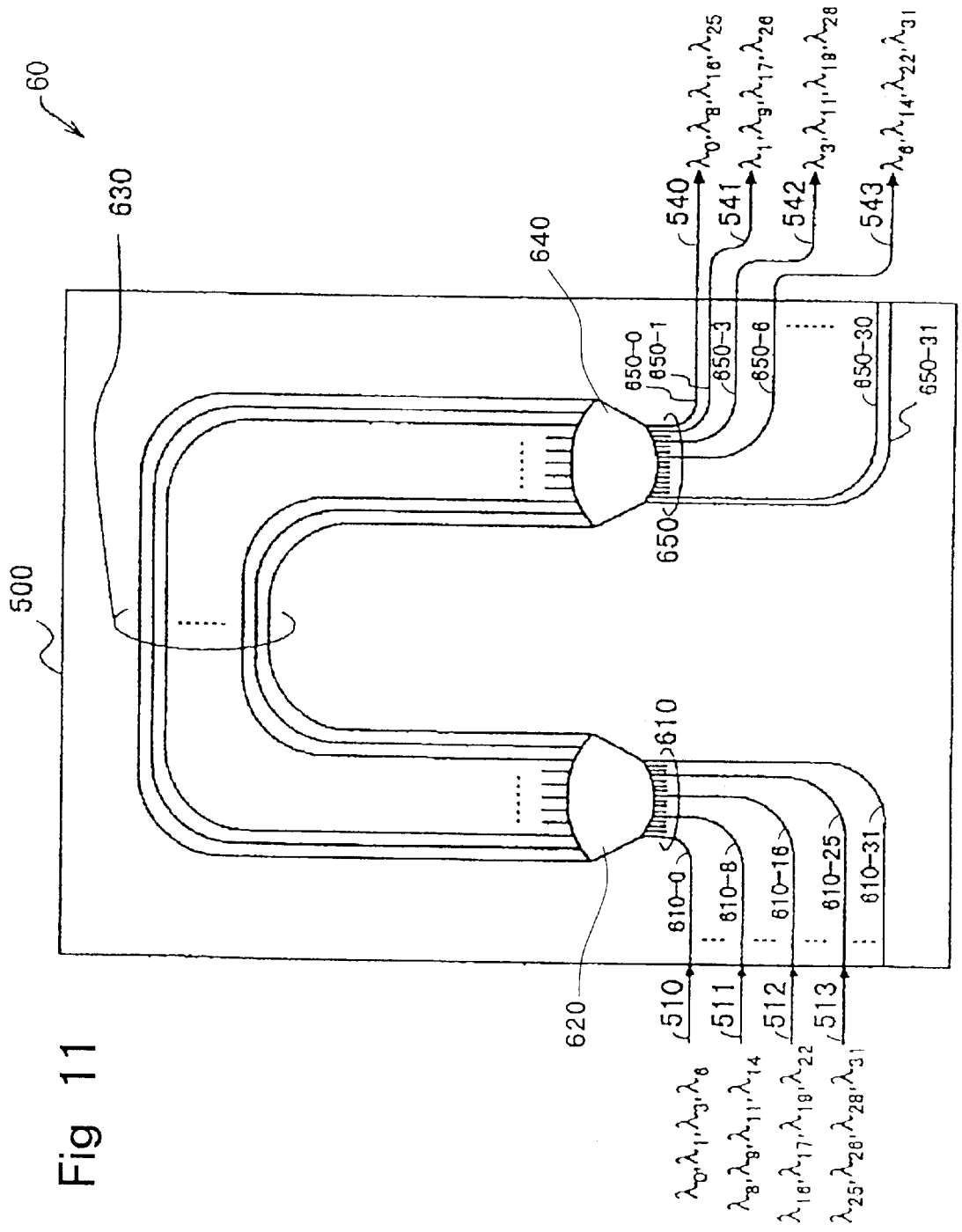
FIG. 11 is a block diagram showing an optical wavelength router in the second embodiment.

On the other hand, as shown in FIG. 11, optical wavelength router 60 is made up of four input ports 510–513 made of optical fiber, one arrayed waveguide grating device 500 made of silica glass, and four output ports 540–543 made of optical fiber. The four input ports 510–513 and output ports 540–543 are connected to one arrayed waveguide grating device 500. This arrayed waveguide grating device 500 is made up of 32 input waveguides 610, slab waveguide 620, arrayed waveguide grating 630, slab waveguide 640, and 32 output waveguides 650.

Input ports 510, 511, 512, and 513 are connected to input waveguides 610-0, 610-8, 610-16, and 610-25, respectively, of arrayed waveguide grating device 500. Output ports 540, 541, 542, and 543 are connected to output waveguides 650-0, 650-1, 650-3, and 650-6, respectively, of arrayed waveguide grating device 500.

Light inputted from input port 510 to input wave guide 610-0 of arrayed waveguide grating device 500 passes through slab waveguide 620 and is propagated through arrayed waveguide grating 630. The light is then focused on differing positions by wavelength in slab waveguide 640.

Figure 12:
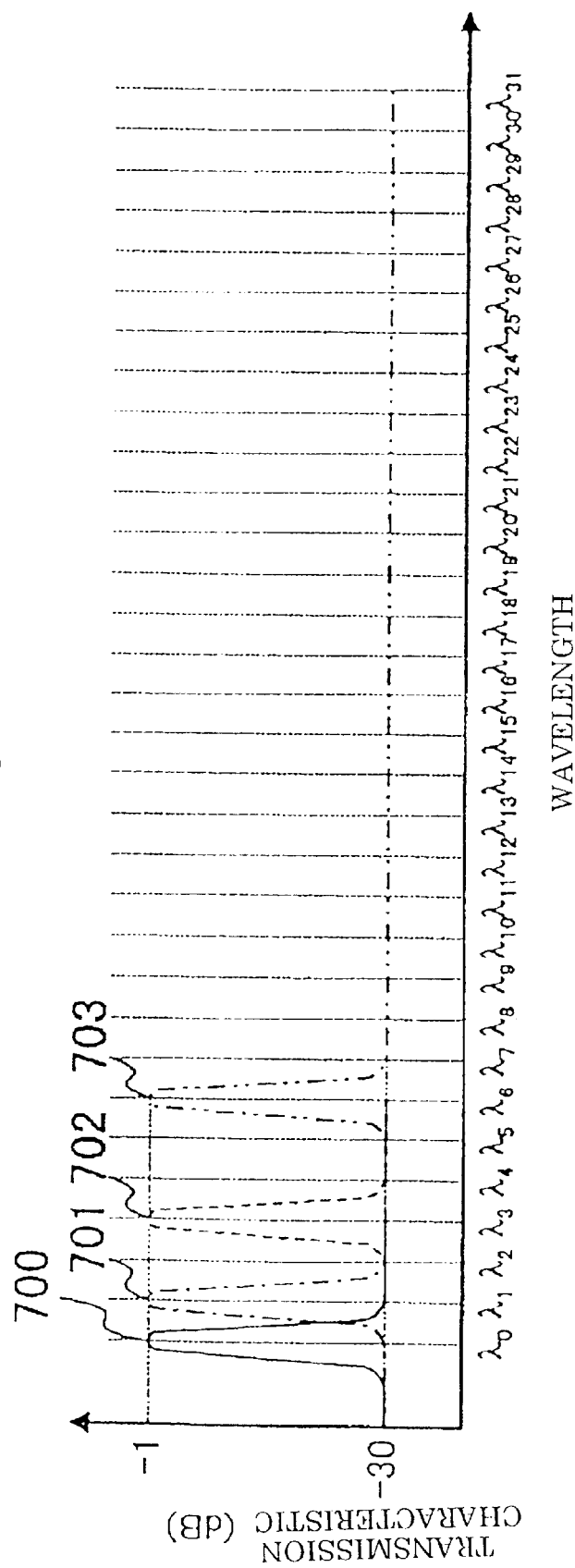
FIG. 12 is a graph showing the transmission characteristics of the optical wavelength router in the second embodiment.

FIG. 12 shows the transmission characteristic of optical wavelength router 60. The bandwidth of arrayed waveguide grating device 500 is 1 nm. Transmittance 700 from input port 510 to output port 540 is maximum at WDM channel $\lambda_0$.

Similarly, transmittance 701 from input port 510 to output port 541 is maximum at WDM channel $\lambda_1$. Transmittance 702 from input port 510 to output port 542 is maximum at WDM channel $\lambda_3$. Transmittance 703 from input port 510 to output port 543 is maximum at WDM channel $\lambda_6$.

Light inputted from input ports 511, 512, and 513 to input waveguides 610-8, 610-16, and 610-25, respectively, of arrayed waveguide grating device 500 also passes through slab waveguide 620 and is propagated through arrayed waveguide grating 630. The light is then focused on different positions by wavelength in slab waveguide 640.

Here, the wavelength of light outputted from the same output ports differs depending on which of input ports 510, 511, 512, and 513 light is inputted from. The correspondence of the wavelength of light transmitted through input waveguide 610 and output waveguide 650 in arrayed waveguide grating device 500 shown in Table 2 below.

TABLE 2

| IN-PUT | OUTPUT | | | | | | | | | | | | | |
|---|---|---|---|---|---|---|---|---|---|---|---|---|---|---|
| | 0 | 1 | 2 | 3 | 4 | 5 | 6 | 7 | 8 | 9 | ... | 29 | 30 | 31 |
| 0 | $\lambda_0$ | $\lambda_1$ | $\lambda_2$ | $\lambda_3$ | $\lambda_4$ | $\lambda_5$ | $\lambda_6$ | $\lambda_7$ | $\lambda_8$ | $\lambda_9$ | ... | $\lambda_{29}$ | $\lambda_{30}$ | $\lambda_{31}$ |
| 1 | $\lambda_1$ | $\lambda_2$ | $\lambda_3$ | $\lambda_4$ | $\lambda_5$ | $\lambda_6$ | $\lambda_7$ | $\lambda_8$ | $\lambda_9$ | $\lambda_{10}$ | ... | $\lambda_{30}$ | $\lambda_{31}$ | $\lambda_{32}$ |
| 2 | $\lambda_2$ | $\lambda_3$ | $\lambda_4$ | $\lambda_5$ | $\lambda_6$ | $\lambda_7$ | $\lambda_8$ | $\lambda_9$ | $\lambda_{10}$ | $\lambda_{11}$ | ... | $\lambda_{31}$ | $\lambda_{32}$ | $\lambda_{33}$ |
| 3 | $\lambda_3$ | $\lambda_4$ | $\lambda_5$ | $\lambda_6$ | $\lambda_7$ | $\lambda_8$ | $\lambda_9$ | $\lambda_{10}$ | $\lambda_{11}$ | $\lambda_{12}$ | ... | $\lambda_{32}$ | $\lambda_{33}$ | $\lambda_{34}$ |
| 4 | $\lambda_4$ | $\lambda_5$ | $\lambda_6$ | $\lambda_7$ | $\lambda_8$ | $\lambda_9$ | $\lambda_{10}$ | $\lambda_{11}$ | $\lambda_{12}$ | $\lambda_{13}$ | ... | $\lambda_{33}$ | $\lambda_{34}$ | $\lambda_{35}$ |
| 5 | $\lambda_5$ | $\lambda_6$ | $\lambda_7$ | $\lambda_8$ | $\lambda_9$ | $\lambda_{10}$ | $\lambda_{11}$ | $\lambda_{12}$ | $\lambda_{13}$ | $\lambda_{14}$ | ... | $\lambda_{34}$ | $\lambda_{35}$ | $\lambda_{36}$ |
| 6 | $\lambda_6$ | $\lambda_7$ | $\lambda_8$ | $\lambda_9$ | $\lambda_{10}$ | $\lambda_{11}$ | $\lambda_{12}$ | $\lambda_{13}$ | $\lambda_{14}$ | $\lambda_{15}$ | ... | $\lambda_{35}$ | $\lambda_{36}$ | $\lambda_{37}$ |
| 7 | $\lambda_7$ | $\lambda_8$ | $\lambda_9$ | $\lambda_{10}$ | $\lambda_{11}$ | $\lambda_{12}$ | $\lambda_{13}$ | $\lambda_{14}$ | $\lambda_{15}$ | $\lambda_{16}$ | ... | $\lambda_{36}$ | $\lambda_{37}$ | $\lambda_{38}$ |
| 8 | $\lambda_8$ | $\lambda_9$ | $\lambda_{10}$ | $\lambda_{11}$ | $\lambda_{12}$ | $\lambda_{13}$ | $\lambda_{14}$ | $\lambda_{15}$ | $\lambda_{16}$ | $\lambda_{17}$ | ... | $\lambda_{37}$ | $\lambda_{38}$ | $\lambda_{39}$ |
| 9 | $\lambda_9$ | $\lambda_{10}$ | $\lambda_{11}$ | $\lambda_{12}$ | $\lambda_{13}$ | $\lambda_{14}$ | $\lambda_{15}$ | $\lambda_{16}$ | $\lambda_{17}$ | $\lambda_{18}$ | ... | $\lambda_{38}$ | $\lambda_{39}$ | $\lambda_{40}$ |
| . | . | . | . | . | . | . | . | . | . | . | | . | . | . |
| 16 | $\lambda_{16}$ | $\lambda_{17}$ | $\lambda_{18}$ | $\lambda_{19}$ | $\lambda_{20}$ | $\lambda_{21}$ | $\lambda_{22}$ | $\lambda_{23}$ | $\lambda_{24}$ | $\lambda_{25}$ | ... | $\lambda_{45}$ | $\lambda_{46}$ | $\lambda_{47}$ |
| . | . | . | . | . | . | . | . | . | . | . | | . | . | . |
| 15 | $\lambda_{25}$ | $\lambda_{26}$ | $\lambda_{27}$ | $\lambda_{28}$ | $\lambda_{29}$ | $\lambda_{30}$ | $\lambda_{31}$ | $\lambda_{32}$ | $\lambda_{33}$ | $\lambda_{34}$ | ... | $\lambda_{54}$ | $\lambda_{55}$ | $\lambda_{56}$ |
| . | . | . | . | . | . | . | . | . | . | . | | . | . | . |
| 30 | $\lambda_{30}$ | $\lambda_{31}$ | $\lambda_{32}$ | $\lambda_{33}$ | $\lambda_{34}$ | $\lambda_{35}$ | $\lambda_{36}$ | $\lambda_{37}$ | $\lambda_{38}$ | $\lambda_{39}$ | ... | $\lambda_{59}$ | $\lambda_{60}$ | $\lambda_{61}$ |
| 31 | $\lambda_{31}$ | $\lambda_{32}$ | $\lambda_{33}$ | $\lambda_{34}$ | $\lambda_{35}$ | $\lambda_{36}$ | $\lambda_{37}$ | $\lambda_{38}$ | $\lambda_{39}$ | $\lambda_{40}$ | ... | $\lambda_{60}$ | $\lambda_{61}$ | $\lambda_{62}$ |

In order to simplify the table, input waveguides 610-0, 610-1, 610-2 . . . and output waveguides 650-0, 650-1, 650-2, . . . in the above table are simply indicated by "0, 1, 2," and so on.

From Table 2 above, When WDM channels $\lambda_0$, $\lambda_1$, $\lambda_3$, and $\lambda_6$ is inputted from input port 510, WDM channel $\lambda_0$ is outputted from output port 540, WDM channel $\lambda_1$ is outputted from output port 541, WDM channel $\lambda_3$ is outputted from output port 542, and WDM channel $\lambda_6$ is outputted from output port 543.

When WDM channels $\lambda_8$, $\lambda_9$, $\lambda_{11}$, and $\lambda_{14}$ is inputted from input port 511, WDM channel $\lambda_8$ is outputted from output port 540. At the same time, WDM channel $\lambda_9$ is outputted from output port 541, WDM channel $\lambda_{11}$ is outputted from output port 542, and WDM channel $\lambda_{14}$ is outputted from output port 543.

When WDM channels $\lambda_{16}$, $\lambda_{17}$, $\lambda_{19}$, and $\lambda_{22}$ is inputted from input port 512, WDM channel $\lambda_{16}$ is outputted from output port 540. At the same time, WDM channel $\lambda_{17}$ is outputted from output port 541, WDM channel $\lambda_{19}$ is outputted from output port 542, and WDM channel $\lambda_{22}$ is outputted from output port 543.

When WDM channels $\lambda_{25}$, $\lambda_{26}$, $\lambda_{28}$, and $\lambda_{31}$ is inputted from input port 513, WDM channel $\lambda_{25}$ is outputted from output port 540. At the same time, WDM channel $\lambda_{26}$ is outputted from output port 541. WDM channel $\lambda_{28}$ is outputted from output port 542, and WDM channel $\lambda_{31}$ is outputted from output port 543.

In brief, wavelength-division demultiplexer 20 and optical wavelength router 60 in the optical wavelength selector of this embodiment have the above-described transmission characteristic, whereby WDM channels is extracted from a particular WDM optical signal.

In other words, WDM optical signal in which the (a+1)th (where (a+1) is any natural number from 1 to n) WDM channel group $\{\lambda_{a0}, \lambda_{a1}, \lambda_{a2}, \ldots, \lambda_{am-2}, \lambda_{am-1}\}$ satisfies the relation "$\lambda_{0b}-\lambda_{0b-1}=\lambda_{ab}-\lambda_{ab-1}$" with respect to b, which is any natural number from 1 to m, is separated into n WDM channel groups, and the WDM channel group is then separated into m WDM channels, one beam for each wavelength. As described hereinabove, m and n are equal, and both equal 4 in this embodiment, and a and b are therefore in the range from 0 to 3.

The operation of the optical wavelength selector of this embodiment in the above-described construction is next described in sequence hereinbelow. First, the WDM channel groups A, B, C, and D that is inputted from optical fiber 10 is divided by means of wavelength-division demultiplexer 20. The WDM channel group A is then propagated through optical fiber 30, the WDM channel group B is propagated through optical fiber 31, the WDM channel group C is propagated through optical fiber 32, and the WDM channel group D is propagated through optical fiber 33.

Then, by turning ON only optical gate switch 40 and turning OFF optical gate switches 41–43, only the WDM channels $\lambda_0$, $\lambda_1$, $\lambda_3$, and $\lambda_6$ of WDM channel group A is inputted from optical fiber 50 to optical wavelength router 60, whereby WDM channel $\lambda_0$ is outputted from optical fiber 90, WDM channel $\lambda_1$ is outputted from optical fiber 91, WDM channel $\lambda_3$ is outputted from optical fiber 92, and WDM channel $\lambda_6$ is outputted from optical fiber 93.

By turning ON only optical gate switch 41 and turning OFF all of the other optical gate switches, only WDM channels $\lambda_8$, $\lambda_9$, $\lambda_{11}$, and $\lambda_{14}$ of WDM channel group B is inputted from optical fiber 51 to optical wavelength router 60. Accordingly, WDM channel $\lambda_8$ is outputted from optical fiber 90, WDM channel $\lambda_9$ is outputted from optical fiber 91, WDM channel $\lambda_{11}$ is outputted from optical fiber 92, and WDM channel $\lambda_{14}$ is outputted from optical fiber 93.

Similarly, when only optical gate switch 42 is turned ON, WDM channel group C is outputted from optical fibers 90–93, and when only optical gate switch 43 is turned ON, WDM channel group D is outputted from optical fibers 90–93.

The optical wavelength selector of this embodiment enables selection of one of the WDM channel groups A, B, C, and D by turning optical gate switches 40–43 ON and OFF from the above-described WDM optical signal. The outputted WDM channel group can be received directly by the optical receivers without the interposition of an optical filter or other component.

The use of the optical wavelength selector of this embodiment therefore allows a simplification of the configuration of a WDM optical network, which is an optical communication system. In such a case, the portion serving as the WDM optical signal transmitting means of the WDM optical network may generate the WDM optical signal of the setting described hereinabove and output to an optical wavelength selector.

In this case, the optical transmitter 110–113, 210–213, 310–313, 410–413 and the optical fiber 120–123, 220–223, 320–323, 420–423 and the star coupler 100 are serving as the WDM optical signal transmitting means.

The third embodiment of the present invention is next described with reference to FIGS. 13 to 17.

Figure 13:
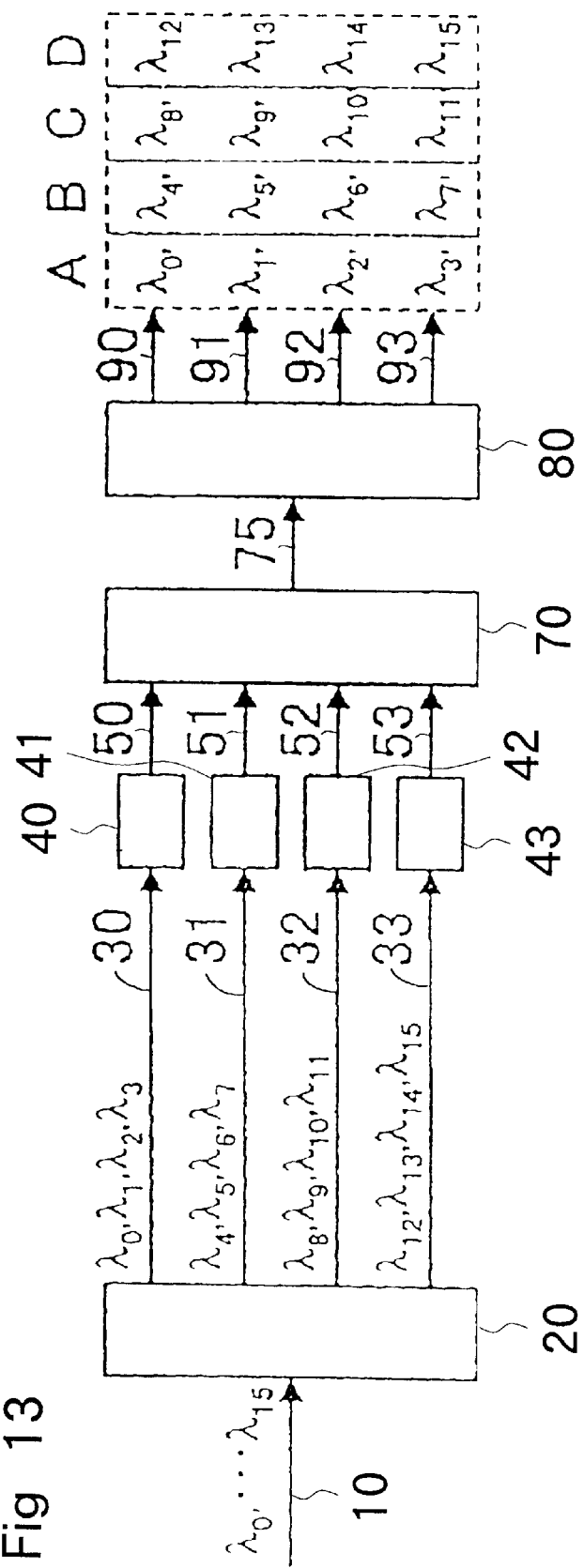
FIG. 13 is a block diagram showing an optical wavelength selector according to the third embodiment of the present invention.

As shown in FIG. 13, in the optical wavelength selector of this embodiment as well, the input port of wavelength-division demultiplexer 20 is connected to optical fiber 10, and the four output ports of wavelength-division demultiplexer 20 are each connected to a respective optical gate switch of optical gate switches 40–43 by means of optical 30–33.

The output ports of optical gate switches 40–43, however, are connected by means of optical fibers 50–53 to the four input ports of optical combiner 70, which are made of optical fiber. The one output port of this optical combiner 70 is connected to the input port of wavelength-division demultiplexer 80 by means of optical fiber 75.

Essentially, in the optical wavelength selector of this embodiment, the portion made up by the combination of optical combiner 70 and the second wavelength-division demultiplexer 80 functions as optical wavelength router 60. Optical fibers 90–93 are then connected to the four output ports of wavelength-division demultiplexer 80.

Of the WDM channels $\lambda_0$, $\lambda_1$, ..., $\lambda_{15}$ of the WDM optical signal inputted to the optical wavelength selector of this embodiment wavelengths of WDM channel, $\lambda_0$ is 1540 nm and each of the remaining wavelengths increases by 1-nm increments, wavelengths of WDM channel $\lambda_{15}$ being 1555 nm. WDM channels $\lambda_0$, $\lambda_1$, $\lambda_2$, and $\lambda_3$ are WDM channel group A, WDM channels $\lambda_4$, $\lambda_5$, $\lambda_6$, and $\lambda_7$ are WDM channel group B, WDM channels $\lambda_8$, $\lambda_9$, $\lambda_{10}$, and $\lambda_{11}$ are WDM channel group C, and WDM channels $\lambda_{12}$, $\lambda_{13}$, $\lambda_{14}$, and $\lambda_{15}$ are WDM channel group D.

In brief, in this WDM optical signal, the wavelengths of the m (in this case, 4) WDM channels belonging to each of n (in this case, 4) WDM channel groups A–D are lined up continuously on the wavelength axis, and moreover, the wavelength spacing between each of WDM channel groups A–D is equal.

Figure 14:
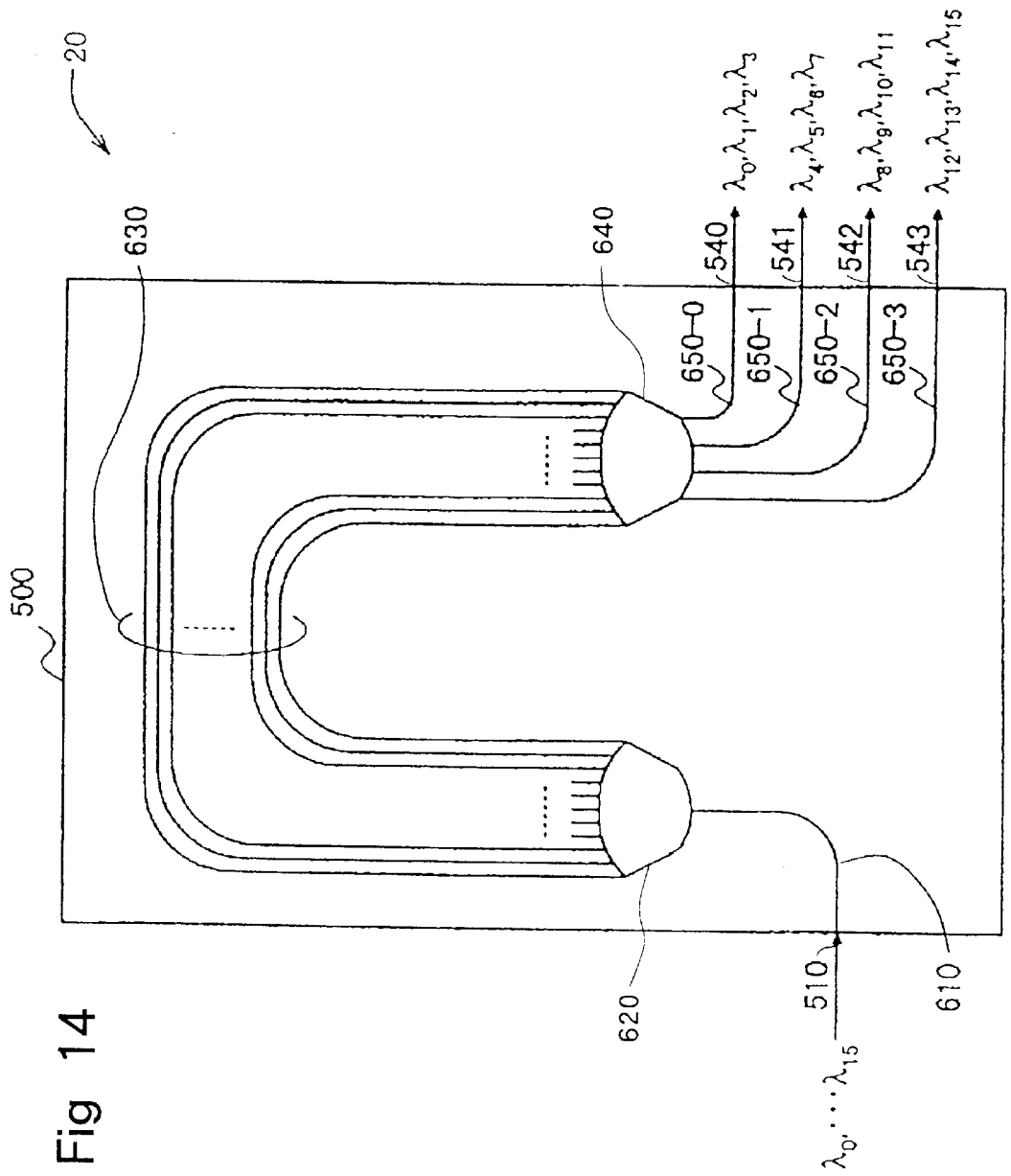
FIG. 14 is a block diagram showing a first wavelength-division demultiplexer in the third embodiment.

As shown in FIG. 14, wavelength-division demultiplexer 20 is made up of one input port 510 made of optical fiber, one arrayed waveguide grating device 500 made of silica glass, and four output ports 540–543 made of optical fiber. Arrayed waveguide grating device 500 is made up of one input waveguide 610, slab waveguide 620, arrayed waveguide grating 630, slab waveguide 640, and four output waveguides 650.

Light inputted from input port 510 to input waveguide 610 of arrayed waveguide grating device 500 passes through slab waveguide 620 and is propagated through arrayed waveguide grating 630. The light is then focused on different positions by wavelength in slab waveguide 640.

Figure 15:
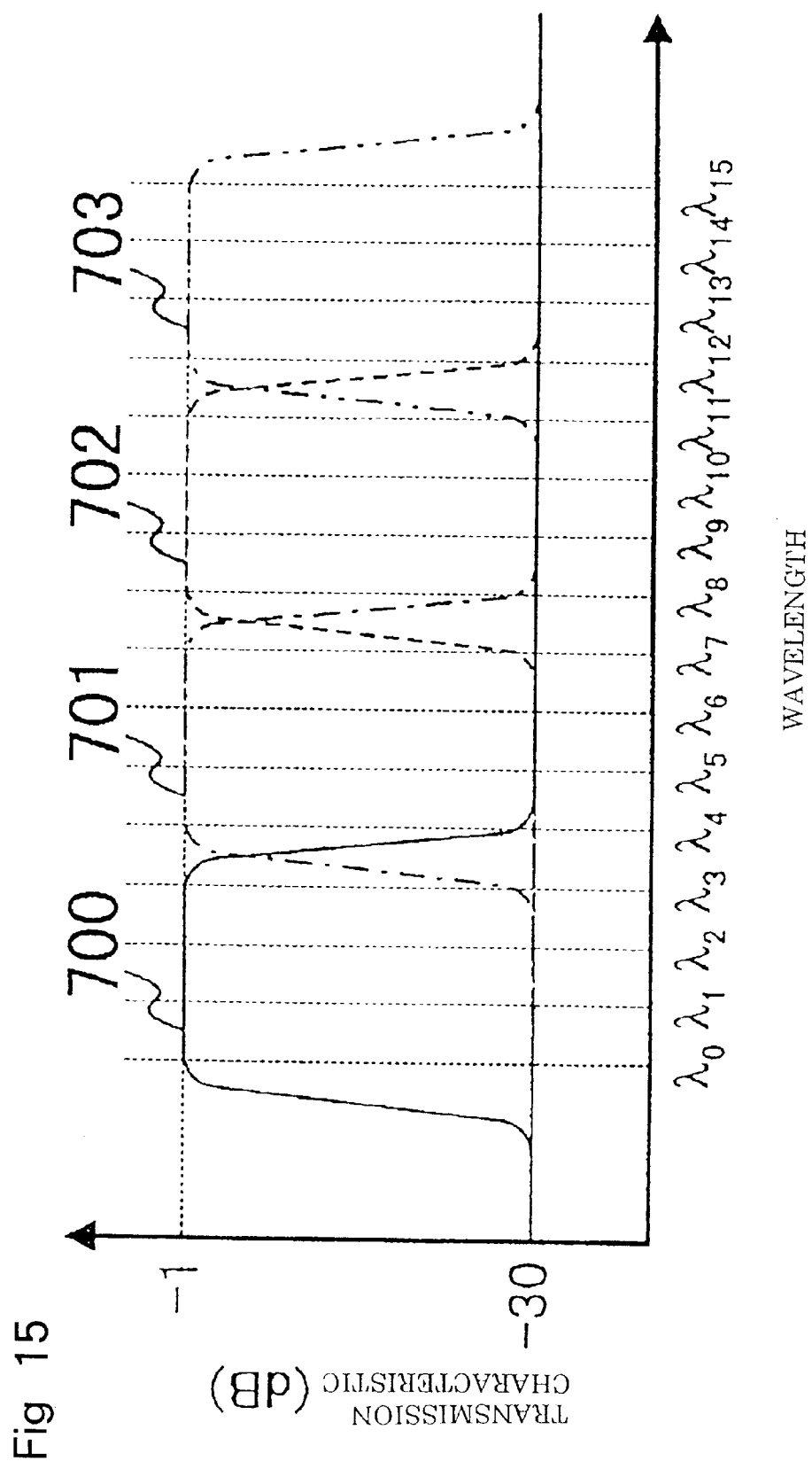
FIG. 15 is a graph showing the transmission characteristic of a first wavelength-division demultiplexer in the third embodiment.

Wavelength-division demultiplexer 20 of the above-described construction has the transmission characteristic shown in FIG. 15. The bandwidth of arrayed waveguide grating device 500 is 4 nm. Transmittance 700 from input port 510 to output port 540 is −1 dB at WDM channels $\lambda_0$–$\lambda_3$, and −30 dB at WDM channels $\lambda_4$–$\lambda_{15}$.

Similarly, transmittance 701 from input port 510 to output port 541 is −1 dB at WDM channels $\lambda_4$–$\lambda_7$, and −30 dB at the other WDM channels. Transmittance 702 from input port 510 to output port 542 is −1 dB at WDM channels $\lambda_8$–$\lambda_{11}$, and −30 dB at the other WDM channels. Transmittance 703 from input port 510 to output port 543 is −1 dB at WDM channels $\lambda_{12}$–$\lambda_{15}$, and −30 dB at the other WDM channels.

Accordingly, when the WDM channel groups A, B, C, and D is inputted from input port 510, the WDM channel group A are outputted to output port 540, the WDM channel group B are outputted to output port 541, the WDM channel group C are outputted to output port 542, and the WDM channel group D are outputted to output port 543.

Figure 16:
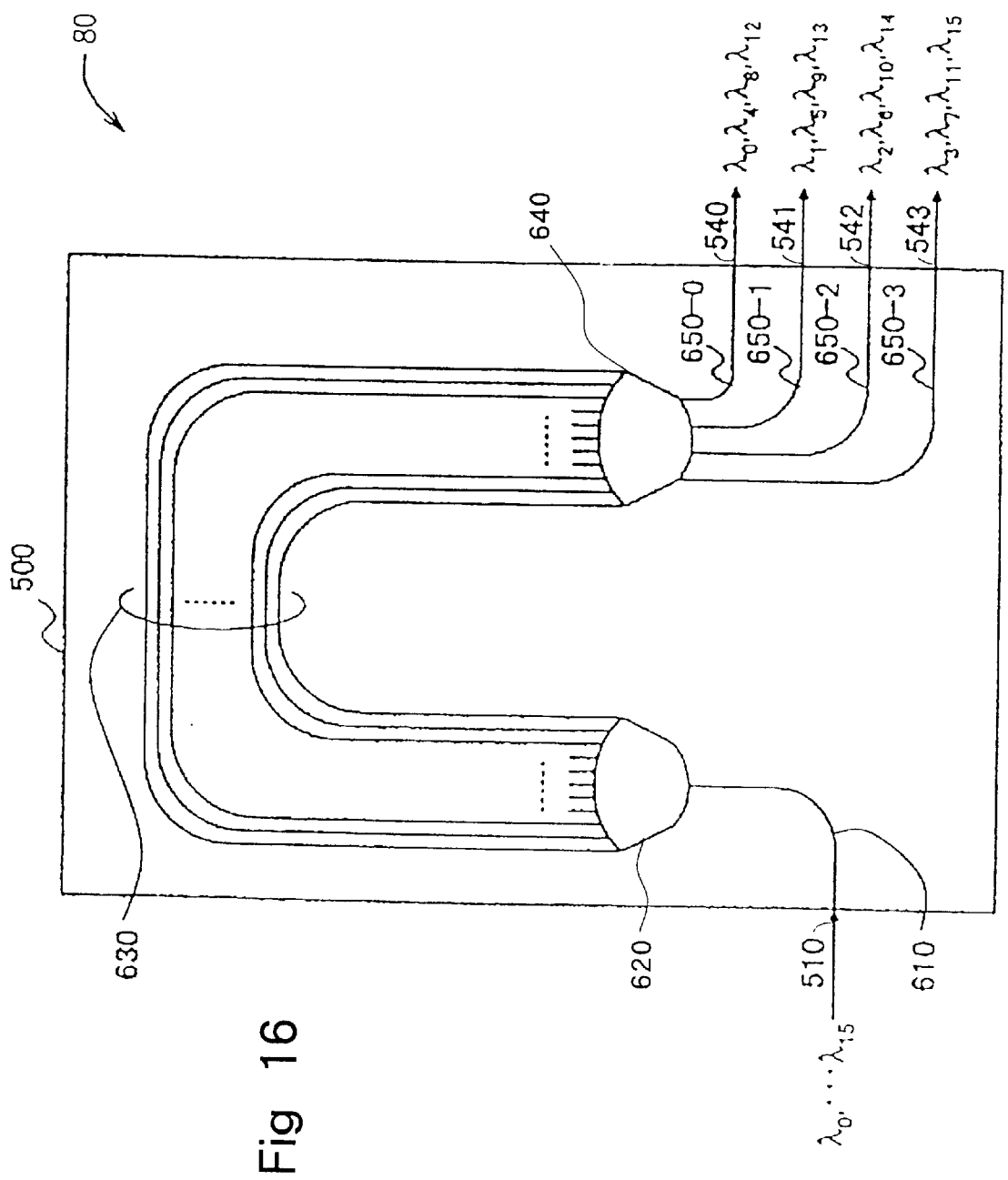
FIG. 16 is a block diagram showing the second wavelength-division demultiplexer in the third embodiment.

FIG. 16 is a block diagram showing the construction of wavelength-division demultiplexer 80. As with wavelength-division demultiplexer 20, wavelength-division demultiplexer 80 of the optical wavelength selector of this embodiment is made up from input port 510 made of optical fiber, allayed waveguide grating device 500 made of silica glass, and four output ports 540–543 made of optical fiber. The transmission characteristic of arrayed waveguide grating device 500, however, differs from that of wavelength-division demultiplexer 20.

Figure 17:
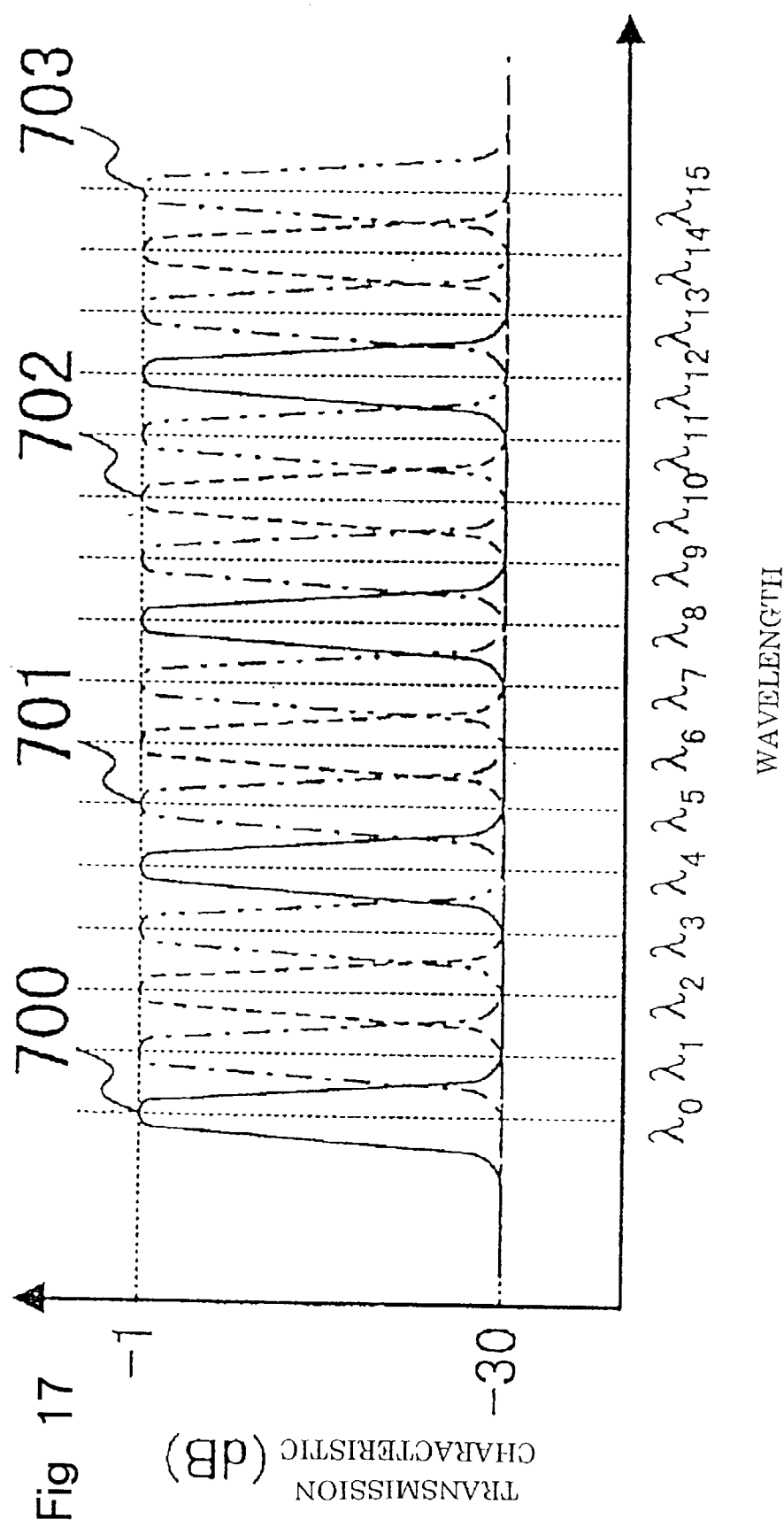
FIG. 17 is a graph showing the transmission characteristic of the second wavelength-division demultiplexer in the third embodiment.

The transmission characteristic of this wavelength-division demultiplexer 80 is shown in FIG. 17. Arrayed waveguide grating device 500 has a bandwidth of approximately 1 nm. Transmittance 700 from input port 510 to output port 540 is maximum for WDM channels $\lambda_0$, $\lambda_4$, $\lambda_8$, and $\lambda_{12}$. The above-described transmission characteristic can be obtained if the FSR (Free Spectral Range) of the arrayed waveguide grating is set to 4 nm.

Similarly, transmittance 701 from input port 510 to output port 541 is maximum for WDM channels $\lambda_1$, $\lambda_5$, $\lambda_9$, and $\lambda_{13}$. Transmittance 702 from input port 510 to output port 542 is maximum for WDM channels $\lambda_2$, $\lambda_6$, $\lambda_{10}$, and $\lambda_{14}$. Transmittance 703 from input port 510 to output port 543 is maximum for WDM channels $\lambda_3$, $\lambda_7$, $\lambda_{11}$, and $\lambda_{15}$.

The transmission characteristic of arrayed waveguide grating device 500 has periodicity, and as a result, when WDM channels $\lambda_0, \lambda_1, \ldots, \lambda_{15}$ is inputted from input port 510, WDM channels $\lambda_0$, $\lambda_4$, $\lambda_8$, and $\lambda_{12}$ are outputted to output port 540. At the same time, WDM channels $\lambda_1$, $\lambda_5$, $\lambda_9$, and $\lambda_{13}$ are outputted to output port 541, WDM channels $\lambda_2$, $\lambda_6$, $\lambda_{10}$, and $\lambda_{14}$ are outputted to output port 542, and WDM channels $\lambda_3$, $\lambda_7$, $\lambda_{11}$, and $\lambda_{15}$ are outputted to output port 543.

In the optical wavelength selector of this embodiment, prescribed transmission characteristics are conferred on wavelength-division demultiplexers 20 and 80, and as a result, WDM optical signal, in which each of the m (in this case, 4) WDM channels of each n (in this case, 4) WDM channel groups are lined up continuously along the wavelength axis, and moreover, in which the wavelength spacing between each WDM channel groups is equal, is separated into n WDM channel groups, following which this WDM optical signal is further separated into m WDM channels, and outputted.

The operation of the optical wavelength selector of this embodiment in the above-described construction will next be described in sequence. First, sixteen-wave light of the WDM channel groups A, B, C, and D inputted from optical fiber 10 is separated into 4 WDM channel groups by wavelength-division demultiplexer 20. The WDM channel group A is propagated through optical fiber 30, the WDM channel group B is propagated through optical fiber 31, the WDM channel group C is propagated through optical fiber 32, and the WDM channel group D is propagated through optical fiber 33.

When only optical gate switch 40 is turned ON and optical gate switches 41–43 are turned OFF, only the WDM channels $\lambda_0$, $\lambda_1$, $\lambda_2$, and $\lambda_3$ of WDM channel group A is outputted to optical fiber 75. As a result, WDM channel $\lambda_0$ is outputted from wavelength-division demultiplexer 80 to optical fiber 90, WDM channel $\lambda_1$ is outputted to optical fiber 91, WDM channel $\lambda_2$ is outputted to optical fiber 92, and WDM channel $\lambda_3$ is outputted to optical fiber 93.

When only optical gate switch 41 is turned ON and the other optical gate switches are turned OFF, only WDM channels $\lambda_4$, $\lambda_5$, $\lambda_6$, and $\lambda_7$ of WDM channel group B is inputted to optical fiber 75. WDM channel $\lambda_4$ is outputted to optical fiber 90, WDM channel $\lambda_5$ is outputted to optical fiber 91, WDM channel $\lambda_6$ is outputted to optical fiber 92, and WDM channel $\lambda_7$ is outputted to optical fiber 93.

Similarly, when only optical gate switch 42 is turned ON, WDM channel group C is outputted to optical fibers 90–93, and when only optical gate switch 43 is turned ON, WDM channel group D is outputted to optical fibers 90–93.

The optical wavelength selector of the present embodiment can select one of the WDM channel groups A, B, C, and D from the inputted WDM optical signal by turning ON and OFF optical gate switches 40–43 upon input of the above-described WDM optical signal, whereby the selected WDM channels outputted by WDM channel group can be received directly by an optical receiver without the interposition of an optical filter or other component.

Accordingly, the use of the optical wavelength selector of this embodiment enables a simplification of the construction of a WDM optical network. In such cases, the portion that serves as the WDM optical signal transmitting means of the WDM optical network may generate WDM optical signal set as described hereinabove and output to the optical wavelength selector.

Explanation of the fourth embodiment of the present invention is next presented with reference to FIGS. 18–22.

Figure 18:
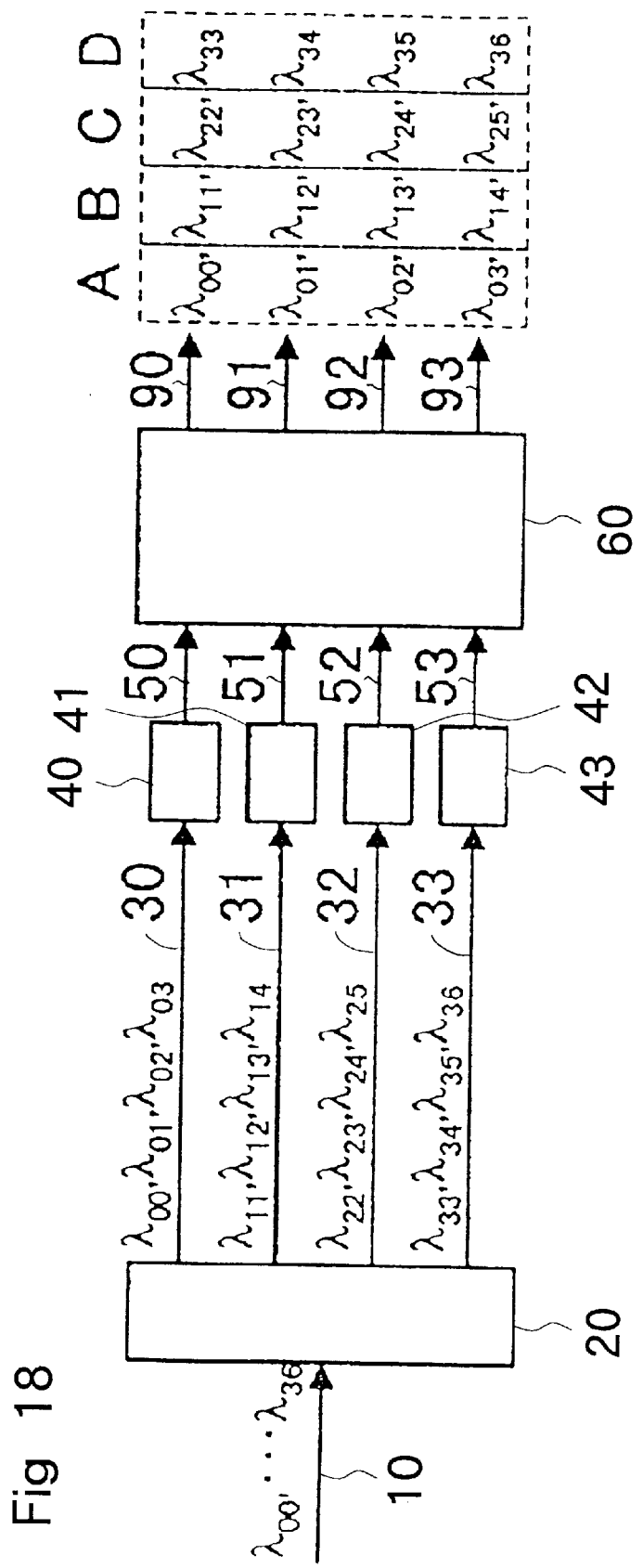
FIG. 18 is a block diagram showing an optical wavelength selector according to the fourth embodiment of the present invention.

As shown in FIG. 18, in the optical wavelength selector of this embodiment as well, optical fiber 10 is connected to the input port of wavelength-division demultiplexer 20, and the four output ports of wavelength-division demultiplexer 20 are each connected to a respective optical gate switch of optical gate switches 40–43 by means of optical fibers 30–33, respectively.

The output ports of optical gate switches 40–43 are each connected to a respective input port of the four input ports of optical wavelength router 60 by means of optical fibers 50–53, respectively. The four output ports of optical wavelength router 60 are then connected to optical fibers 90–93, respectively.

WDM channel $\lambda_{00}$ of WDM channels $\lambda_{00}$–$\lambda_{36}$ of the WDM optical signal inputted to the optical wavelength selector of this embodiment is 1535 nm, and the remaining wavelengths increase by 1-nm increments, wavelength of WDM channels $\lambda_{10}$, $\lambda_{20}$, and $\lambda_{30}$ being 1542 nm, 1549 nm, and 1556 nm, respectively, and WDM channel $\lambda_{36}$ being 1562 nm. WDM channels $\lambda_{00}$, $\lambda_{01}$, $\lambda_{02}$, and $\lambda_{03}$ are identified as WDM channel group A, WDM channels $\lambda_{11}$, $\lambda_{12}$, $\lambda_{13}$, and $\lambda_{14}$ are identified as WDM channel group B, WDM channels $\lambda_{22}$, $\lambda_{23}$, $\lambda_{24}$, and $\lambda_{25}$ are identified as WDM channel group C, and WDM channels $\lambda_{33}$, $\lambda_{34}$, $\lambda_{35}$, and $\lambda_{36}$ are identified as WDM channel group D.

Figure 19:
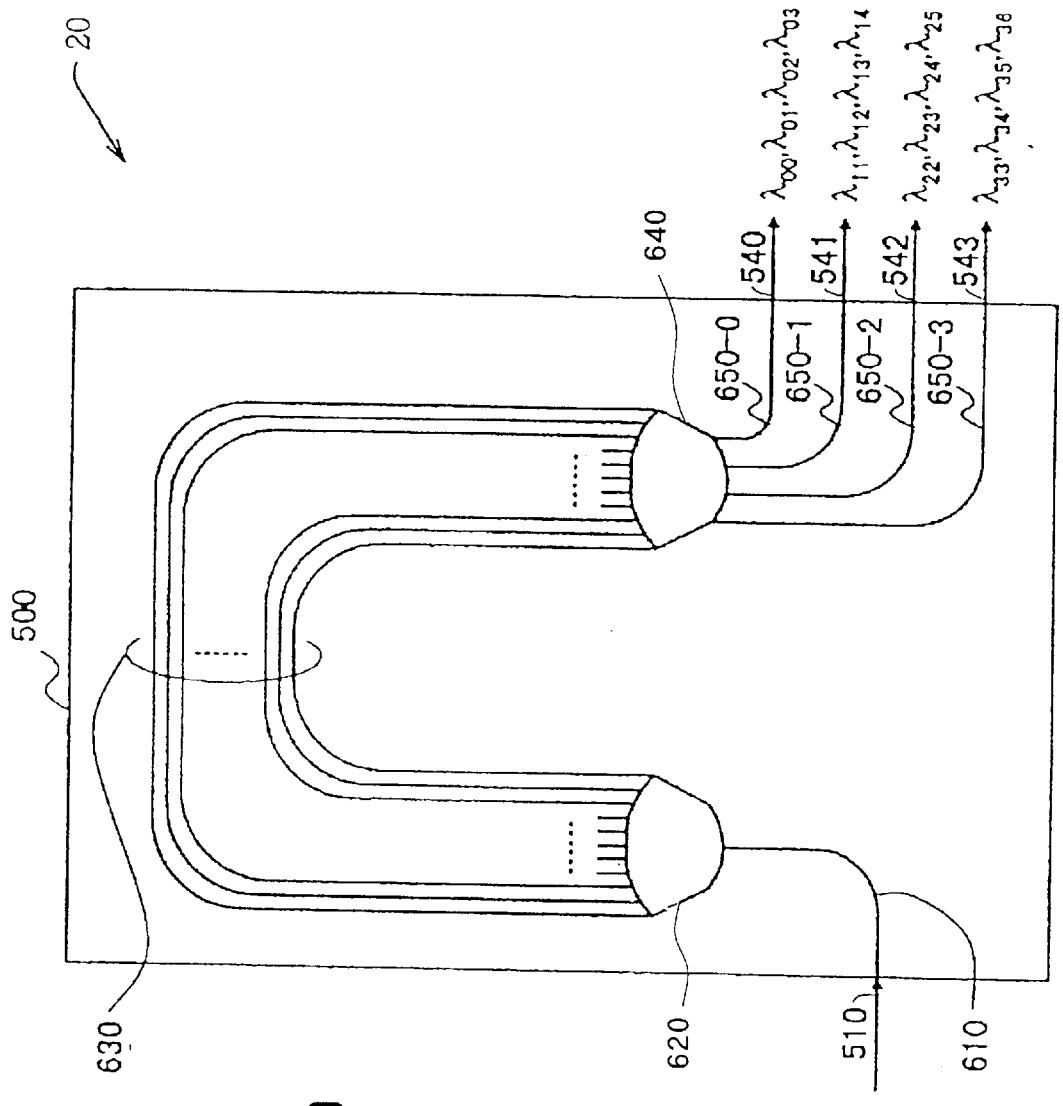
FIG. 19 is a block diagram showing a wavelength-division demultiplexer in the fourth embodiment.

As shown in FIG. 19, wavelength-division demultiplexer 20 is made up of one input port 510 made of optical fiber, one arrayed waveguide grating device 500 made of silica glass, and four output ports 540–543 made of optical fiber. Arrayed waveguide grating device 500 is made up of one input waveguide 610, slab waveguide 620, arrayed waveguide grating 630, slab waveguide 640, and four output waveguides 650.

Light inputted from input port 510 to input waveguide 610 of arrayed waveguide grating device 500 passes through slab waveguide 620 and is propagated through arrayed waveguide grating 630. The light is then focused on different positions according to wavelength in slab waveguide 640.

Figure 20:
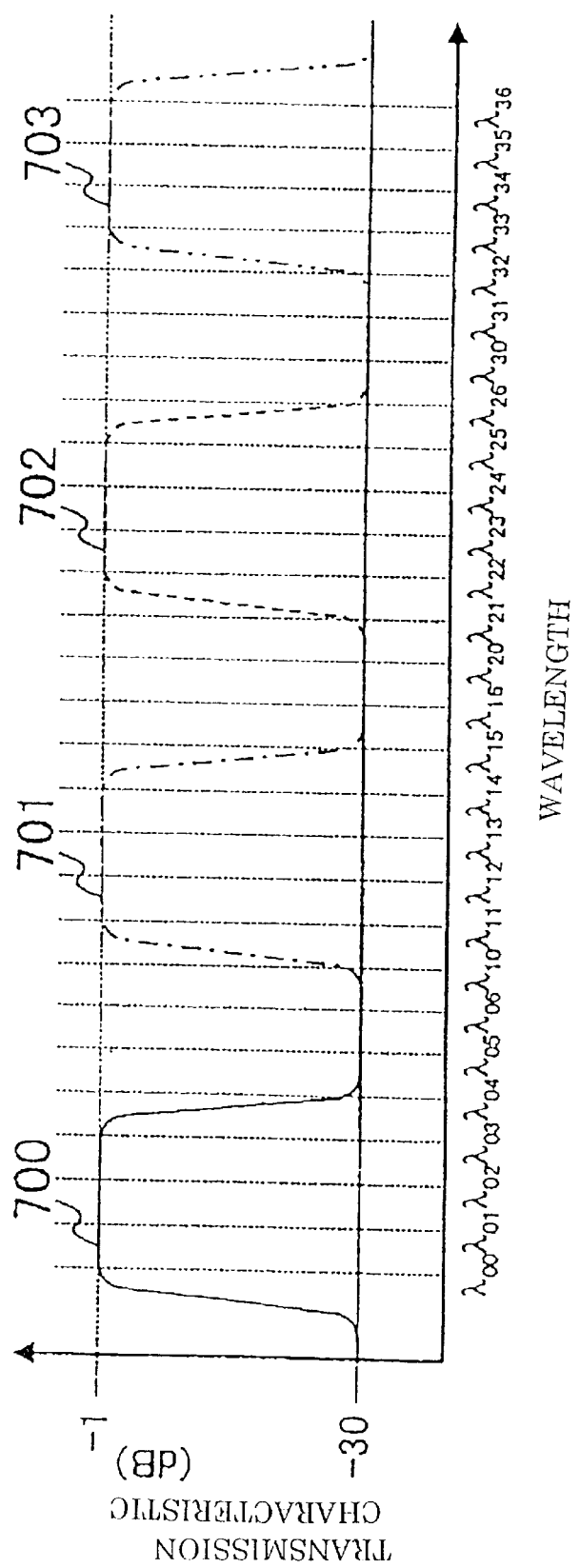
FIG. 20 is a graph showing the transmission characteristic of a wavelength-division demultiplexer in the fourth embodiment.

FIG. 20 shows the transmission characteristic of wavelength-division demultiplexer 20. The bandwidth of arrayed waveguide grating device 500 is 4 nm.

Transmittance 700 from input port 510 to output port 540 is −1 dB at WDM channels $\lambda_{00}$–$\lambda_{03}$, and −30 dB for the other WDM channels.

Similarly, transmittance 701 from input port 510 to output port 541 is −1 dB at WDM channels $\lambda_{11}$–$\lambda_{14}$, and −30 dB for the other WDM channels. Transmittance 702 from input port 510 to output port 542 is −1 dB at WDM channels $\lambda_{22}$–$\lambda_{25}$, and −30 dB for the other WDM channels. Transmittance 703 from input port 510 to output port 543 is −1 dB at WDM channels $\lambda_{33}$–$\lambda_{36}$, and −30 dB for the other WDM channels.

Accordingly, when the WDM channel groups A, B, C, and D is inputted from input port 510, the WDM channel group A is outputted to output port 540. At the same time, the WDM channel group B is outputted to output port 541, the WDM channel group C is outputted to output port 542, and the WDM channel group D is outputted to output port 543.

Figure 21:
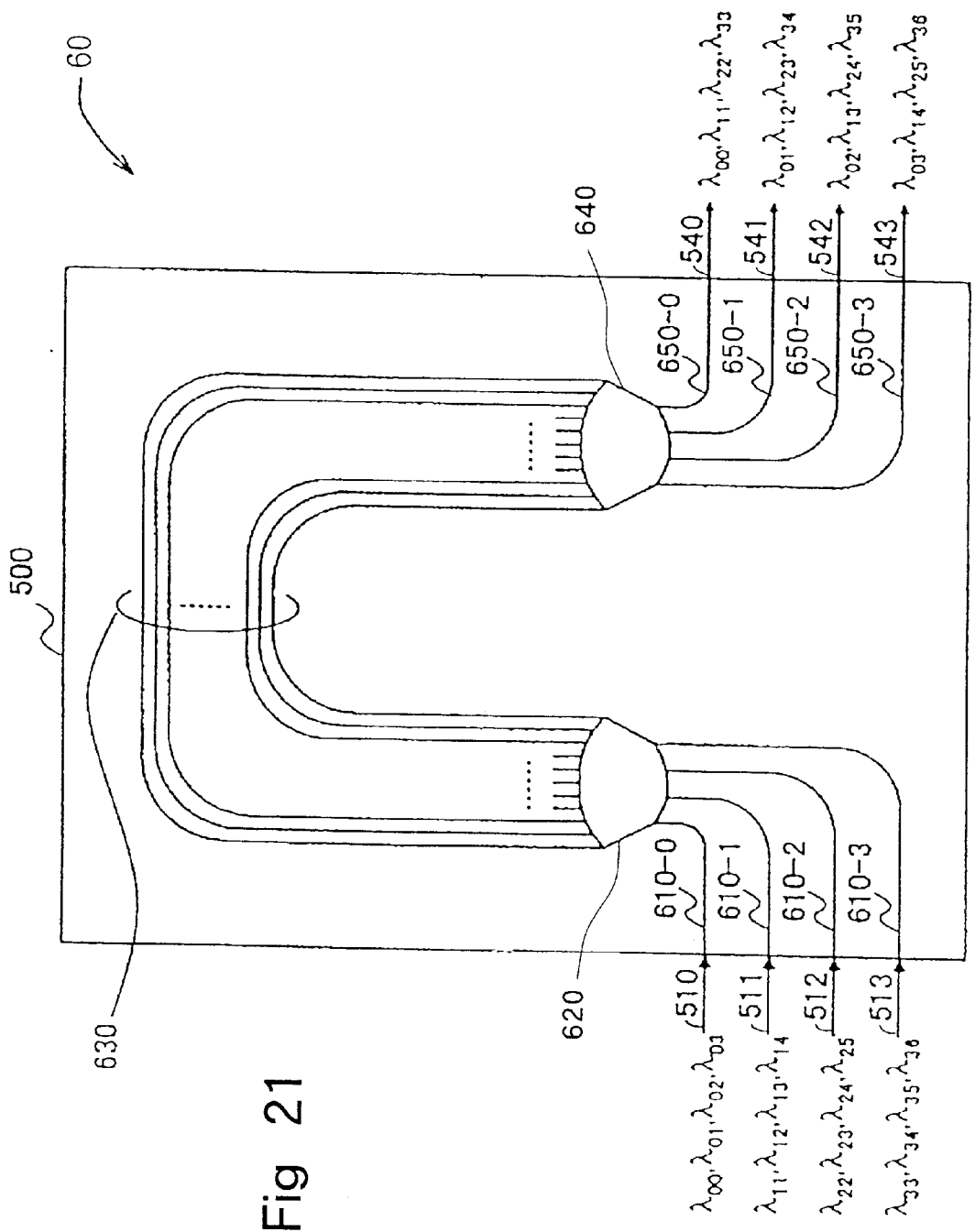
FIG. 21 is a block diagram showing an optical wavelength router in the fourth embodiment.

On the other hand, as shown in FIG. 21, optical wavelength router 60 is made up of four input ports 510–513 made of optical fiber, one arrayed waveguide grating device 500 made of silica glass, and four output ports 540–543 made of optical fiber. Arrayed waveguide grating device 500 is made up of four input waveguides 610, slab waveguide 620, arrayed waveguide grating 630, slab waveguide 640, and four output waveguides 650.

Light inputted from input port 510 to the input waveguide 610-0 of arrayed waveguide grating device 500 passes through slab waveguide 620 and is propagated through arrayed waveguide grating 630. The light is then focused on different positions according to wavelength in slab waveguide 640.

For example, when WDM channel $\lambda_{00}$ is inputted from input port 510, this light is combined at output waveguide 650-0 in slab waveguide 640, and outputted from output port 540.

Figure 22:
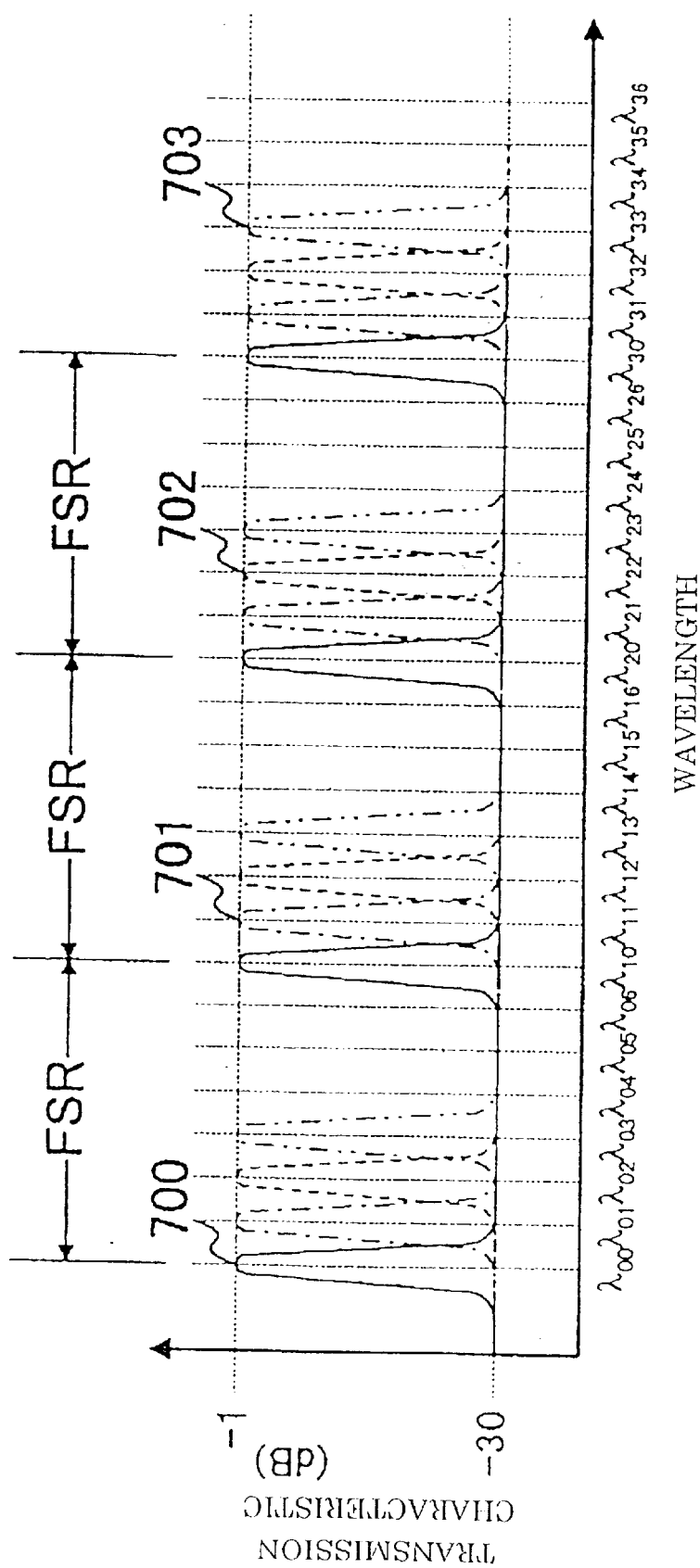
FIG. 22 is a graph showing the transmission characteristic of an optical wavelength router in the fourth embodiment.

FIG. 22 shows the transmission characteristic of optical wavelength router 60. The bandwidth of arrayed waveguide grating device 500 is 1 nm, and the FSR is 7 nm.

Accordingly, transmittance 700 from input port 510 to output port 540 is maximum at WDM channels $\lambda_{00}, \lambda_{10}, \lambda_{20}$, and $\lambda_{30}$. Similarly, transmittance 701 from input port 510 to output port 541 is maximum at WDM channels $\lambda_{01}, \lambda_{11}, \lambda_{21}$, and $\lambda_{31}$. Transmittance 702 from input port 510 to output port 542 is maximum at WDM channels $\lambda_{02}, \lambda_{12}, \lambda_{22}$, and $\lambda_{32}$. Transmittance 703 from input port 510 to output port 543 is maximum at WDM channels $\lambda_{03}, \lambda_{13}, \lambda_{23}$, and $\lambda_{33}$.

Light inputted from input ports 511, 512, and 513 to input waveguides 610-1, 610-2, 610-3 of arrayed waveguide grating device 500 also passes through slab waveguide 620 and is propagated through arrayed waveguide grating 630. The light is then focused on differing positions by wavelength in slab waveguide 640.

However, the wavelength of light outputted from the same output port differs depending on which of input ports 510, 511, 512, or 513 the light is inputted from. Table 3 below shows the correspondences between input waveguide 610 and output waveguide 650 in arrayed waveguide grating device 500 and the wavelength of light transmitted through these components.

TABLE 3

|  |  | OUTPUT | | | |
| --- | --- | --- | --- | --- | --- |
|  |  | 0 | 1 | 2 | 3 |
| INPUT | 0 | $\lambda 00$ | $\lambda 01$ | $\lambda 02$ | $\lambda 03$ |
|  | 1 | $\lambda 01$ | $\lambda 02$ | $\lambda 03$ | $\lambda 04$ |
|  | 2 | $\lambda 02$ | $\lambda 03$ | $\lambda 04$ | $\lambda 05$ |
|  | 3 | $\lambda 03$ | $\lambda 04$ | $\lambda 05$ | $\lambda 06$ |

For the sake of simplification in the above table, input waveguides 610-0, 610-1, 610-2, . . . and output waveguides 650-0, 650-1, 650-2, . . . are represented by only "0, 1, 2, . . . " and so on.

From Table 3 above, it can be seen that the light outputted from output port 540 is the WDM channel $\lambda_{00}$ that is inputted from input port 510. WDM channel $\lambda_{01}$ that is inputted from input port 511, WDM channel $\lambda_{02}$ that is inputted from input port 512, and WDM channel $\lambda_{03}$ that is inputted from input port 513.

Here it must be noted that, as shown in FIG. 22, arrayed waveguide grating device 500 has an FSR of 7 nm, and as a result, the light transmitted from input port 511 to output port 540 is not only WDM channel $\lambda_{01}$, but also WDM channels $\lambda_{11}, \lambda_{21}$, and $\lambda_{31}$. Table 3 above may therefore be written as shown in Table 4 below.

TABLE 4

|  |  | OUTPUT | | | |
| --- | --- | --- | --- | --- | --- |
|  |  | 0 | 1 | 2 | 3 |
| INPUT | 0 | $\lambda 00$ | $\lambda 01$ | $\lambda 02$ | $\lambda 03$ |
|  | 1 | $\lambda 11$ | $\lambda 12$ | $\lambda 13$ | $\lambda 14$ |
|  | 2 | $\lambda 22$ | $\lambda 23$ | $\lambda 24$ | $\lambda 25$ |
|  | 3 | $\lambda 33$ | $\lambda 34$ | $\lambda 35$ | $\lambda 36$ |

From Table 4 above it can be seen that When WDM channels $\lambda_{00}, \lambda_{01}, \lambda_{02}$, and $\lambda_{03}$ is inputted from input port 510, WDM channel $\lambda_{00}$ is outputted from output port 540, WDM channel $\lambda_{01}$ is outputted from output port 541, WDM channel $\lambda_{02}$ is outputted from output port 542, and WDM channel $\lambda_{03}$ is outputted from output port 543.

In addition, When WDM channels $\lambda_{11}, \lambda_{12}, \lambda_{13}$, and $\lambda_{14}$ is inputted from input port 511, WDM channel $\lambda_{11}$ is outputted from output port 540, WDM channel $\lambda_{12}$ is outputted from output port 541, WDM channel $\lambda_{13}$ is outputted from output port 542, and WDM channel $\lambda_{14}$ is outputted from output port 543.

When WDM channels $\lambda_{22}, \lambda_{23}, \lambda_{24}$, and $\lambda_{25}$ is inputted from input port 512, WDM channel $\lambda_{22}$ is outputted from output port 540, WDM channel $\lambda_{23}$ is outputted from output port 541, WDM channel $\lambda_{24}$ is outputted from output port 542, and WDM channel $\lambda_{25}$ is outputted from output port 543.

When WDM channels $\lambda_{33}, \lambda_{34}, \lambda_{35}$, and $\lambda_{36}$ is inputted from input port 513, WDM channel $\lambda_{33}$ is outputted from output port 540, WDM channel $\lambda_{34}$ is outputted from output port 541, WDM channel $\lambda_{35}$ is outputted from output port 542, and WDM channel $\lambda_{36}$ is outputted from output port 543.

The operation of the optical wavelength selector of this embodiment in the construction described above will next be explained in sequence. First, the WDM channel groups A, B, C, and D inputted from optical fiber 10 is separated into 4 WDM channel groups by means of wavelength-division demultiplexer 20.

The WDM channel group A is then propagated through optical fiber 30, the WDM channel group B is propagated through optical fiber 31, the WDM channel group C is propagated through optical fiber 32, and the WDM channel group D is propagated through optical fiber 33.

When only optical gate switch 40 is turned ON and optical gate switches 41–43 are OFF, only WDM channels $\lambda_{00}, \lambda_{01}, \lambda_{02}$, and $\lambda_{03}$ of WDM channel group A are inputted to optical wavelength router 60 from optical fiber 50. As a result, WDM channel $\lambda_{00}$ is outputted from optical fiber 90, WDM channel $\lambda_{01}$ is outputted from optical fiber 91, WDM channel $\lambda_{02}$ is outputted from optical fiber 92, and WDM channel $\lambda_{03}$ is outputted from optical fiber 93.

When optical gate switch 41 is turned ON and the other optical gate switches are all OFF, only WDM channels $\lambda_{11}$, $\lambda_{12}$, $\lambda_{13}$, and $\lambda_{14}$ of WDM channel group B is inputted from optical fiber 51 to optical wavelength router 60, and accordingly, WDM channel $\lambda_{11}$ is outputted from optical fiber 90, WDM channel $\lambda_{12}$ is outputted from optical fiber 91, WDM channel $\lambda_{13}$ is outputted from optical fiber 92, WDM channel $\lambda_{14}$ is outputted from optical fiber 93.

Similarly, when only optical gate switch 42 is turned ON, WDM channel group C is outputted from optical fibers 90–93, and when only optical gate switch 43 is turned ON, WDM channel group D is outputted from optical fibers 90–93.

The optical wavelength selector of this embodiment can select one of WDM channel groups A, B, C, and D from the inputted WDM optical signal by turning optical gate switches 40–43 ON and OFF upon input of the above-described WDM optical signal. The selected WDM channel can be received directly at optical receivers without the interposition of optical filters or other components. The use of the optical wavelength selector of this embodiment therefore allows a simplification of the configuration of a WDM optical network.

Figure 23:
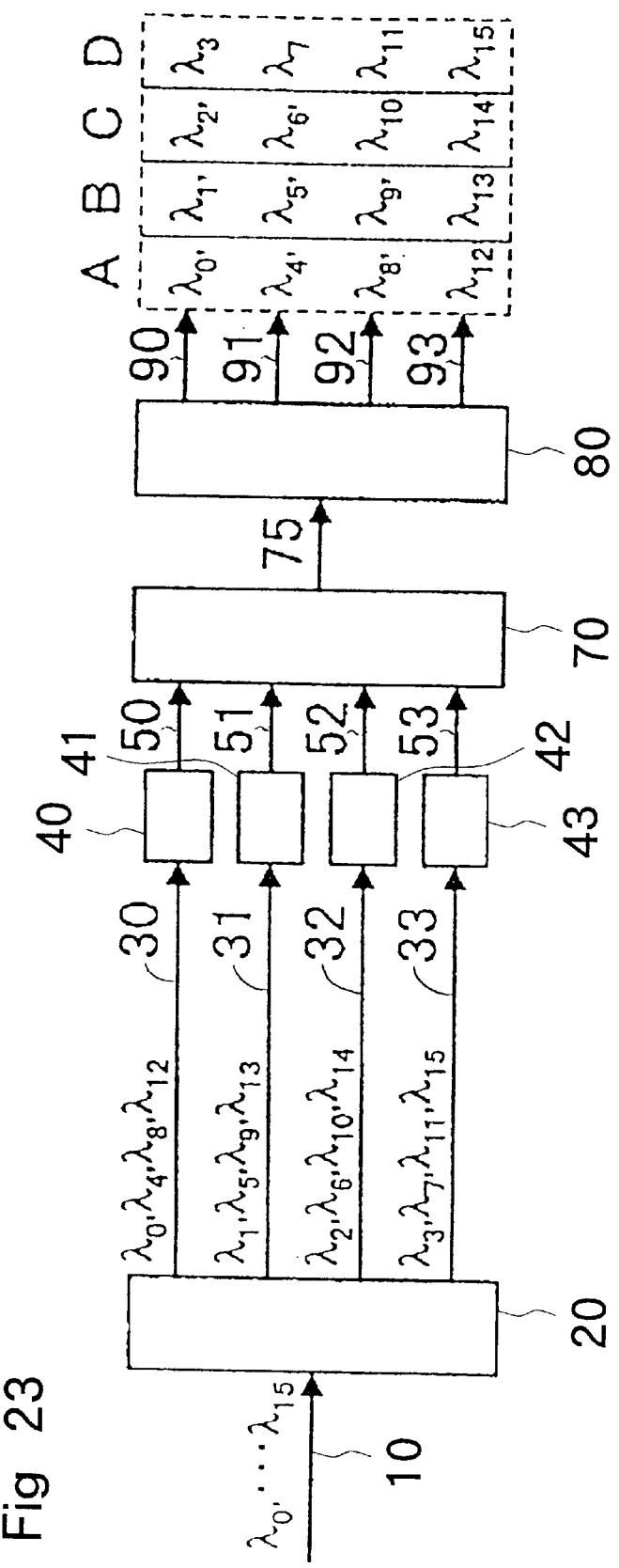
FIG. 23 is a block diagram showing an optical wavelength selector according to the fifth embodiment of the present invention.

Explanation of the fifth embodiment of the present invention is next presented with reference to FIG. 23.

In the optical wavelength selector of this embodiment as well, the input port of wavelength-division demultiplexer 20 is connected to optical fiber 10, and the four output ports of wavelength-division demultiplexer 20 are each connected to a respective optical gate switch of optical gate switches 40–43 by means of optical fibers 30–33, respectively.

The output ports of these optical gate switches 40–43 are each connected to a respective input port of the four input ports of optical combiner 70, which is made of optical fiber, by means of optical fibers 50–53, respectively. The output port of optical combiner 70 is connected to the input port of wavelength-division demultiplexer 80 by means of optical fiber 75.

Essentially, in the optical wavelength selector of this embodiment as well, the combination of optical combiner 70 and second wavelength-division demultiplexer 80 functions as an optical wavelength router 60, and the four output ports of wavelength-division demultiplexer 80 are connected to optical fibers 90–93, respectively.

Of the WDM channels $\lambda_0, \lambda_1, \ldots, \lambda_{15}$ is of the WDM optical signal inputted to the optical wavelength selector in this embodiment, wavelength of WDM channel $\lambda_0$ is 1540 nm, and the remaining wavelengths increase in 1-nm increments, $\lambda_{15}$ being 1555 nm.

WDM channels $\lambda_0, \lambda_4, \lambda_8,$ and $\lambda_{12}$ are identified as WDM channel group A, WDM channels $\lambda_1, \lambda_5, \lambda_9,$ and $\lambda_{13}$ are identified as WDM channel group B, WDM channels $\lambda_2, \lambda_6, \lambda_{10},$ and $\lambda_{14}$ are identified as WDM channel group C, WDM channels $\lambda_3, \lambda_7, \lambda_{11},$ and $\lambda_{15}$ are identified as WDM channel group D. Essentially, the m (in this case, 4) WDM channels belonging to each of the n (in this case, 4) WDM channel groups of this WDM optical signal are arranged so as to have periodicity for each n WDM channels along the wavelength axis, and moreover, the wavelength spacing of the m WDM channels within each WDM channel groups is equal.

The construction and operation of wavelength-division demultiplexer 20 of this embodiment are equivalent to the construction and operation of the wavelength-division demultiplexer 80 of the third embodiment. The construction and operation of the wavelength-division demultiplexer 80 of this embodiment are equivalent to the construction and operation of wavelength-division demultiplexer 20 of the third embodiment.

In the optical wavelength selector of this embodiment, a prescribed transmission characteristics are conferred upon wavelength-division demultiplexers 20 and 80. Accordingly, WDM optical signal, in which the m WDM channels belonging to each WDM channel group are lined up so as to have periodicity for every n WDM channels on the wavelength axis, and in which the wavelength spacing of the m WDM channels within each WDM channel groups is equal, is separated into n WDM channel groups, and this WDM optical signal is then further separated into m WDM channels, and outputted.

The operation of the optical wavelength selector of this embodiment in the above-described construction is next described in sequence. First, sixteen-channels WDM optical signal inputted from optical fiber 10 is separated into 4 WDM channel groups by means of wavelength-division demultiplexer 20. The WDM channel group A is propagated through optical fiber 30, the WDM channel group B is propagated through optical fiber 31, the WDM channel group C is propagated through optical fiber 32, and the WDM channel group D is propagated through optical fiber 33.

When only optical gate switch 40 is turned ON and optical gate switches 41–43 are OFF, only WDM channels $\lambda_0, \lambda_4, \lambda_8,$ and $\lambda_{12}$ of WDM channel group A are outputted to optical fiber 75. As a result, from wavelength-division demultiplexer 80, WDM channel $\lambda_0$ is outputted to optical fiber 90, WDM channel $\lambda_4$ is outputted to optical fiber 91, WDM channel $\lambda_8$ is outputted to optical fiber 92, and WDM channel $\lambda_{12}$ is outputted to optical fiber 93.

When only optical gate switch 41 is ON and the other optical gate switches are OFF, only WDM channels $\lambda_1, \lambda_5, \lambda_9,$ and $\lambda_{13}$ of WDM channel group B is inputted to optical fiber 75, whereby WDM channel $\lambda_1$ is outputted from optical fiber 90, WDM channel $\lambda_5$ is outputted from optical fiber 91, WDM channel $\lambda_9$ is outputted from optical fiber 92, and WDM channel $\lambda_{13}$ is outputted from optical fiber 93.

Similarly, when only optical gate switch 42 is ON, WDM channel group C is outputted from optical fibers 90–93, and when only optical gate switch 43 is ON, WDM channel group D is outputted from optical fibers 90–93.

The optical wavelength selector of this embodiment can select one of the WDM channel groups A, B, C, and D from the inputted WDM optical signal by turning optical gate switches 40–43 ON and OFF upon input of the above-described WDM optical signal. The selected WDM channels outputted by WDM channel group can be received directly at an optical receiver without the interposition of an optical filter or other component.

The use of the optical wavelength selector of this embodiment therefore enables a simplification of the configuration of a WDM optical network. In such a case, the portion that functions as the WDM optical signal transmitting meanss of the WDM optical network may generate WDM optical signal of the above-described setting and output to the optical wavelength selector.

Figure 24:
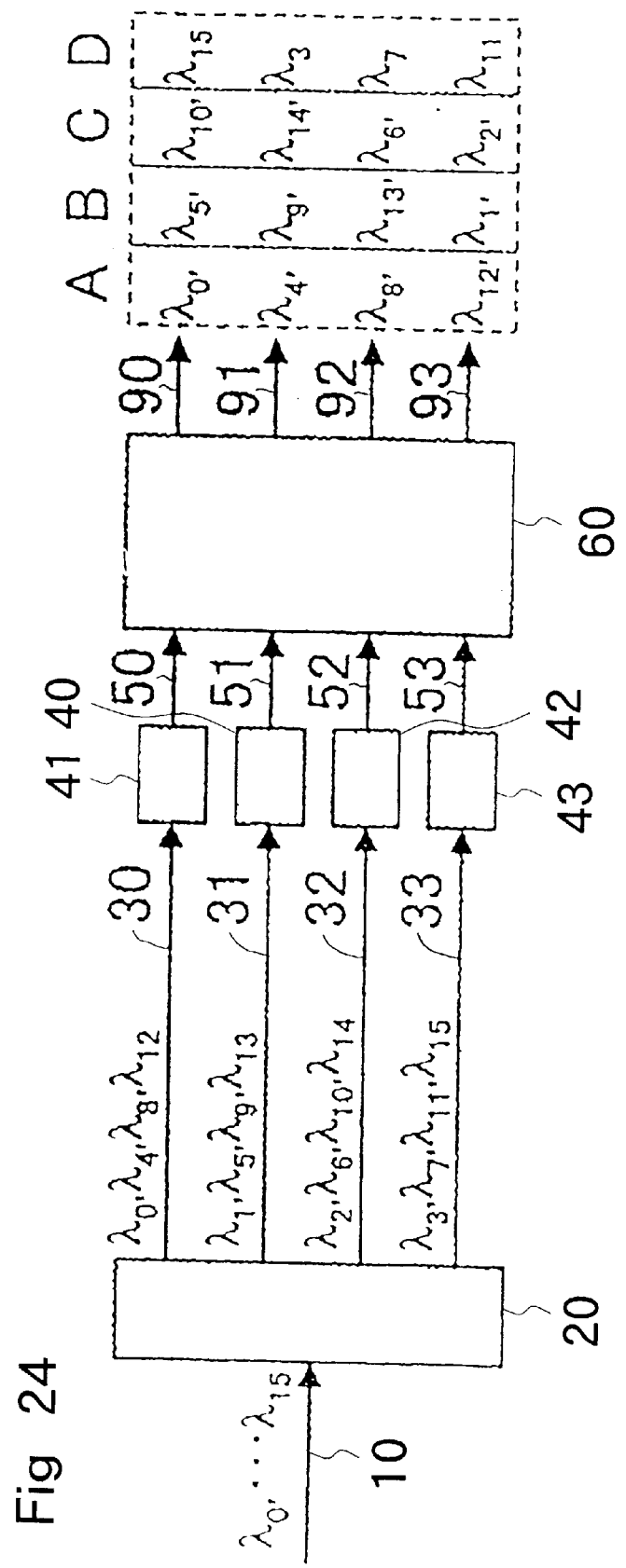
FIG. 24 is a block diagram showing an optical wavelength selector according to the sixth embodiment of the present invention.

The sixth embodiment of the present invention is next described with reference to FIGS. 24 to 26.

First, in the optical wavelength selector of this embodiment as well, optical fiber 10 is connected to the input port of wavelength-division demultiplexer 20, and the four output ports of wavelength-division demultiplexer 20 are each connected to a respective optical gate switch of optical gate switches 40–43 by means of optical fibers 30–33, respectively.

The output ports of these optical gate switches 40–43 are each connected to a respective input port of the four input ports of optical wavelength router 60 by means of optical fibers 50–53, respectively, and the four output ports of optical wavelength router 60 are connected to optical fibers 90–93, respectively.

waveguide 620, is propagated through arrayed waveguide grating 630, and is focused on differing positions by wavelength in slab waveguide 640.

The wavelength of light outputted from the same output port, however, differs according to which input port 510, 511, 512, or 513 light is inputted from. Here, the correspondences between input waveguide 610 and output waveguide 650 of arrayed waveguide grating device 500 and the WDM channel that is transmitted by these components is shown in Table 5 below.

TABLE 5

| INPUT | OUTPUT | | | |
|---|---|---|---|---|
| | 0 | 1 | 2 | 3 |
| 0 | $\lambda_0, \lambda_1, \lambda_2, \lambda_3$ | $\lambda_4, \lambda_5, \lambda_6, \lambda_7$ | $\lambda_8, \lambda_9, \lambda_{10}, \lambda_{11}$ | $\lambda_{12}, \lambda_{13}, \lambda_{14}, \lambda_{15}$ |
| 1 | $\lambda_4, \lambda_5, \lambda_6, \lambda_7$ | $\lambda_8, \lambda_9, \lambda_{10}, \lambda_{11}$ | $\lambda_{12}, \lambda_{13}, \lambda_{14}, \lambda_{15}$ | $\lambda_0, \lambda_1, \lambda_2, \lambda_3$ |
| 2 | $\lambda_8, \lambda_9, \lambda_{10}, \lambda_{11}$ | $\lambda_{12}, \lambda_{13}, \lambda_{14}, \lambda_{15}$ | $\lambda_0, \lambda_1, \lambda_2, \lambda_3$ | $\lambda_4, \lambda_5, \lambda_6, \lambda_7$ |
| 3 | $\lambda_{12}, \lambda_{13}, \lambda_{14}, \lambda_{15}$ | $\lambda_0, \lambda_1, \lambda_2, \lambda_3$ | $\lambda_4, \lambda_5, \lambda_6, \lambda_7$ | $\lambda_8, \lambda_9, \lambda_{10}, \lambda_{11}$ |

Of the WDM channels $\lambda_0, \lambda_1, \ldots, \lambda_{15}$ of WDM optical signal inputted to the optical wavelength selector in this embodiment, wavelength of WDM channel $\lambda_0$ is 1540 nm, and the remaining wavelengths increase in 1-nm increments, wavelength of WDM channel $\lambda_{15}$ being 1555 nm. WDM channels $\lambda_0, \lambda_4, \lambda_8,$ and $\lambda_{12}$ are identified as WDM channel group A, WDM channels $\lambda_1, \lambda_5, \lambda_9,$ and $\lambda_{13}$ are identified as WDM channel group B, WDM channels $\lambda_2, \lambda_6, \lambda_{10},$ and $\lambda_{14}$ are identified as WDM channel group C, and WDM channels $\lambda_3, \lambda_7, \lambda_{11},$ and $\lambda_{15}$ are identified as WDM channel group D.

The construction and operation of wavelength-division demultiplexer 20 of this embodiment are equivalent to the construction and operation of the wavelength-division demultiplexer 80 of the third embodiment.

Figure 25:
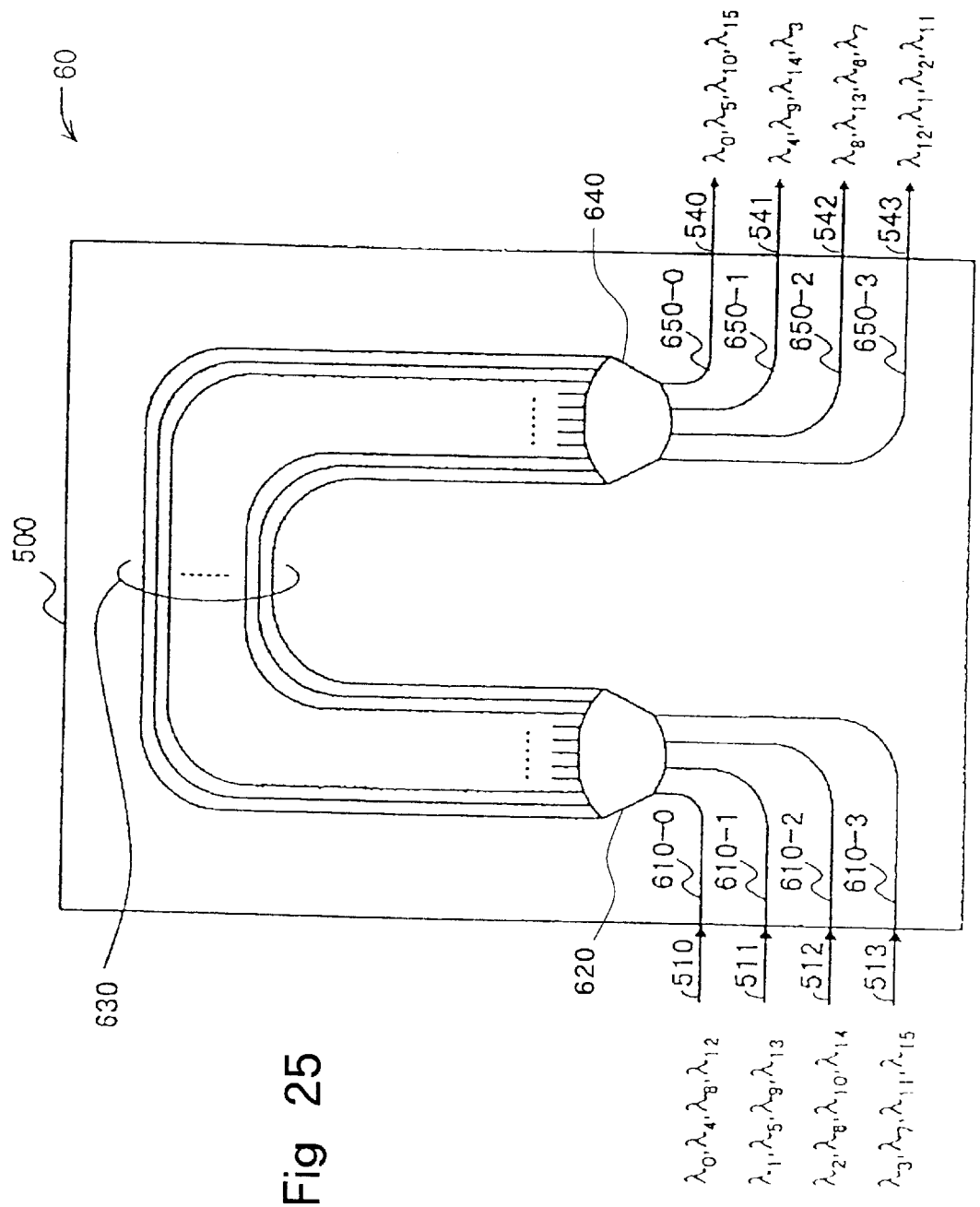
FIG. 25 is a block diagram showing an optical wavelength router in the sixth embodiment.

As shown in FIG. 25, optical wavelength router 60 is made up of four input ports 510–513 that are made of optical fiber, one arrayed waveguide grating device 500 that is made of silica glass, and four output ports 540–543 that are made of optical fiber. Arrayed waveguide grating device 500 is made up of four input waveguides 610, slab waveguide 620, arrayed waveguide grating 630, slab waveguide 640, and four output waveguides 650.

Light inputted from input port 510 to input waveguide 610-0 of arrayed waveguide grating device 500 passes through slab waveguide 620, is propagated through arrayed waveguide grating 630, and is focused on differing positions by wavelength in slab waveguide 640.

Figure 26:
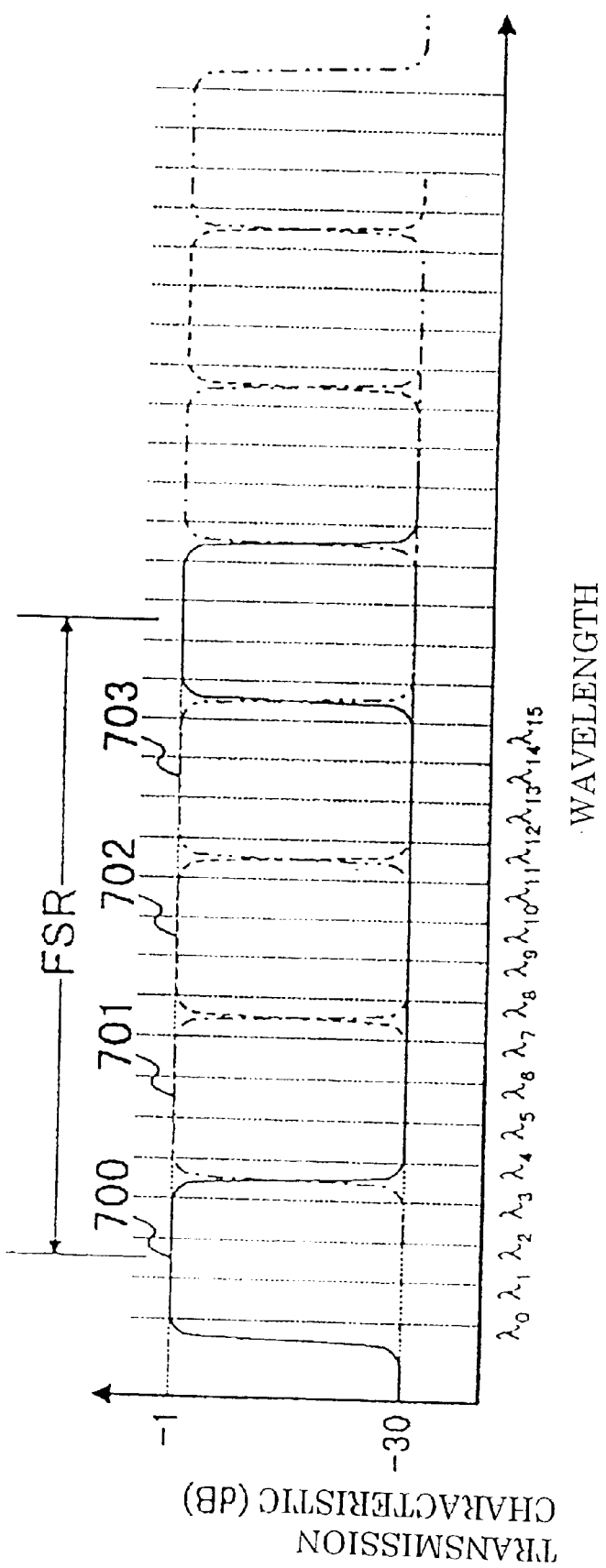
FIG. 26 is a graph showing the transmission characteristic of the optical wavelength router in the sixth embodiment.

FIG. 26 shows the transmission characteristic of optical wavelength router 60. The bandwidth of arrayed waveguide grating device 500 is 4 nm and the FSR is 16 nm. Accordingly, transmittance 700 from input port 510 to output port 540 is maximum at WDM channels $\lambda_0$–$\lambda_3$.

Similarly, transmittance 701 from input port 510 to output port 541 is maximum at WDM channels $\lambda_4$–$\lambda_7$, transmittance 702 from input port 510 to output port 542 is maximum at WDM channels $\lambda_8$–$\lambda_{11}$, and transmittance 703 from input port 510 to output port 543 is maximum at WDM channels $\lambda_{12}$–$\lambda_{15}$.

Light inputted from input ports 511, 512, and 513 to input waveguides 610-1, 610-2, and 610-3, respectively, of arrayed waveguide grating device 500 passes through slab For the sake of simplification in the above table, input waveguides 610-0, 610-1, 610-2, and 610-3 and output waveguides 650-0, 650-1, 650-2, and 650-3 are represented simply as "0, 1, 2, and 3."

As can be seen from Table 5 above, When WDM channels $\lambda_0, \lambda_4, \lambda_8,$ and $\lambda_{12}$ is inputted from input port 510, WDM channel $\lambda_0$ is outputted from output port 540, WDM channel $\lambda_4$ is outputted from output port 541, WDM channel $\lambda_8$ is outputted from output port 542, and WDM channel $\lambda_{12}$ is outputted from output port 543.

In addition, When WDM channels $\lambda_1, \lambda_5, \lambda_9,$ and $\lambda_{13}$ is inputted from input port 511, WDM channel $\lambda_5$ is outputted from output port 540, WDM channel $\lambda_9$ is outputted from output port 541, WDM channel $\lambda_{13}$ is outputted from output port 542, and WDM channel $\lambda_1$ is outputted from output port 543.

When WDM channels $\lambda_2, \lambda_6, \lambda_{10},$ and $\lambda_{14}$ is inputted from input port 512, WDM channel $\lambda_{10}$ is outputted from output port 540, WDM channel $\lambda_{14}$ is outputted from output port 541, WDM channel $\lambda_2$ is outputted from output port 542, and WDM channel $\lambda_6$ is outputted from output port 543.

When WDM channels $\lambda_3, \lambda_7, \lambda_{11},$ and $\lambda_{15}$ is inputted from input port 513, WDM channel $\lambda_{15}$ is outputted from output port 540, WDM channel $\lambda_3$ is outputted from output port 541, WDM channel $\lambda_7$ is outputted from output port 542, and WDM channel $\lambda_{11}$ is outputted from output port 543.

A sequential explanation of the operation of the optical wavelength selector of this embodiment in the above-described construction is presented hereinbelow. First, WDM channel groups A, B, C, and D inputted from optical fiber 10 is separated into 4 WDM channel groups by means of wavelength-division demultiplexer 20. The WDM channel group A is then propagated through optical fiber 30, the WDM channel group B is propagated through optical fiber 31, the WDM channel group C is propagated through optical fiber 32, and the WDM channel group D is then propagated through optical fiber 33.

When only optical gate switch 40 is turned ON and optical gate switches 41–43 are OFF, only WDM channels $\lambda_0, \lambda_4, \lambda_8,$ and $\lambda_{12}$ of WDM channel group A is inputted to optical wavelength router 60 from optical fiber 50, whereby WDM channel $\lambda_0$ is outputted from optical fiber 90, WDM channel $\lambda_4$ is outputted from optical fiber 91, WDM channel $\lambda_8$ is outputted from optical fiber 92, WDM channel $\lambda_{12}$ is outputted from optical fiber 93.

When optical gate switch 41 is turned ON and the other optical gate switches are all OFF, only WDM channels $\lambda_1$, $\lambda_5$, $\lambda_9$, and $\lambda_{13}$ of WDM channel group B is inputted to optical wavelength router 60 from optical fiber 51, whereby WDM channel $\lambda_5$ is outputted from optical fiber 90, WDM channel $\lambda_9$ is outputted from optical fiber 91, WDM channel $\lambda_{13}$ is outputted from optical fiber 92, WDM channel $\lambda_1$ is outputted from optical fiber 93.

In the same way, when only optical gate switch 42 is ON, WDM channel group C is outputted from optical fibers 90–93, and when only optical gate switch 43 is ON, WDM channel group D is outputted from optical fibers 90–93.

The optical wavelength selector of this embodiment can select one of the WDM channel groups A, B, C, and D from the inputted WDM optical signal by turning ON and OFF optical gate switches 40–43 upon input of the above-described WDM optical signal, and this WDM optical signal of four WDM channels that is outputted by WDM channel group can be received directly at the optical receivers without the interposition of optical filters or other components. As a result, the use of the optical wavelength selector of this embodiment allows a simplification of the construction of a WDM optical network.

Figure 27:
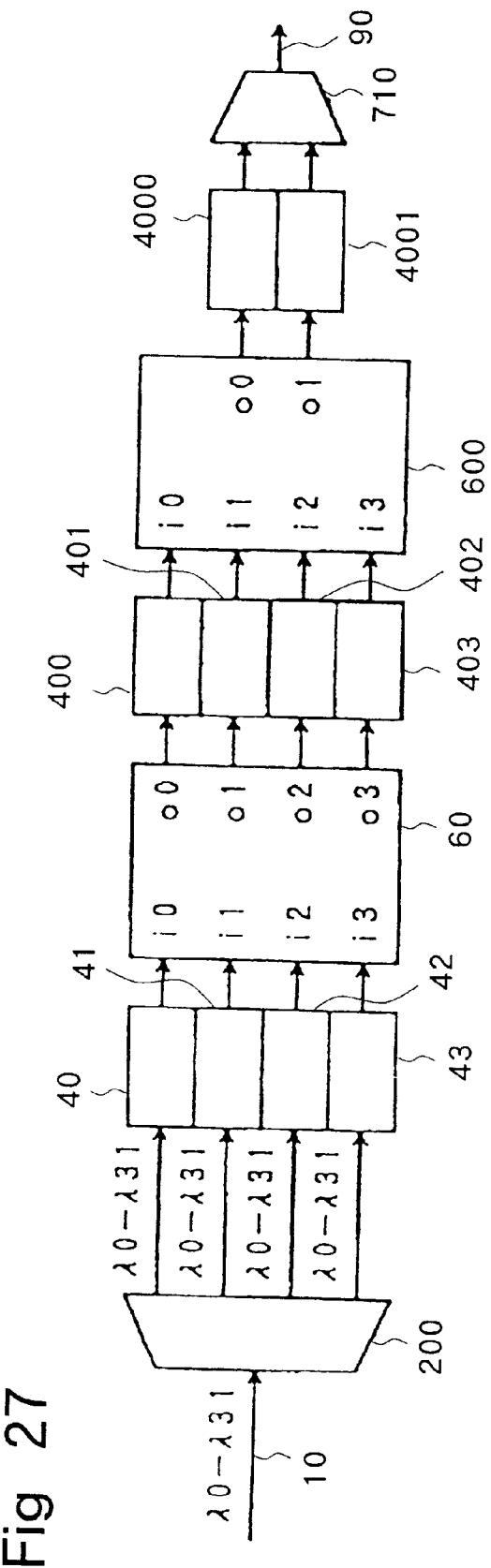
FIG. 27 is a block diagram showing an optical wavelength selector in the seventh embodiment.

Explanation is next presented regarding the seventh embodiment of the present invention with reference to FIG. 27.

The optical wavelength selector of this embodiment is provided with one optical splitter 200, four (which is $k_0$) optical gate switches 40–43, optical wavelength routers 60 and 600 in two (which is p) stages, optical gate switches 400–403 and 4000–4001 in two (i.e., p) stages, and one optical combiner 710.

The number of first-stage optical gate switches 400–403 is four, i.e., $k_1$. The number of second-stage optical gate switches 4000–4001 is two, i.e., $k_p$ ($k_2$).

Because "p stages" is two stages, first-stage optical wavelength router 60, four optical gate switches 400–403 of the first stage, the second-stage optical wavelength router 600, and the two optical gate switches 4000–4001 of the second stage are positioned sequentially between the four optical gate switches 40–43 and optical combiner 710.

Optical splitter 200 is a fused fiber coupler. In addition, optical splitter 200 is provided with one input port and four output ports.

WDM optical signal, in which 32 (i.e., $k_0 \times k_1 \times \ldots \times k_i \times \ldots \times k_p$) WDM channels are multiplexed, is inputted to optical splitter 200, whereupon optical splitter 200 splits the WDM optical signal into four (i.e., $k_0$) beams.

Each of the four optical gate switches 40–43 either cuts off or lets pass one beam of WDM optical signal inputted from optical splitter 200 and outputs to first-stage optical wavelength router 60.

First-stage optical wavelength router 60 is an arrayed waveguide grating wavelength router which is a silica waveguide device fabricated on a silicon substrate. In addition, first-stage optical wavelength router 60 is provided with four (i.e., $k_{i-1}$) input ports and four (i.e., $k_i$) output ports.

WDM optical signal is inputted from one of optical gate switches 40–43 of the preceding stage to one input port of the first-stage optical wavelength router 60, whereupon the first-stage optical wavelength router 60 separates the WDM optical signal into four (ie., $k_i$) prescribed WDM channel groups, and outputs from the four output ports.

The WDM channels which passes from each input ports to each output ports of the above-described optical wavelength router 60 is as shown in Table 6 below.

TABLE 6

|  |  | OUTPUT | | | |
|---|---|---|---|---|---|
|  |  | o 0 | o 1 | o 2 | o 3 |
| INPUT | i 0 | λ0, λ1 | λ2, λ3 | λ4, λ5 | λ6, λ7 |
|  | i 1 | λ8, λ9 | λ10, λ11 | λ12, λ13 | λ14, λ15 |
|  | i 2 | λ18, λ17 | λ18, λ19 | λ20, λ21 | λ22, λ23 |
|  | i 3 | λ24, λ25 | λ28, λ27 | λ28, λ29 | λ30, λ31 |

The four fist-stage optical gate switches 400–403 either cut off or let pass the WDM channel groups inputted from first-stage optical wavelength router 60 and output to the second-stage optical wavelength router 600.

The second-stage optical wavelength router 600 is provided with four (i.e., $k_{i-1}$) input ports and two (i.e., $k_i$) output ports.

In the second-stage optical wavelength router 600 as well, WDM channel group is inputted from one of optical gate switches 400–403 of the preceding stage to one input port, whereupon the second-stage optical wavelength router 600 separates the WDM channel group into two (ie., $k_i$) prescribed WDM channel, and outputs from the two output ports.

The WDM channels which passes from each input ports to each output ports of the above-described optical wavelength router 600 is as shown in Table 7 below.

TABLE 7

|  |  | OUTPUT | |
|---|---|---|---|
|  |  | o 0 | o 1 |
| INPUT | i 0 | λ0, λ8, λ16, λ24 | λ1, λ9, λ17, λ25 |
|  | i 1 | λ2, λ10, λ18, λ26 | λ3, λ11, λ19, λ27 |
|  | i 2 | λ4, λ12, λ20, λ28 | λ5, λ13, λ21, λ29 |
|  | i 3 | λ6, λ14, λ22, λ30 | λ7, λ15, λ23, λ31 |

The two optical gate switches 4000 and 4001 of the second stage either let pass or cut off the two WDM channels inputted from the second-stage optical wavelength router 600, and output the result to optical combiner 710.

This optical combiner 710 is provided with two (i.e., $k_p$) input ports and one output port. Upon input of one WDM channel to one input port from one of the two optical gate switches 4000 and 4001 of the preceding stage, optical combiner 710 outputs this light from one output port.

The optical wavelength selector of this embodiment in the above-described construction enables selection of one WDM channel from WDM optical signal in which the light of $k_0 \times k_1 \times \ldots \times k_i \times \ldots \times k_p$ WDM channels are multiplexed.

As described hereinabove, in this embodiment, p stages is two stages; $k_0$ is four; $k_1$ is four; and $k_2$ ($k_p$) is two. Accordingly, the WDM optical signal is the multiplexed light of 32 (4×4×2) WDM channels.

In the optical wavelength selector of this embodiment, one WDM channel is selected from the WDM optical signal and outputted by turning ON one of the first four optical gate switches 40–43, turning ON one of the four first-stage optical gate switches 400–403, and turning ON one of the two second-stage optical gate switches 4000 and 4001.

The optical wavelength selector of this embodiment enables selection of one of the 32 (4×4×2) WDM channels, but the number of optical gate switches 40 . . . required for this selection is only ten (4+4+2). In other words, a limited number of optical gate switches can select a large number of WDM channels.

As a result, the optical wavelength selector of this embodiment enables a reduction in size and an improvement in productivity, as well as a reduction in power consumption.

Furthermore, as described hereinabove, the optical wavelength selector of this embodiment requires only a limited number of optical gate switches 40 . . . in each stage. As a result, only a limited number of wave spliting are required in optical splitter 200, and the number of wave combinations in optical combiner 710 are also limited in number. Optical signal loss in the optical wavelength selector of this embodiment is therefore suppressed.

Figure 28:
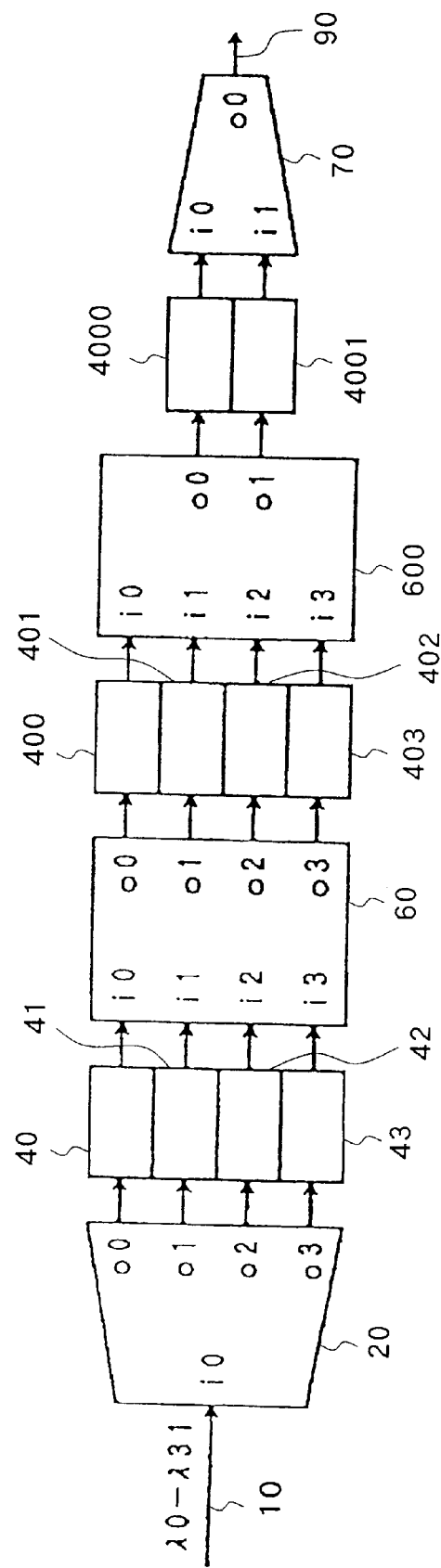
FIG. 28 is a block diagram showing an optical wavelength selector in the eighth embodiment.

Explanation is next presented regarding the eighth embodiment of the present invention with reference to FIG. 28. Portions of the embodiment that are identical to those of the above-described seventh embodiment are here omitted.

The optical wavelength selector of this embodiment is provided with one wavelength-division demultiplexer 20, four optical gate switches 40–43, optical wavelength routers 60 and 600 in two stages, optical gate switches 400–403 and 4000–4001 in two stages, and one wavelength-division multiplexer 70.

Wavelength-division demultiplexer 20 inputs WDM optical signal in which 32 (i.e., $k_0 \times k_1 \times \ldots \times k_i \times \ldots \times k_p$) WDM channels are multiplexed, whereupon wavelength-division demultiplexer 20 separates the WDM optical signal into four (i.e., $k_0$) beams, one beam for each of the prescribed first-stage WDM channel groups, and outputs the result to optical gate switches 40–43.

The first-stage optical wavelength router 60 inputs first-stage WDM channel group from one of optical gate switches 40–43 to one input port, whereupon first-stage optical wavelength router 60 separates the first-stage WDM channel group into four beams, one beam for each of the prescribed second-stage WDM channel groups, and outputs the result from the four output ports to four respective first-stage optical gate switches 400–403. The WDM channels which passes from each input ports to each output ports of the above-described optical wavelength router 60 is as shown in Table 8 below:

TABLE 8

| INPUT | OUTPUT | | | |
|---|---|---|---|---|
| | o0 | o1 | o2 | o3 |
| i0 | λ0, λ1, λ2, λ3 | λ8, λ9, λ10, λ11 | λ16, λ17, λ18, λ19 | λ24, λ25, λ26, λ27 |
| | λ4, λ5, λ6, λ7 | λ12, λ13, λ14, λ15 | λ20, λ21, λ22, λ23 | λ28, λ29, λ30, λ31 |

Second-stage optical wavelength router 600 inputs WDM optical signal from one of optical gate switches 400–403 to one input port, whereupon, second-stage optical wavelength router 600 separates the second-stage WDM channel group into two (i.e., $k_i$) WDM channels, and outputs from two output ports.

The WDM channels which passes from each input ports to each output ports of the above-described optical wavelength router 600 is as shown in Table 9 below.

TABLE 9

| INPUT | OUTPUT |
|---|---|
| | o0 |
| i0 | λ0, λ2, λ4, λ6, λ8, λ10, λ12, λ14, λ16, λ18, λ20, λ22, λ24, λ26, λ28, λ30 |
| i1 | λ1, λ3, λ5, λ7, λ9, λ11, λ13, λ15, λ17, λ19, λ21, λ23, λ25, λ27, λ29, λ31 |

Similar to the optical wavelength selector of the above-described seventh embodiment, the optical wavelength selector of the eighth embodiment in a construction such as described hereinabove enables selection of a large number of WDM channels by a limited number of optical gate switches 40 . . . . This embodiment therefore enables a reduction in size and an improvement in productivity, as well as a reduction in power consumption.

In particular, wavelength-division demultiplexer 20, has optical signal loss as much as 6 dB lower than that of optical splitter 200. In addition, wavelength-division multiplexer 70, has optical signal loss as much as 3 dB lower than that of optical combiner 710.

Accordingly, the optical wavelength selector of the eighth embodiment has optical signal loss that is as much as 9 dB lower than the optical wavelength selector of the above-described seventh embodiment in principle.

Figure 29:
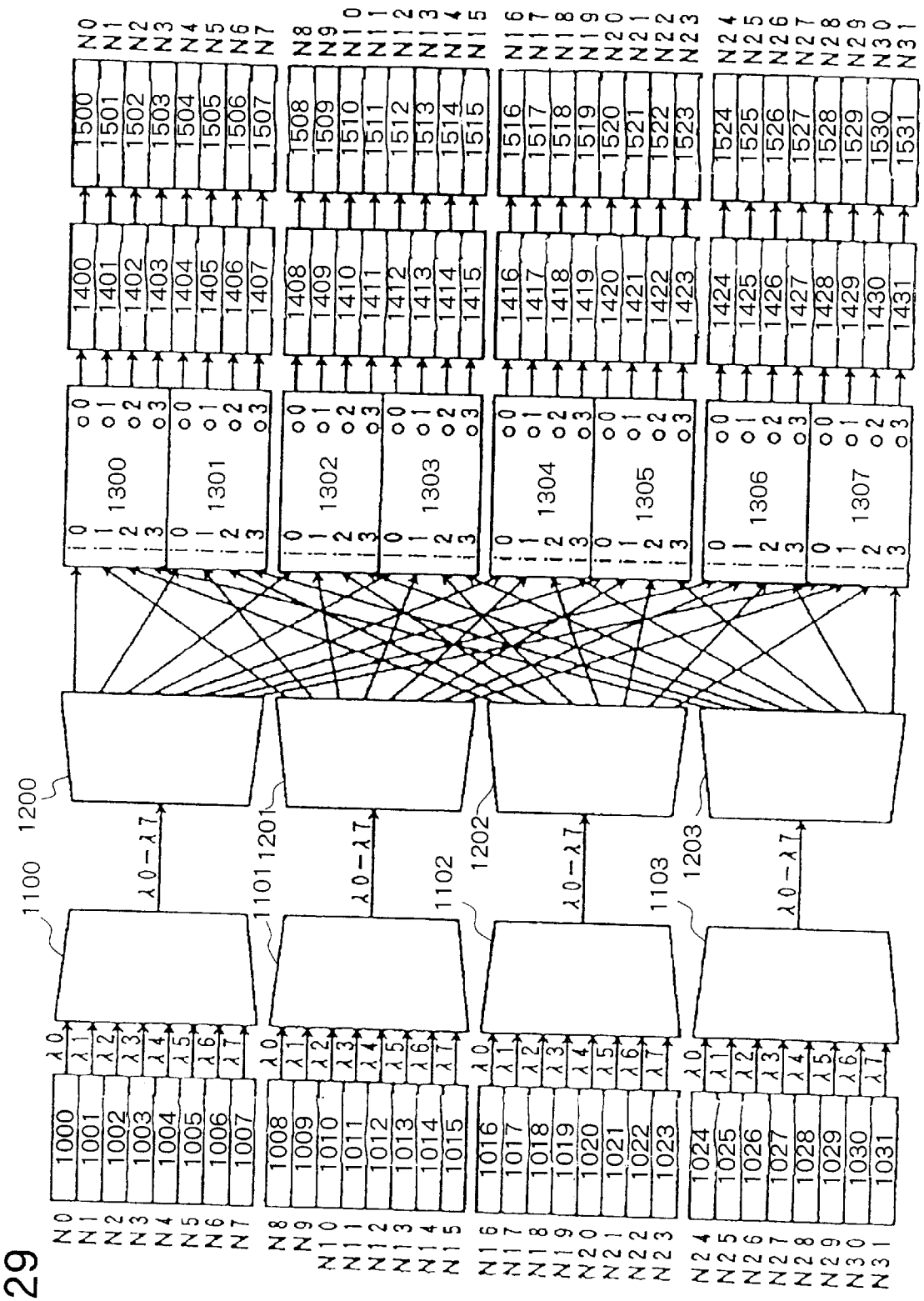
FIG. 29 is a block diagram showing a WDM optical network, which is an optical communication system, in the ninth embodiment of the present invention.
Figure 30:
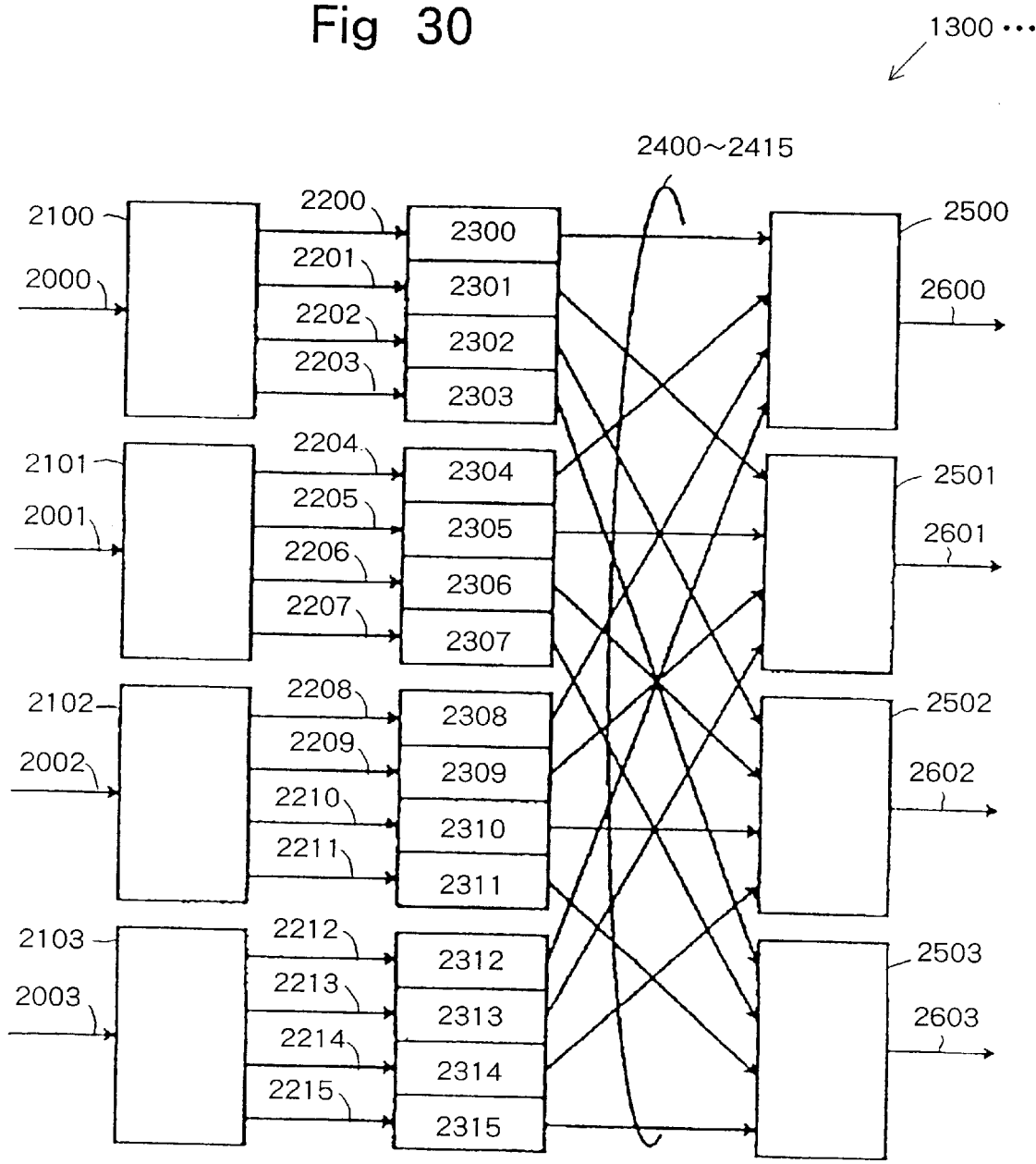
FIG. 30 is a block diagram showing an optical crossbar switch in the ninth embodiment.
Figure 31:
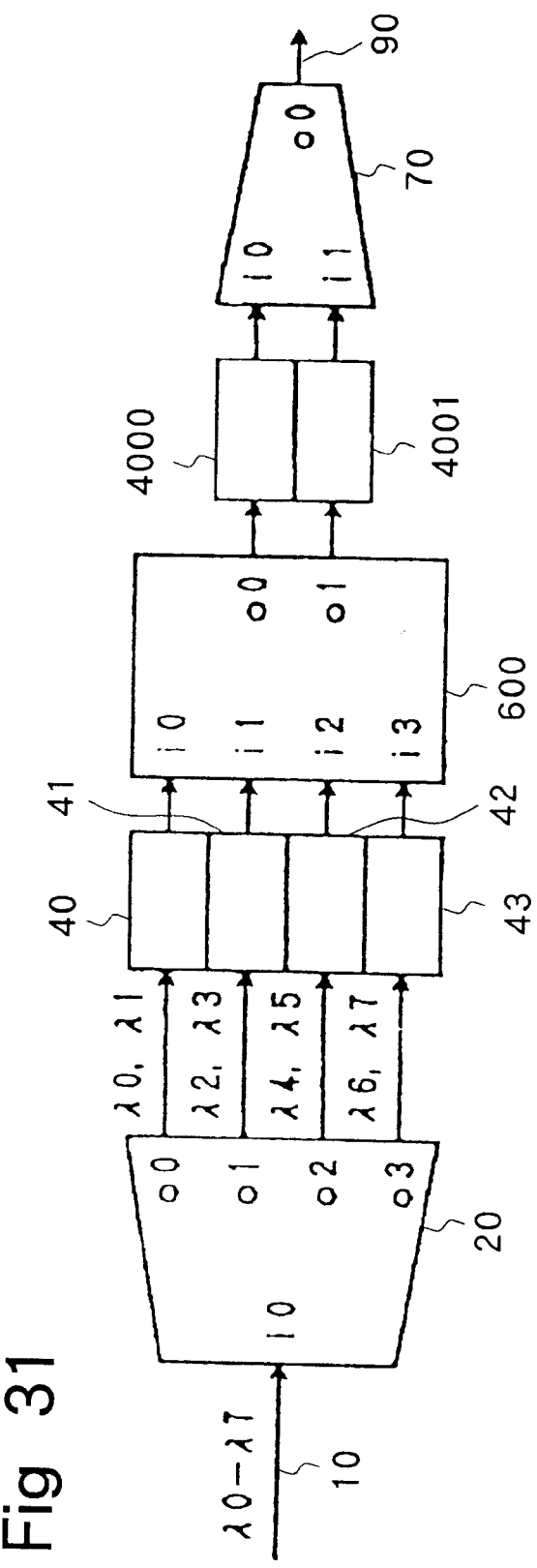
FIG. 31 is a block diagram showing an optical wavelength selector in the ninth embodiment.

As the ninth embodiment of the present invention, explanation is next presented regarding a WDM optical network, which is a data communication system, with reference to FIGS. 29 to 31.

The data communication system of this embodiment is a WDM optical network in which W is 8, S is 4, and the scale is 32×32.

As shown in FIG. 29, the WDM optical network of this embodiment is provided with four (i.e., S) optical transmitter groups. Each of the four optical transmitter groups is in turn made up of eight (i.e., W) optical transmitters 1000 . . . .

Accordingly, the WDM optical network is provided with a total of 32 optical transmitters 1000–1031. The 32 optical transmitters 1000–1031 each output an optical signal at a single wavelength, a total of 8 wavelengths being used.

In other words, WDM channels λ0–λ7 are assigned to each of the eight optical transmitters 1000–1007 of the first optical transmitter group as the wavelength particular to that transmitter.

Similarly, the same WDM channels λ0–λ7 are allotted to the eight optical transmitters 1008—in the second to fourth optical transmitter groups.

Four (i.e., S) wavelength-division multiplexers 1100–1103, which are optical combining means, are each connected to the four optical transmitter groups, which are made up of the 32 optical transmitters 1000–1031.

Wavelength-division multiplexers 1100 . . . are each provided with eight (i.e., W) input ports and one output port, and eight optical transmitters 1000 . . . . are connected to each of wavelength-division multiplexers 1100 . . . .

Four (i.e., S) optical splitters 1200–1203 are each connected to a respective wavelength division multiplexer of the four wavelength-division multiplexer 1100–1103, and these optical splitters 1200–1203 are each provided with one input port and eight (i.e., W) output ports.

Eight (i.e., W) optical crossbar switches 1300–1307 are connected to the four optical splitters 1200–1203, these optical crossbar switches 1300–1307 each being provided with four (i.e., S) input ports and four (i.e., S) output ports.

The eight output ports of the first optical splitter 1200 are each connected to the first input port of a respective optical crossbar switch of the eight optical crossbar switches 1300–1307. In the same way, the eight output ports of each of the second to fourth optical splitters 1201–1203 are connected to the respective second to fourth input ports of the eight optical crossbar switches 1300–1307.

Optical crossbar switches 1300–1307 each enable simultaneous output from the plurality of the four output ports of the WDM optical signal that is inputted from one of the four input ports. Here, the output ports that output the WDM optical signal can be freely selected from the four.

The 32 (i.e., W×S) optical wavelength selectors 1400–1431 are individually connected to the total of 32 output ports of the eight optical crossbar switches 1300–1307.

The 32 (i.e., W×S) optical receivers 1500–1531 are each connected to the 32 optical wavelength selectors 1400–1431, respectively. Optical receivers 1500–1531 convert the inputted optical signal of one wavelength to an electrical signal.

The construction of optical crossbar switches 1300–1307 is next presented with reference to FIG. 30.

Optical crossbar switches 1300 . . . are made up of four input ports 2000–2003, four optical splitters 2100–2103, sixteen waveguides 2200–2215, sixteen optical gate switches 2300–2315, sixteen waveguides 2400–2415, four optical combiners 2500–2503, and four output ports 2600–2603.

The four optical splitters 2100–2103 are individually connected to the four input ports 2000–2003, and the sixteen optical gate switches 2300–2315 are connected in groups of four to a respective optical splitter of the four optical splitters 2100–2103 by means of sixteen waveguides 2200–2215.

The four optical combiners 2500–2503 are connected to the sixteen optical gate switches 2300–2315 by means of sixteen waveguides 2400–2415. Each of the four optical combiners 2500–2503 is provided with four input ports and one output port.

The first group of four optical gate switches 2300–2303 are each connected to the first input port of a respective optical combiner of the four optical combiners 2500–2503. In the same way, optical gate switches 2304–2315 of the second to fourth groups are connected to respective second to fourth input ports of the four optical combiners 2500–2503.

The output ports of the four optical combiners 2500–2503 are each connected to a respective output port of the four output ports 2600–2603.

Optical gate switches 2300–2315 of optical crossbar switches 1300 . . . are made up of semiconductor optical amplifiers. Accordingly, optical crossbar switches 1300 . . . enable simultaneous output of optical signals inputted from one of the four input ports 2000–2003 from the plurality of four output ports 2600–2603. This function is called "multicasting".

Explanation is next presented regarding the construction of optical wavelength selectors 1400 . . . with reference to FIG. 31. The construction of optical wavelength selectors 1400 . . . corresponds to a simplified construction of the optical wavelength selector of the eighth embodiment shown in FIG. 28.

In other words, optical wavelength selectors 1400 . . . are each provided with one wavelength-division multiplexer 20, four optical gate switches 40–43, one optical wavelength router 600, two optical gate switches 4000 and 4001, and one wavelength-division multiplexer 70.

The WDM channels which passes from each input ports to each output ports of the above-described optical wavelength router 600 is as shown in Table 9 below.

The WDM optical network of this embodiment in a construction as described hereinabove can freely transmit data from the 32 optical transmitters 1000–1031 to the 32 optical receivers 1500–1531.

As an example, a case is described in which data transmission from node N0 to node N1 and data transmission from node N1 to node N2 are performed simultaneously. First, optical transmitters 1000 and 1001 of node N0 and node N1 simultaneously output optical signals of WDM channels λ0 and λ1.

These WDM channels are multiplexed at wavelength-division multiplexer 1100 to form WDM optical signal. This WDM optical signal is splitted at optical splitter 1200 and inputted to the first input port i0 of each of the eight optical crossbar switches 1300–1307.

As described hereinabove, optical crossbar switches 1300 . . . have a multicasting capability. Accordingly, the WDM optical signal inputted to the first input port i0 can be simultaneously outputted from the second and third output ports o1 and o2.

WDM optical signal in which WDM channels λ0 and λ1 are multiplexed is inputted to second and third optical wavelength selectors 1401 and 1402. Here, if second and third optical wavelength selectors 1401 and 1402 select each of WDM channels λ0 and λ1, data transmission from node N0 to node N1 and data transmission from node N2 to node N2 are effected simultaneously.

A case in which data transmission from node N0 to node N1 and data transmission from node N8 to node N2 are effected simultaneously is also explained. First, optical transmitters 1000 and 1008 of node N0 and node N8 both simultaneously output WDM channel λ0.

These WDM channels are each transmitted from wavelength-division multiplexers 1100 and 1101 to optical splitters 1200 and 1201. The WDM channel λ0 outputted from node N0 is then inputted to the first input port i0 of each of eight optical crossbar switches 1300–1307. The WDM channel λ0 outputted from node N8, however, is inputted to the second input port i1 of each of the eight optical crossbar switches 1300–1307.

Optical crossbar switches 1300 . . . can both output the optical signal inputted to the first input port i0 from the second output port o1 and output the optical signal inputted to the second input port i1 from the third output port o2.

Data transmission from node N0 to node N1 can therefore be effected simultaneously with data transmission from node N8 to node N2.

The WDM optical network of this embodiment is logically a crossbar network and therefore functions identically with the WDM optical network of the prior art shown in FIG. 2. The WDM optical network of this embodiment, however, combines space-division switching by means of optical crossbar switches 1300 . . . with wavelength-division switching by means of optical wavelength selectors 1400 . . . , thereby enabling communication over a large number of nodes that requires a limited number of WDM channels.

Using optical wavelength selectors 140 . . . of the construction shown in FIG. 31, a total of 320 optical gate switches would be necessary to realize 32×32 WDM optical network in the prior-art configuration shown in FIG. 2.

A total of 320 optical gate switches are also used to realize 32×32 WDM optical network of this embodiment. However, while 32 WDM channels are required in the WDM optical network of the prior art, the WDM optical network of this embodiment requires only eight WDM channel.

Assuming the same number of nodes and optical gate switches as a network of the prior art, the WDM optical network of this embodiment can reduce the number of WDM channels, thereby enabling larger input power per WDM channel for optical gate switches, which are semiconductor optical amplifiers, avoiding saturation of optical gate switches. In addition, an optical transmitter 1000 for the same WDM channel can be put to many uses, thereby allowing an improvement in productivity of the overall network.

Furthermore, the various values presented for the sake of example in the various embodiments described hereinabove are not necessarily limited to the above-described values, various types of settings being possible.

For example, the WDM optical signal in the examples presented in the first to sixth embodiments, incorporates four WDM channel groups each composed of four WDM channels is multiplexed. These numerical values, however, need not be limited to these numbers, and any settings can be employed. Moreover, the wavelengths of the WDM channels used to form the WDM optical signal may also be of any setting.

In the first to sixth embodiments, examples were presented in which only one of the optical gate switches 40–43, was turned ON at a time to select a single channel of WDM optical signal from four WDM channel groups. However, a plurality of optical gate switches may be turned ON at one time to select a plurality of WDM channel groups.

In addition, although the examples presented employed an allayed waveguide grating device as wavelength-division demultiplexer 20 of the first and sixth embodiments and wavelength-division demultiplexer 80 of the third and fifth embodiments, the present invention also permits the use of other components in place of an arrayed waveguide grating device such as another form of diffraction grating, a fiber Fabry-Perot filter, an acousto-optic filter, or a dielectric interference filter.

Although optical combiner 70, which is made of optical fiber were used in the third and fifth embodiments, the present invention permits the use of wavelength-division multiplexers, such as an arrayed waveguide grating wavelength-division multiplexer constructed from a silica glass waveguide or semiconductor waveguide, a wavelength-division multiplexer using a diffraction grating of the other embodiments, a fiber Fabry-Perot filter, an acousto-optic filter, or a dielectric interference filter instead of optical combiner.

Although an arrayed waveguide grating device made of silica glass was employed as optical wavelength router 60 in the first, second, fource and sixth embodiment, an arrayed waveguide grating produced from a semiconductor waveguide or a polymer waveguide may also be used. Furthermore, an optical wavelength router using a diffraction grating of the other embodiments, or an optical wavelength router may also be employed that uses a fiber Fabry-Perot filter, an acousto-optic effect filter, or a dielectric interference filter.

Although the wavelengths of light were set at equal spacing in the first embodiment, this spacing may also be unequal.

Although the wavelengths were set at equal spacing within each WDM channel group in the third and fourth embodiments, these wavelengths may also be set to unequal spacing within each WDM channel group.

Although all wavelengths were set to equal spacing in the fifth and sixth embodiments, the spacing may be equal for wavelengths within each WDM channel group but unequal between WDM channel groups.

Although 32 input waveguides 610 and 32 output waveguides 650 were formed in arrayed waveguide grating device 500 constituting optical wavelength router 60 in the second embodiment, only four input waveguides and four output waveguides of these waveguides are necessary, and the others need not be formed.

Although the number $k_0$, $k_1$, . . . or $k_p$ of optical gate switches in each stage of the multiple stages of optical gate switches was two or four in the seventh and eighth embodiments, a total of 2× of optical gate switches may be employed to enable selection of 2× wavelengths.

For example, if six optical gate switches are used in three stages of 2×2×2, eight WDM channel can be selected. If six optical gate switches are used in two stages of 2×4 or 4×2, the number of WDM channels that can be selected remains the same.

However, a still greater number of WDM channels may be selected if three is used as $k_0$, $k_1$, . . . $k_p$. For example, if six optical gate switches are used in two stages of 3×3, nine wavelengths can be selected.

Although wavelength-division multiplexers 1100 . . . were used as the optical combining means of the WDM optical network in the ninth embodiment, an optical combiner may also be used.

Although optical fiber was used for the connection portions of such components as input/output ports, wavelength-division demultiplexers, optical wavelength routers, and semiconductor optical amplifiers in the various embodiments described hereinabove, other optical waveguides may be used, including silica glass waveguides, semiconductor waveguides, and polymer waveguides.

Finally, although semiconductor optical amplifiers were used as optical gate switches 23, 40 . . . , other components may be used as optical gate switches, including electro-absorption optical modulators, optical modulators made of lithium niobate, optical switches made of lithium niobate, optical switches made of polymer, optical switches made of liquid crystal, and mechanical optical switches.

While preferred embodiments of the present invention have been described using specific terms, such description is for illustrative purposes only, and it is to be understood that changes and variations may be made without departing from the spirit or scope of the following claims.

What is claimed is:

1. An optical wavelength selector provided with:
   a wavelength-division demultiplexer that inputs WDM optical signal, in which m×n (m and n being any natural numbers) WDM channels are multiplexed, from one input port, separates said WDM optical signal into n WDM channel groups, and outputs each WDM channel group from one of n output ports;
   n optical gate switches each connected to a respective one of n output ports of said wavelength-division demultiplexer that either let pass or cut off said WDM channel groups that is inputted; and
   an optical wavelength router that separates said WDM channel groups inputted from n input ports that are each connected to a respective optical gate switch of said optical gate switches into m WDM channels, and outputs each WDM channel from one of m output ports.

2. An optical wavelength selector provided with:
   a wavelength-division demultiplexer that separates WDM optical signal into n WDM channel groups (n being any natural number), and outputs each WDM channel group from one of n output ports, wherein said WDM optical signal comprises n said WDM channel groups in which m WDM channels (m being any natural number) is multiplexed, and wherein the (a+1)th (where (a+1) is any natural number from 1 to n) WDM channel group $\{\lambda_{a0}, \lambda_{a1}, \lambda_{a2}, \ldots, \lambda_{am-2}, \lambda_{am-1}\}$ satisfies the relation "$\lambda_{0b}-\lambda_{0\ b-1}=\lambda_{ab}-\lambda_{ab-1}$" with respect to any natural number b from 1 to m;
   n optical gate switches each connected to a respective one of n output ports of said wavelength-division demultiplexer that either let pass or cut off said WDM channel group that is inputted; and
   an optical wavelength router that separates said WDM channel groups inputted from n input ports that are each connected to a respective optical gate switch of said optical gate switches into m WDM channels, and outputs each WDM channel from one of m output ports.

3. An optical wavelength selector provided with:
   a wavelength-division demultiplexer that separates WDM optical signal into n WDM channel groups (n being any natural number), and outputs each WDM channel group from one of n output ports, wherein said WDM optical signal has n said WDM channel groups in which m WDM channels (m being any natural number) is multiplexed, wherein the (a+1)th (where (a+1) is any natural number from 1 to n) WDM channel group $\{\lambda_{a0}, \lambda_{a1}, \lambda_{a\ 2}, \ldots, \lambda_{am-2}, \lambda_{am-1}\}$ satisfies the relation "$\lambda_{0b}-\lambda_{0b-1}=\lambda_{ab}-\lambda_{ab-1}$" with respect to any natural number b from 1 to m, and moreover, wherein the m WDM channels belonging to each WDM channel group are lined up continuously on the wavelength axis and the wavelength spacing between each WDM channel groups is equal;
   n optical gate switches each connected to a respective one of n output ports of said wavelength-division demultiplexer that either let pass or cut off said WDM channel group that is inputted; and
   an optical wavelength router that separates said WDM channel groups inputted from n input ports that are each connected to a respective optical gate switch of said optical gate switches into m WDM channels, and outputs each WDM channel from one of m output ports.

4. An optical wavelength selector according to claim 3 wherein said optical wavelength router is provided with an arrayed waveguide grating device.

5. An optical wavelength selector provided with:
   a wavelength-division demultiplexer that separates WDM optical signal into n WDM channel groups (n being any natural number), and outputs each WDM channel group from one of n output ports, wal signal has n said WDM channel groups in which m WDM channels (m being any natural number) is multiplexed, wherein the (a+1)th (where (a+1) is any natural number from 1 to n) WDM channel group $\{\lambda_{a0}, \lambda_{a1}, \lambda_{a2}, \ldots, \lambda_{am-2}, \lambda_{am-1}\}$ satisfies the relation "$\lambda_{0b}-\lambda_{0b-1}=\lambda_{ab}-\lambda_{ab-1}$" with respect to any natural number b from 1 to m, wherein the m WDM channels belonging to each WDM channel group are lined up on the wavelength axis so as to have periodicity for every n WDM channels, and moreover, wherein the wavelength spacing of the m WDM channels within each WDM channel groups is equal;
   n optical gate switches each connected to a respective one of n output ports of said wavelength-division demultiplexer that either let pass or cut off said WDM channel group that is inputted; and
   an optical wavelength router that separates said WDM channel groups inputted from n input ports that are each connected to a respective optical gate switch of said optical gate switches into m WDM channels, and outputs each WDM channel from one of m output ports.

6. An optical wavelength selector according to claim 5 wherein said optical wavelength router is provided with an arrayed waveguide grating device.

7. An optical communication system provided with:
   a WDM optical signal transmitting means that outputs WDM optical signal in which m×n (m and n being any natural numbers) WDM channels are multiplexed;
   an optical transmission medium that transmits said WDM optical signal outputted by said WDM optical signal transmitting means;
   a wavelength-division demultiplexer that separates said WDM optical signal inputted from said optical transmission medium to one input port into n WDM channel groups, and outputs each of said n WDM channel groups from a respective output port of n output ports;
   n optical gate switches that are each connected to a respective output port of the n output ports of said wavelength-division demultiplexer and that either let pass or cut off said WDM channel group that is inputted;
   an optical wavelength router that separates said WDM channel groups inputted from n input ports each connected to a respective optical gate switch of said optical gate switches into m WDM channels, and outputs each WDM channel from a respective output port of m output ports; and
   m optical receivers that individually receive the m WDM channels outputted from said optical wavelength router.

8. An optical communication system according to claim 7 wherein WDM optical signal outputted by said WDM optical signal transmitting means is such that the (a+1)th (where (a+1) is any natural number from 1 to n) WDM channel group $\{\lambda_{a0}, \lambda_{a1}, \lambda_{a2}, \ldots, \lambda_{am-2}, \lambda_{am-1}\}$ satisfies the relation "$\lambda_{0b}-\lambda_{0b-1}=\lambda_{ab}-\lambda_{ab-1}$" with respect to any natural number b from 1 to m.

9. An optical communication system according to claim 8 wherein WDM optical signal outputted by said WDM optical signal transmitting means is such that the m WDM channels belonging to each WDM channel group are lined up continuously on the wavelength axis, and moreover, wavelength spacing between each WDM channel groups is equal.

10. An optical communication system according to claim 9 wherein said optical wavelength router is provided with an arrayed waveguide grating device.

11. An optical communication system according to claim 8 wherein WDM optical signal outputted by said WDM optical signal transmitting means is such that the m WDM channels belonging to each WDM channel group are lined up on the wavelength axis so as to have periodicity for every n WDM channels, and moreover, wavelength spacing of the m WDM channels within each WDM channel groups is equal.

12. An optical communication system according to claim 11 wherein said optical wavelength router is provided with an arrayed waveguide grating device.

13. An optical wavelength selector provided with:
a wavelength-division demultiplexer that, when WDM optical signal in which $k_0 \times k_1 \times \ldots \times k_i \times \ldots \times k_p$ (where $k_0 \ldots k_p$ are each any natural number) WDM channels are multiplexed is inputted from one input port, splits said WDM optical signal into $k_0$ beams, one beam for each prescribed first-stage WDM channel group, and outputs the result;
$k_0$ optical gate switches that either let pass or cut off the $k_0$ beams of said first-stage WDM channel group inputted from said wavelength-division demultiplexer;
optical wavelength routers in p stages (where p is any natural number) that separate WDM optical signal inputted from one of $k_{i-1}$ input ports into $k_i$ beams, one beam for each prescribed WDM channel group, and output the result;
$k_i$ optical gate switches in p stages that either let pass or cut off inputted WDM optical signal; and
an optical combiner that outputs from one output port one WDM channel inputted from one of $k_p$ optical gate switches of the pth stage of said optical gate switches;
wherein said p stages are a plurality of stages.

14. An optical wavelength selector according to claim 13 wherein each of said $k_0, k_1, \ldots k_i, \ldots k_p$ is any of two, three, and four.

15. An optical wavelength selector provided with:
a wavelength-division demultiplexer that, when WDM optical signal in which $k_0 \times k_1 \times \ldots \times k_i \times \ldots \times k_p$ (where $k_0 \ldots k_p$ are each any natural number) WDM channels are multiplexed is inputted from one input port, separates said WDM optical signal into $k_0$ beams, one beam for each prescribed first-stage WDM channel group, and outputs the result;
$k_0$ optical gate switches that either let pass or cut off the $k_0$ beams of said first-stage WDM channel group inputted from said wavelength-division demultiplexer;
optical wavelength routers in p stages (where p is any natural number) that separate WDM optical signal inputted from one of $k_{i-1}$ input ports into $k_i$ beams, one beam for each prescribed WDM channel group, and output the result;
$k_i$ optical gate switches in p stages that either let pass or cut off inputted WDM optical signal; and
an optical combiner that outputs from one output port one WDM channel inputted from one of $k_p$ optical gate switches of the pth stage of said optical gate switches;
wherein each of said $k_0, h_1, \ldots k_i, \ldots k_p$ is any of two, three, and four.

16. An optical communication system provided with:
S (S being two or more) optical transmitter groups each made up of W (W being two or more) optical transmitters that transmit W WDM channels;
S optical beam-combining means that are each connected to a respective one of said S optical transmitter groups, that combine W WDM channels that are transmitted into one WDM optical signal, and output the result;
S optical splitters that are each connected to a respective one of said S optical beam-combining means, that split inputted WDM optical signal into W beams, and output each beam from a respective output port of W output ports;
W optical crossbar switches that each have each one of S input ports connected to a respective one of said S optical splitters and that are capable of simultaneously outputting WDM optical signal inputted from one of said S input ports from the plurality of S output ports;
W×S optical wavelength selectors that are each connected to a respective one of S output ports of said W optical crossbar switches, that select one WDM channel from inputted WDM optical signal, and that output the result; and
W×S optical receivers that are each connected to a respective one of said W×S optical wavelength selectors and that convert inputted optical signals of one wavelength to electrical signals;
wherein said optical wavelength selectors are provided with:
a wavelength-division demultiplexer that, when WDM optical signal in which $k_0 \times k_1 \times \ldots \times k_i \times \ldots \times k_p$ (where $k_0 \ldots k_p$ are each any natural number) WDM channels are multiplexed is inputted from one input port, splits said WDM optical signal into kobeams, one beam for each prescribed first-stage WDM channel group, and outputs the result;
$k_0$ optical gate switches that either let pass or cut off the $k_0$ beams of said first-stage WDM channel group inputted from said wavelength-division demultiplexer;
optical wavelength routers in p stages (where p is any natural number) that separate WDM optical signal inputted from one of $k_{i-1}$ input ports into $k_i$ beams, one beam for each prescribed WDM channel group, and output the result;
$k_i$ optical gate switches in p stages that either let pass or cut off inputted WDM optical signal; and
a wavelength-division multiplexer that outputs from one output port one WDM channel inputted from one of $k_p$ optical gate switches of the pth stage of said optical gate switches;
wherein said p stages are a plurality of stages.

17. An optical communication system according to claim 16 wherein each of said $k_0, k_1, \ldots k_i, \ldots k_p$ is any of two, three, and four.

18. An optical wavelength selector provided with:
a wavelength-division demultiplexer that, when WDM optical signal in which $k_0 \times k_1 \times \ldots \times k_i \times \ldots \times k_p$ (where $k_0 \ldots k_p$ are each any natural number) WDM channels are multiplexed is inputted from one input port, splits said WDM optical signal into $k_0$ beams, one beam for each prescribed first-stage WDM channel group, and outputs the result;
$k_0$ optical gate switches that either let pass or cut off the $k_0$ beams of said first-stage WDM channel group inputted from said wavelength-division demultiplexer;

optical wavelength routers in p stages (where p is any natural number) that separate WDM optical signal inputted from one of $k_{i-1}$ input ports into $k_i$ beams, one beam for each prescribed WDM channel group, and output the result;

$k_i$ optical gate switches in p stages that either let pass or cut off inputted WDM optical signal; and a wavelength-division multiplexer that outputs from one output port one WDM channel inputted from one of $k_p$ optical gate switches of the pth stage of said optical gate switches;

wherein said p stages are a plurality of stages.

19. An optical wavelength selector according to claim 18 wherein each of said $k_0, k_1, \ldots k_i, \ldots k_p$ is any of two, three, and four.

20. An optical wavelength selector provided with:

a wavelength-division demultiplexer that, when WDM optical signal in which $k_0 \times k_1 \times \ldots \times k_i \times \ldots \times k_p$ (where $k_0 \ldots k_p$ are each any natural number) WDM channels are multiplexed is inputted from one input port, separates said WDM optical signal into $k_0$ beams, one beam for each prescribed first-stage WDM channel group, and outputs the result;

$k_0$ optical gate switches that either let pass or cut off the $k_0$ beams of said first-stage WDM channel group inputted from said wavelength-division demultiplexer;

optical wavelength routers in p stages (where p is any natural number) that separate WDM optical signal inputted from one of $k_{i-1}$ input ports into $k_i$ beams, one beam for each prescribed WDM channel group, and output the result;

$k_i$ optical gate switches in p stages that either let pass or cut off inputted WDM optical signal; and a wavelength-division multiplexer that outputs from one output port one WDM channel inputted from one of $k_p$ optical gate switches of the pth stage of said optical gate switches;

wherein each of said $k_0, k_1, \ldots k_i, \ldots k_p$ is any of two, three, and four.

21. An optical communication system provided with:

S (S being two or more) optical transmitter groups each made up of W (W being two or more) optical transmitters that transmit W WDM channels;

S optical beam-combining means that are each connected to a respective one of said S optical transmitter groups, that combine W WDM channels that are transmitted into one WDM optical signal, and output the result;

S optical splitters that are each connected to a respective one of said S optical beam-combining means, that split inputted WDM optical signal into W beams, and output each beam from a respective output port of W output ports;

W optical crossbar switches that each have each one of S input ports connected to a respective one of said S optical splitters and that are capable of simultaneously outputting WDM optical signal inputted from one of said S input ports from the plurality of S output ports;

W×S optical wavelength selectors that are each connected to a respective one of S output ports of said W optical crossbar switches, that select one WDM channel from inputted WDM optical signal, and that output the result; and W×S optical receivers that are each connected to a respective one of said W×S optical wavelength selectors and that convert inputted optical signals of one wavelength to electrical signals;

wherein said optical wavelength selectors are provided with:

a wavelength-division demultiplexer that, when WDM optical signal in which $k_0 \times k_1 \times \ldots \times k_i \times \ldots \times k_p$ (where $k_0 \ldots k_p$ are each any natural number) WDM channels are multiplexed is inputted from one input port, splits said WDM optical signal into $k_0$ beams, one beam for each prescribed first-stage WDM channel group, and outputs the result;

$k_0$ optical gate switches that either let pass or cut off the $k_0$ beams of said first-stage WDM channel group inputted from said wavelength-division demultiplexer;

optical wavelength routers in p stages (where p is any natural number) that separate WDM optical signal inputted from one of $k_{i-1}$ input ports into $k_i$ beams, one beam for each prescribed WDM channel group, and output the result;

$k_i$ optical gate switches in p stages that either let pass or cut off inputted WDM optical signal; and a wavelength-division multiplexer that outputs from one output port one WDM channel inputted from one of $k_p$ optical gate switches of the pth stage of said optical gate switches;

wherein each of said $k_0, k_1, \ldots k_i, \ldots k_p$ is any of two, three, and four.

22. An optical communication system provided with:

S (S being two or more) optical transmitter groups each made up of W (W being two or more) optical transmitters that transmit W WDM channels;

S optical beam-combining means that are each connected to a respective one of said S optical transmitter groups, that combine W WDM channels that are transmitted into one WDM optical signal, and output the result;

S optical splitters that are each connected to a respective one of said S optical beam-combining means, that split inputted WDM optical signal into W beams, and output each beam from a respective output port of W output ports;

W optical crossbar switches that each have each one of S input ports connected to a respective one of said S optical splitters and that are capable of simultaneously outputting WDM optical signal inputted from one of said S input ports from the plurality of S output ports;

W×S optical wavelength selectors that are each connected to a respective one of S output ports of said W optical crossbar switches, that select one WDM channel from inputted WDM optical signal, and that output the result; and W×S optical receivers that are each connected to a respective one of said W×S optical wavelength selectors and that convert inputted optical signals of one wavelength to electrical signals;

wherein said optical wavelength selectors are provided with:

a wavelength-division demultiplexer that, when WDM optical signal in which $k_0 \times k_1 \times \ldots \times k_i \times \ldots \times k_p$ (where $k_0 \ldots k_p$ are each any natural number) WDM channels are multiplexed is inputted from one input port, splits said WDM optical signal into $k_0$ beams, one beam for each prescribed first-stage WDM channel group, and outputs the result;

$k_0$ optical gate switches that either let pass or cut off the $k_0$ beams of said first-stage WDM channel group inputted from said wavelength-division demultiplexer;

optical wavelength routers in p stages (where p is any natural number) that separate WDM optical signal inputted from one of $k_{i-1}$ input ports into $k_i$ beams, one beam for each prescribed WDM channel group, and output the result;

$k_i$ optical gate switches in p stages that either let pass or cut off inputted WDM optical signal; and an optical combiner that outputs from one output port one WDM channel inputted from one of $k_p$ optical gate switches of the pth stage of said optical gate switches;

wherein each of said $k_0, k_1, \ldots k_i, \ldots k_p$ is any of two, three, and four.

23. An optical communication system provided with:

S (S being two or more) optical transmitter groups each made up of W (W being two or more) optical transmitters that transmit W WDM channels;

S optical beam-combining means that are each connected to a respective one of said S optical transmitter groups, that combine W WDM channels that are transmitted into one WDM optical signal, and output the result;

S optical splitters that are each connected to a respective one of said S optical beam-combining means, that split inputted WDM optical signal into W beams, and output each beam from a respective output port of W output ports;

W optical crossbar switches that each have each one of S input ports connected to a respective one of said S optical splitters and that are capable of simultaneously outputting WDM optical signal inputted from one of said S input ports from the plurality of S output ports;

W×S optical wavelength selectors that are each connected to a respective one of S output ports of said W optical crossbar switches, that select one WDM channel from inputted WDM optical signal, and that output the result; and W×S optical receivers that are each connected to a respective one of said W×S optical wavelength selectors and that convert inputted optical signals of one wavelength to electrical signals;

wherein said optical wavelength selectors are provided with:

a wavelength-division demultiplexer that, when WDM optical signal in which $k_0 \times k_1 \times \ldots \times k_i \times \ldots \times k_p$ (where $k_0 \ldots k_p$ are each any natural number) WDM channels are multiplexed is inputted from one input port, splits said WDM optical signal into $k_0$ beams, one beam for each prescribed first-stage WDM channel group, and outputs the result;

$k_0$ optical gate switches that either let pass or cut off the $k_0$ beams of said first-stage WDM channel group inputted from said wavelength-division demultiplexer;

optical wavelength routers in p stages (where p is any natural number) that separate WDM optical signal inputted from one of $k_{i-1}$ input ports into $k_i$ beams, one beam for each prescribed WDM channel group, and output the result;

$k_i$ optical gate switches in p stages that either let pass or cut off inputted WDM optical signal; and an optical combiner that outputs from one output port one WDM channel inputted from one of $k_p$ optical gate switches of the pth stage of said optical gate switches;

wherein said p stages are a plurality of stages.

24. An optical communication system according to claim 23 wherein each of said $k_0, k_1, \ldots k_i, \ldots k_p$ is any of two, three, and four.

* * * * *